United States Patent [19]
Dunn et al.

[11] Patent Number: 6,154,772
[45] Date of Patent: *Nov. 28, 2000

[54] SYSTEM AND METHOD FOR THE DELIVERY OF DIGITAL VIDEO AND DATA OVER A COMMUNICATION CHANNEL

[75] Inventors: Bryan W. Dunn, Newnan; Matthew A. Eshleman, Lilburn; William W. Butler, Roswell; Donald J. Collins, Decatur; Timothy M. Strike; Ronald A. Bohlander, both of Marietta; David L. Klimek, Buford, all of Ga.

[73] Assignee: Georgia Tech Research Corporation, Atlanta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 09/185,956

[22] Filed: Nov. 4, 1998

Related U.S. Application Data

[60] Provisional application No. 60/064,153, Nov. 4, 1997.

[51] Int. Cl.[7] .................................................. H04L 7/10
[52] U.S. Cl. ................................... 709/217; 348/7
[58] Field of Search .............................. 348/6, 7, 10, 12, 348/13; 433/3.1, 4.1, 4.2, 5.1, 6.1, 6.2; 709/217, 218; 345/327

[56] References Cited

U.S. PATENT DOCUMENTS

| | | | |
|---|---|---|---|
| 4,509,211 | 4/1985 | Robbins | 455/603 |
| 5,251,324 | 10/1993 | McMullan, Jr. | 455/2 |
| 5,303,229 | 4/1994 | Withers et al. | 370/58.1 |
| 5,371,532 | 12/1994 | Gelman et al. | 348/7 |
| 5,512,936 | 4/1996 | Burton et al. | 348/11 |
| 5,621,728 | 4/1997 | Lightfoot et al. | 370/60.1 |
| 5,699,392 | 12/1997 | Dokic | 375/376 |
| 5,774,497 | 6/1998 | Block et al. | 375/226 |
| 5,790,543 | 8/1998 | Cloutier | 370/395 |
| 5,793,927 | 8/1998 | Lane | 386/81 |

*Primary Examiner*—Nathan Flynn
*Attorney, Agent, or Firm*—Thomas, Kayden, Horstemeyer & Risley LLP

[57] ABSTRACT

A novel digital video and data delivery system makes possible the delivery of digital video content, bi-directional data services such as Internet data, and plain old telephone service (POTS) to an end user over a communications channel. The channel is typically the copper wire pair that extends between a telephone company central office and a residential premises, but may be any communication medium that supports the communication of compressed digital video, bi-directional data, such as Internet data, and POTS, and indeed, may be a wireless connection. The digital video and data delivery system capitalizes on a bus, or broadcast backplane, created by circuitry contained within the central office. The broadcast backplane enables a plurality of video program data to be available to each end user, and allows a plurality of end users access to a plurality of video programming content without the necessity of delivering the entire program content to each end user. A user requests a particular program and, if authorized, receives at least that program over the communication channel. Simultaneous with the digital video content supplied on the channel is both bi-directional data service (such as for example, Internet data) and POTS.

15 Claims, 48 Drawing Sheets

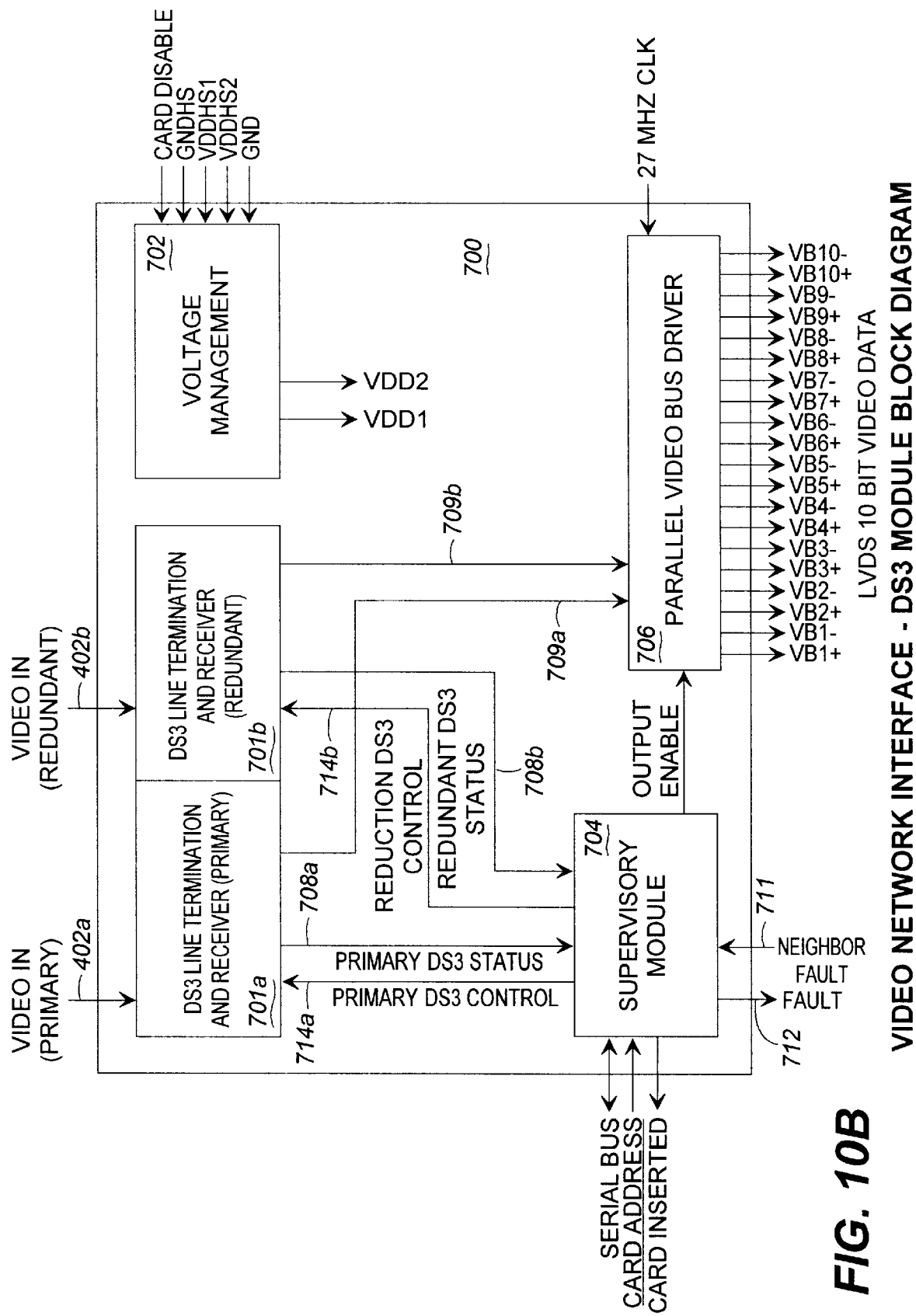
FIG. 10B  VIDEO NETWORK INTERFACE - DS3 MODULE BLOCK DIAGRAM

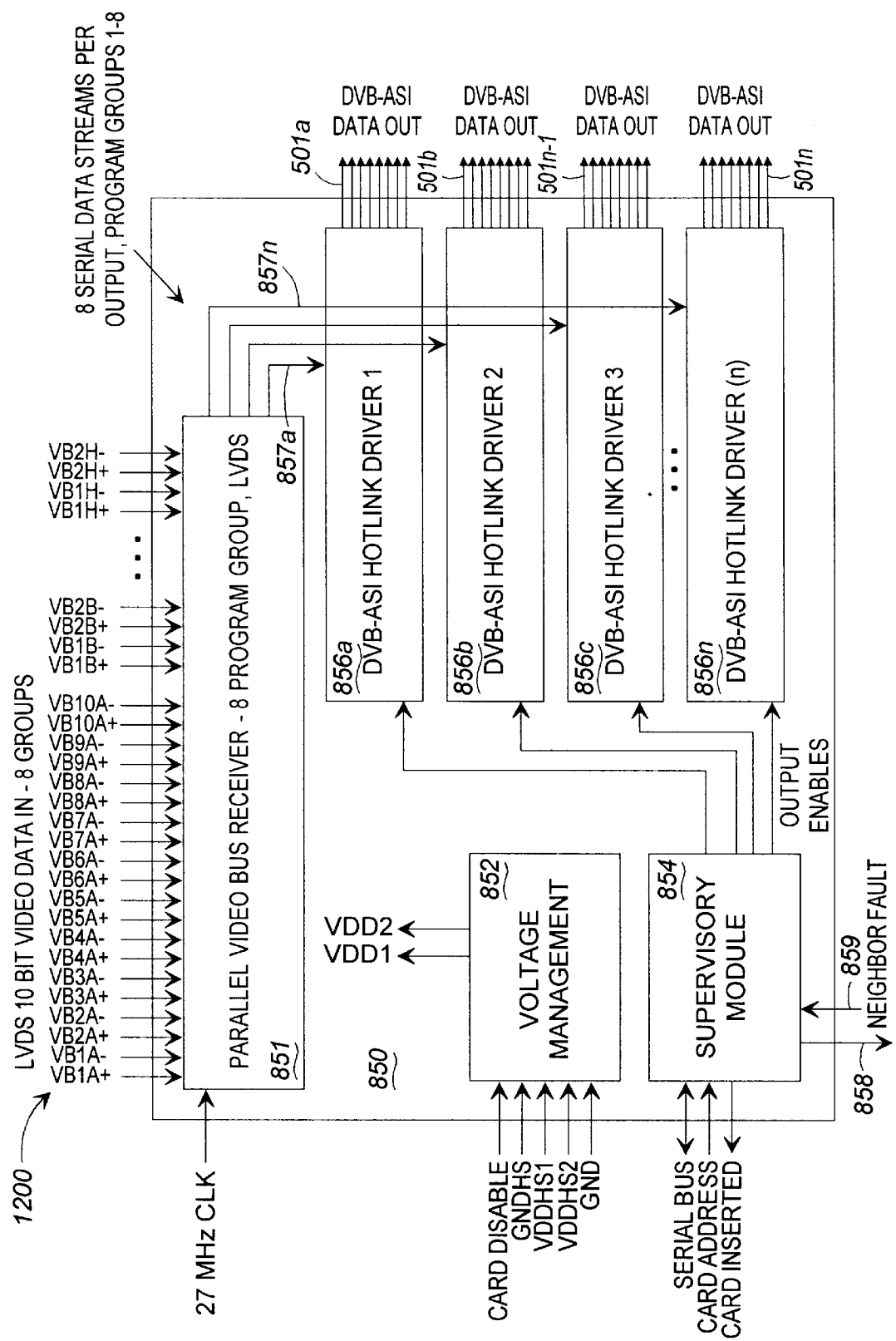
FIG. 11D  MULTIPLE VIDEO OUTPUT MODULE BLOCK DIAGRAM

TRANSPORT STREAM PACKET DEFINITION

```
transport_packet() { byte one:
    sync_byte[7:0]                      bits 7 though 0 byte two:
    transport_error_indicator           bit 7
    payload_unit_start_indicator        bit 6
    transport_priority                  bit 5
    PID[12:8] "PIDH"                    bits 4 through 0 byte three:
    PID[7:0] "PIDL"                     bits 7 through 0
    ....
}
```

PID FILTER USES BOLD VALUES TO DETERMINE WHICH PACKETS TO PASS

SYSTEM AND METHOD FOR THE DELIVERY OF DIGITAL VIDEO AND DATA OVER A COMMUNICATION CHANNEL

CROSS-REFERENCE TO RELATED APPLICATIONS

This document claims priority to and the benefit of the filing date of provisional patent application entitled DIGITAL VIDEO AND DATA SYSTEM, assigned Ser. No. 60/064,153, and filed Nov. 4, 1997 the text of which is hereby incorporated by reference, and is related to the following commonly assigned copending U.S. Patent Applications: COMPUTER SYSTEM AND METHOD FOR PROVIDING DIGITAL VIDEO AND DATA OVER A COMMUNICATION CHANNEL, filed on even date herewith, SYSTEM AND METHOD FOR MAINTAINING TIMING SYNCHRONIZATION IN A DIGITAL VIDEO NETWORK, filed on even date herewith, and APPARATUS AND METHOD FOR TRANSPORTING INFRARED AND RADIO FREQUENCY SIGNALS, filed on even date herewith, which are all hereby incorporated by reference.

TECHNICAL FIELD

The present invention relates generally to the delivery of digital video and data, and more particularly, to a system and method for the delivery of digital video and data over a communication channel.

BACKGROUND OF THE INVENTION

The delivery of digital video signals to a subscriber has been accomplished via many ways. For example, compressed digital video using the motion picture experts group (MPEG-2) compression/decompression methodology can be delivered using a variety of media including coaxial cable, fiber optic cable and satellite. Some of these delivery systems are considered "video-on-demand", or "near video-on-demand" in that a user, or subscriber, may select from a plurality of offerings and view a particular program as desired from time to time. In video-on-demand systems a user may select a program for viewing at any arbitrary time. In near video-on-demand systems, a user is typically given a choice of programming available at repeated specific times. Furthermore, broadcast video applies to programming that occurs with a daily or weekly schedule and is delivered to a wide number of subscribers at the same time.

These systems typically make available to the user all channels of programming from which the user selects the desired program, typically through the use of some sort of converter or decoder box located near a television set. For example, in a typical cable television system, all available programming is delivered to a user via a coaxial cable that terminates near the user's premises. The programming made available to each particular user is determined by the insertion of a filter, or a scrambler, between the supply cable and the user's premises. In this manner, the selection available to a user is controlled. In these cable television systems, a "pay-per-view" system is also available through the use of the converter box. If the user desires a particular program, the user contacts the cable service provider ahead of time in order to purchase that particular program.

In satellite digital video delivery systems a user, or subscriber, installs a small parabolic reflector and special electronics at the premises. These systems use the direct broadcast satellite "DBS" spectrum to deliver digital video signals to a user. In these systems, all of the available programming content is transmitted directly to all users from specialized satellites in geosynchronous earth orbit. Geosynchronous orbit refers to an orbit in which a satellite orbiting the earth remains in a fixed position relative to a point on the earth. A receiver unit located at the user premises decodes the data stream in order to extract the desired programming.

Each of the aforementioned digital video delivery systems have drawbacks. For example, in cable television systems, it is relatively easy to steal, or pirate, the signal from the cable located near the user premises. This allows an unauthorized user access to all programming available on the cable. Furthermore, historically, cable television systems suffer from reliability problems.

A satellite delivery system also has drawbacks. Because all of the available programming is simultaneously beamed to all subscribers, bandwidth allocation, and therefore, channel capacity, becomes critical. For example, during times when many sporting events or high action programming that contain fast motion are broadcast simultaneously, such as on Sunday afternoons during football season, additional bandwidth must be made available to certain channels. Because the amount of available bandwidth is fixed, this necessitates the reduction of bandwidth available for other channels. In addition, satellite delivery systems rely upon the proper installation of the parabolic reflector, which must have an unobstructed line of sight to the transmitting satellite or satellites, and suffer from signal degradation in inclement weather. Furthermore, as in cable television systems, or in any system in which all channels are delivered to all customers, it is possible to obtain unauthorized channels.

Other available systems make a number of video programs available to an end user by employing an asynchronous transmission network (ATM) over which a particular program may be delivered to an end user. Unfortunately, ATM systems are costly to implement and because these systems employ an ATM switching fabric, they can easily become overloaded if, for example, a large number of users chose to view a wide variety of programs.

Thus, a heretofore unaddressed need exists in the industry to address the aforementioned deficiencies and inadequacies.

SUMMARY OF THE INVENTION

The present invention provides a system and method for the delivery of digital video, bi-directional data, such as Internet data, and plain old telephone service (POTS).

Briefly described, in architecture, the system can be implemented as follows. A system for delivering digital video and data over a communication channel comprises a programming center configured to receive a plurality of video signals and at least one bi-directional data signal. A central office in communication with the programming center is configured to receive the plurality of video signals and place the plurality of video signals simultaneously on a bus. The central office is also configured to deliver at least one of the plurality of video signals and supports communication of at least one bi-directional data signal to at least one end user over a communications channel.

The present invention can also be viewed as providing a method for providing a plurality of video channels and bi-directional data over a communication channel. In this regard, the method can be broadly summarized by the following steps: a plurality of video channels are simultaneously placed on a bus; a request from a user for at least one of the plurality of video channels is received; the request is processed in order to determine whether the user is authorized to receive at least one of the plurality of video channels; and at least one of the plurality of video channels is delivered over a communications channel to the user if the user is authorized to receive the at least one of the plurality of video channels.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 10B is a block diagram illustrating the video network interface module of FIG. 10A;

FIG. 11D is a block diagram illustrating the multiple video output module of FIG. 11A;

FIG. 22 is an excerpt from the MPEG-2 transport stream specification defining the first three bytes of the transport stream packet of FIGS. 20A, 20B and 21;

DETAILED DESCRIPTION OF THE INVENTION

The digital video and data delivery program of the present invention can be implemented in hardware, software, firmware, or a combination thereof. In the preferred embodiment(s), the digital video and data delivery program is implemented in hardware that is managed by software or firmware that is stored in a memory and that is executed by a suitable instruction execution system.

Figure 4:
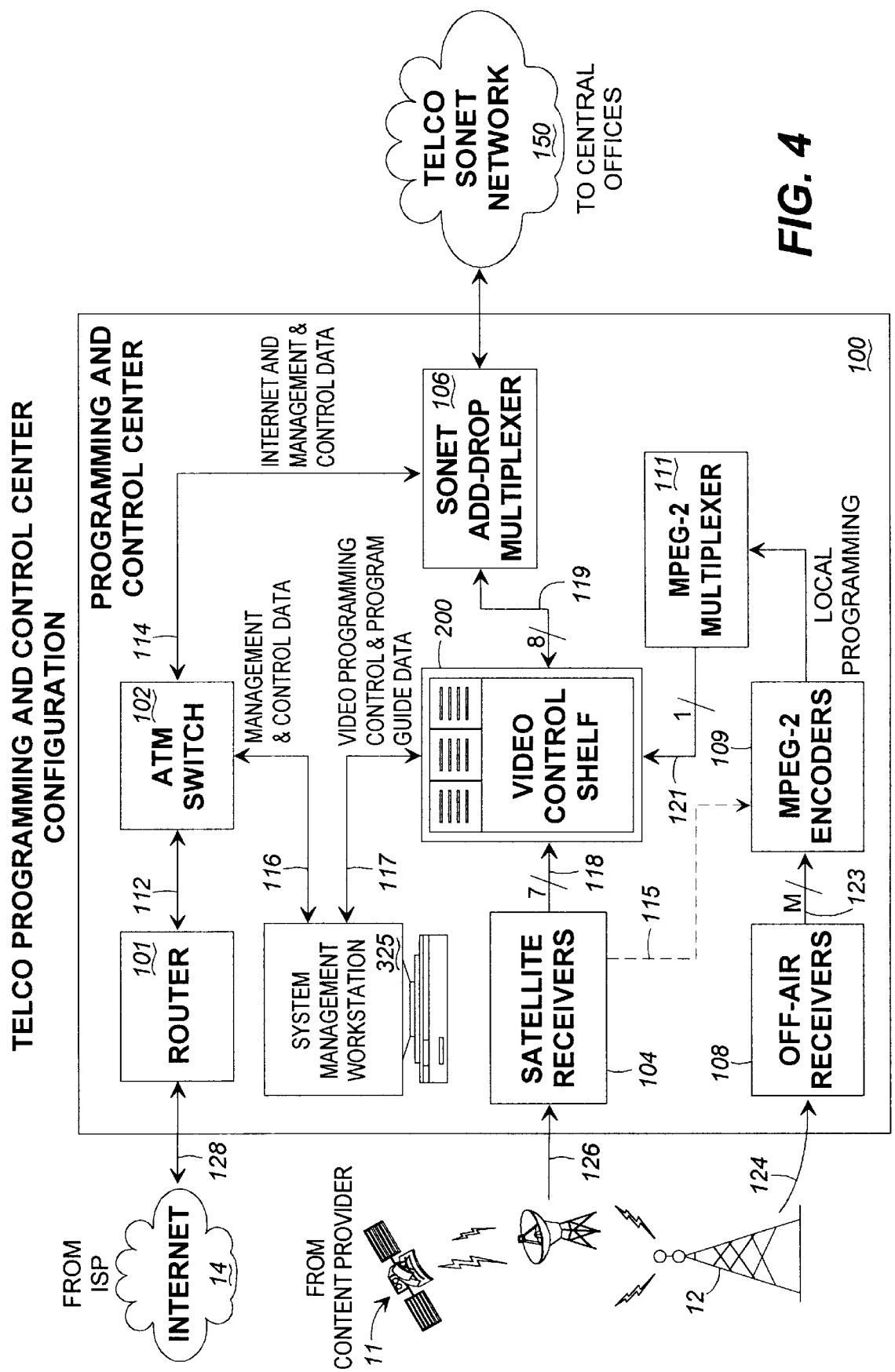
FIG. 4 is a block diagram illustrating the components of the present invention that reside within the telco programming and control center.
Figure 8:
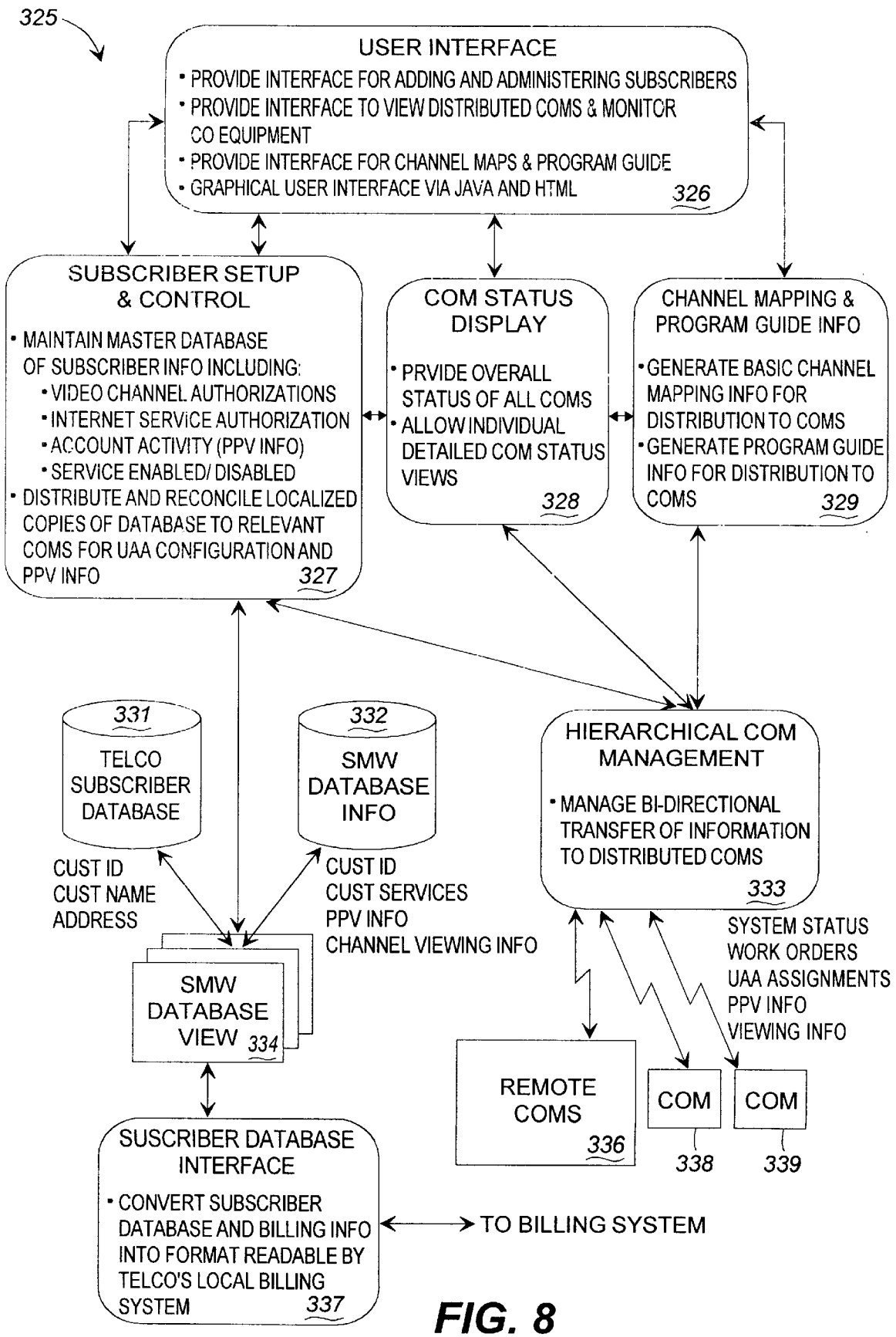
FIG. 8 is a flow diagram illustrating the architecture, functionality, and operation of a possible implementation of the system management workstation of FIG. 4.
Figure 9:
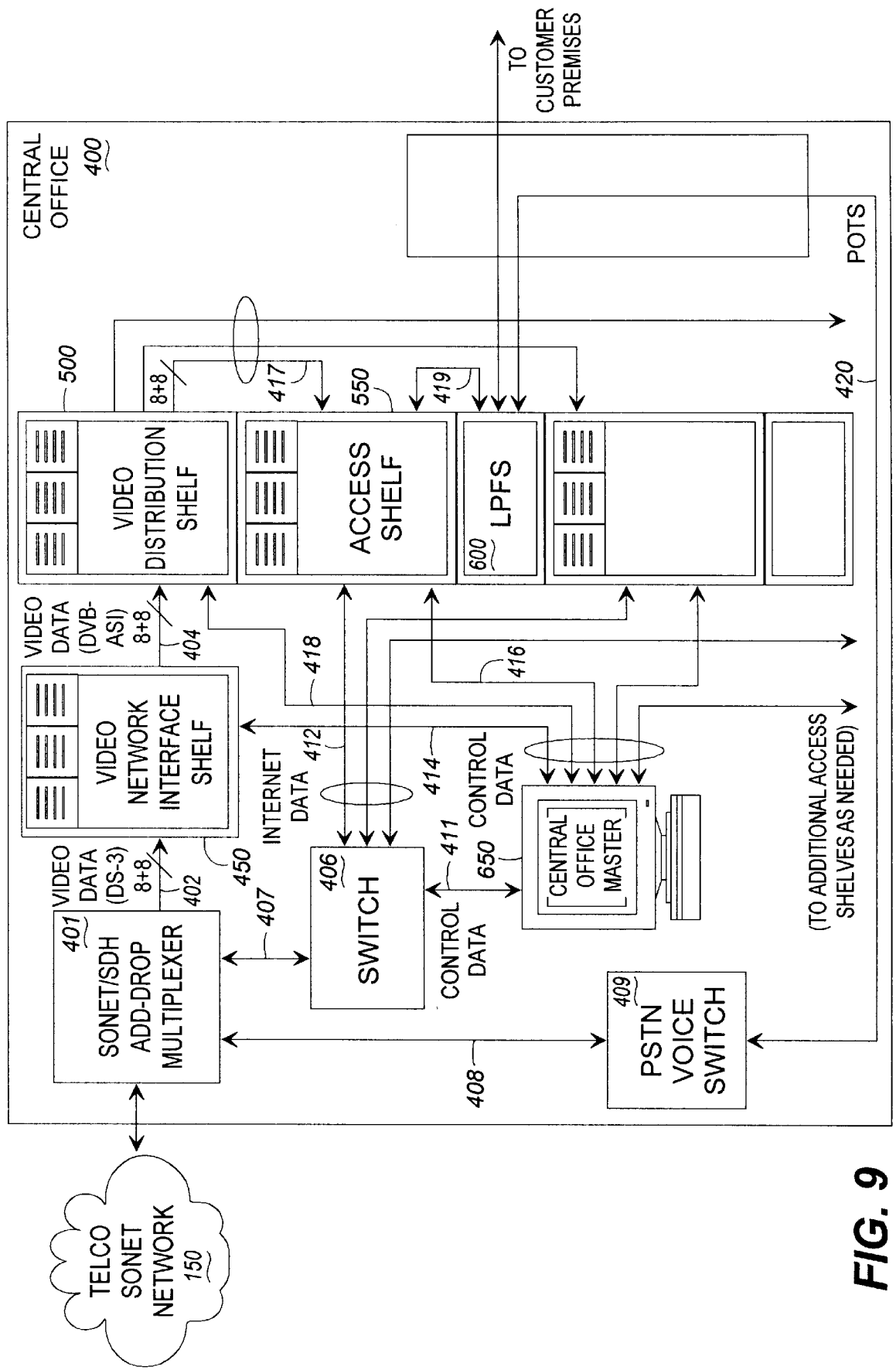
FIG. 9 is a schematic view illustrating the architecture of central office.
Figure 15:
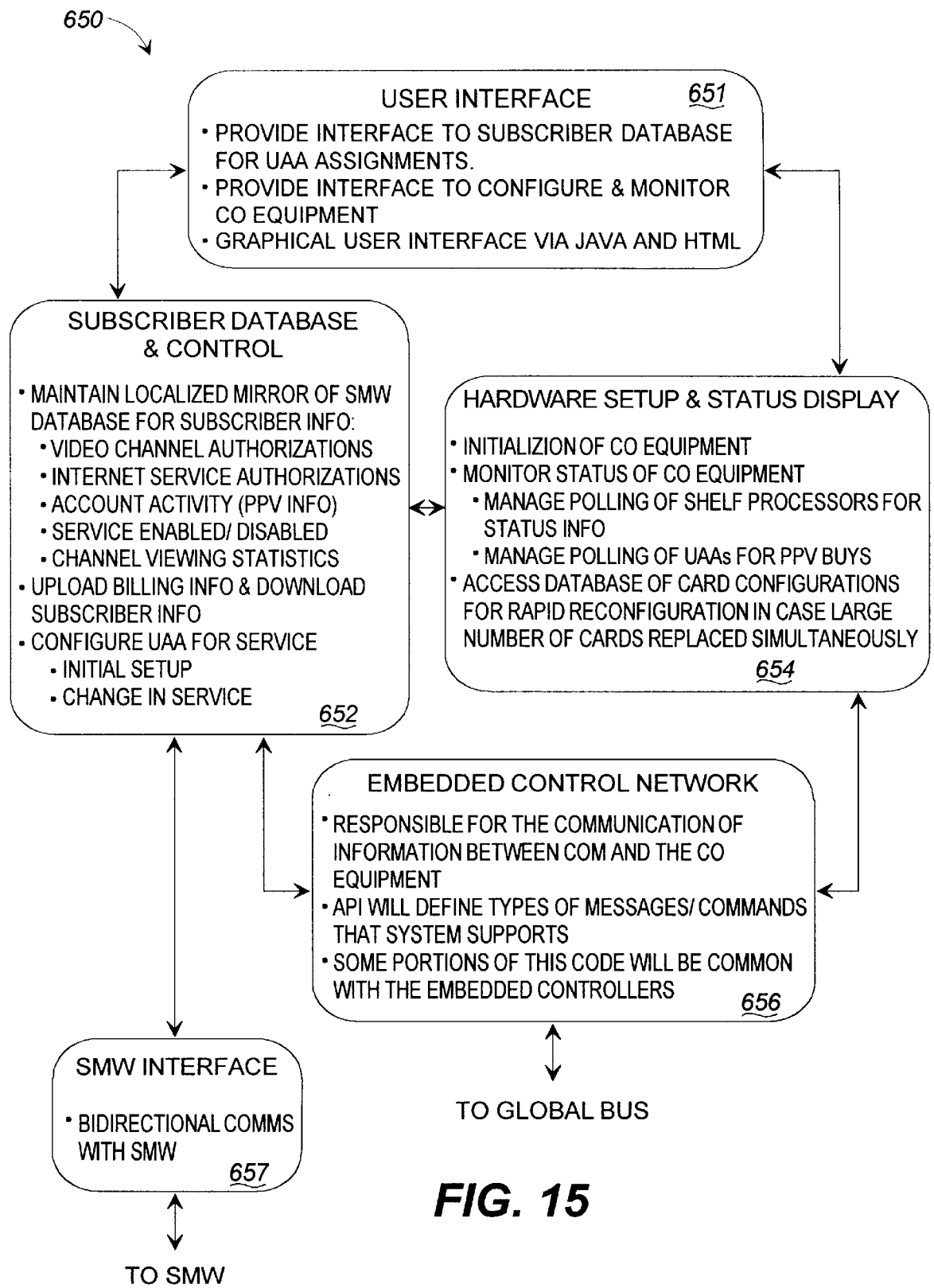
FIG. 15 is a flow diagram of central office master workstation of FIG. 9.

The flow chart of FIGS. 8 and 15 show the architecture, functionality, and operation of a possible implementation of the system management workstation of FIG. 4 and the central office master workstation of FIG. 9. In this regard, each block represents a module, segment, or portion of code, which comprises one or more executable instructions for implementing the specified logical function(s). It should also be noted that in some alternative implementations, the functions noted in the blocks may occur out of the order noted in FIGS. 8 and 15. For example, two blocks shown in succession in FIGS. 8 and 15 may in fact be executed substantially concurrently or the blocks may sometimes be executed in the reverse order, depending upon the functionality involved, as will be further clarified hereinbelow.

The digital video and data delivery program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1A:
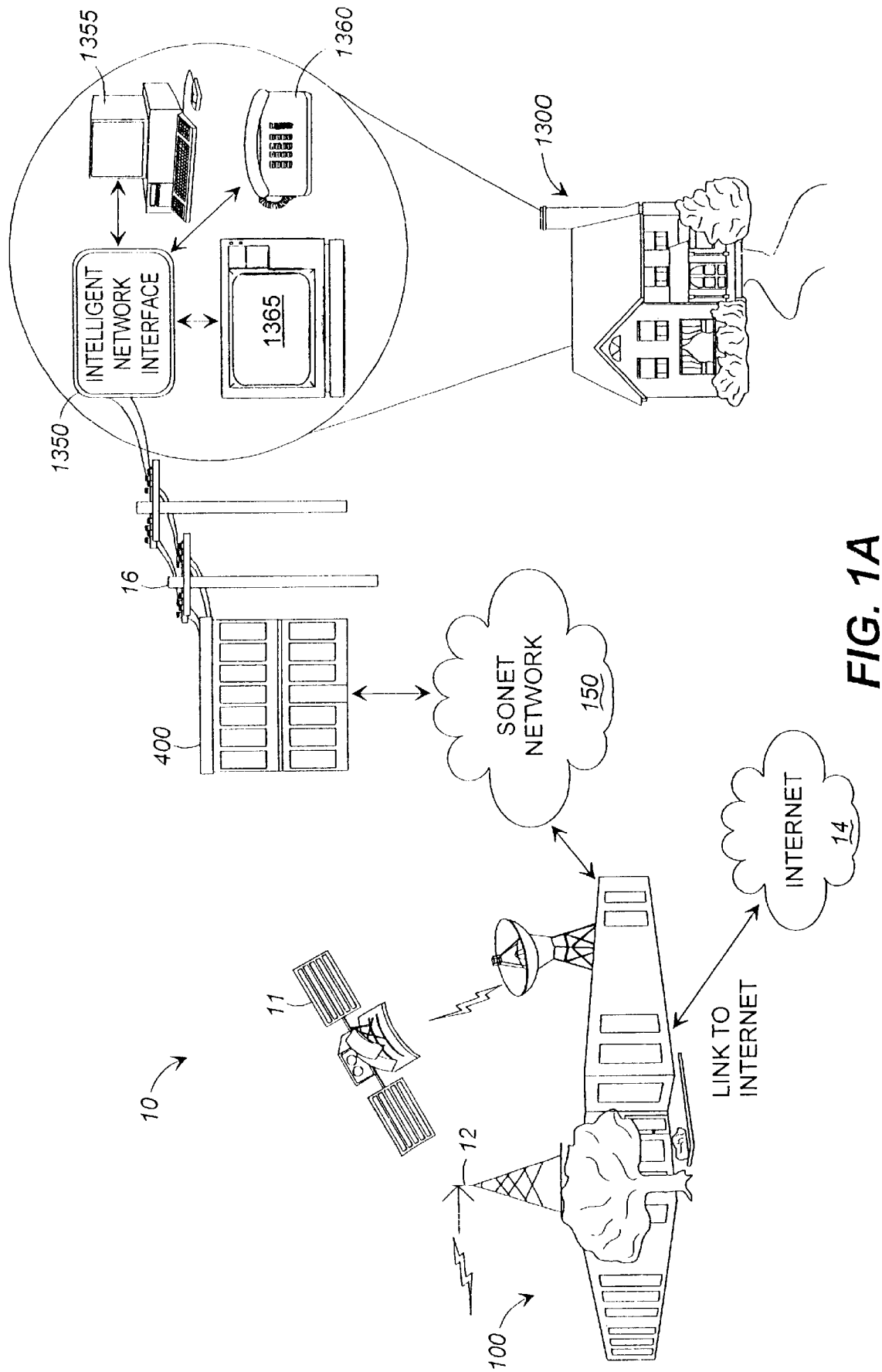
FIG. 1A is a high level system view illustrating the overall topology in which the digital video and data delivery system of the present invention resides.

FIG. 1A is a high level system view illustrating the overall topology in which the digital video and data delivery system of the present invention resides. Included in system topology 10 are telephone company programming and control center (TPCC) 100, central office 400, and customer premises 1300. TPCC 100 receives input from local broadcaster 12, which provides broadcast television signals, content provider 11, which provides digital video signals in the form of MPEG-2 encoded video, and data from Internet service provider (ISP) 14. While illustrated herein as transporting Internet data, indeed any data, such as for example but not limited to local area network (LAN) or any digital data may be transported in accordance with the present invention. TPCC 100 communicates with central office 400 over SONET network (synchronous optical network) 150. While a single central office is shown for simplicity, TPCC 100 may communicate with a plurality of central office locations 400 over SONET network 150. SONET network 150 represents one manner in which a TPCC may communicate with central office locations and is typically the internal telephone company network that connects multiple central offices with each TPCC. SONET network 150 is used for illustrative purposes only. Other internal networks, such as, for example but not limited to, an SDH (synchronous digital hierarchy) network or any method of communicating between TPCC 100 and central office locations 400 may be used to communicate between TPCC 100 and central office 400. Central office 400 communicates with customer premises 1300 over communication channel 16. Communication channel 16 can be any communication channel capable of supporting the communication of compressed digital video, bi-directional Internet data and POTS, and is illustratively carried over the copper wire pair over which conventional telephone signals are communicated. Other communication channels, for example but not limited to a wireless communication channel such as an LMDS (local multipoint distribution system), may be used to communicate between central office 400 and customer premises 1300. Located at customer premises 1300 are intelligent network interface (INI) 1350 to which are connected computer system 1355, telephone 1360, fax machine (not shown), and television 1365. It is also possible to provide an additional digital telephony communication line to which may be connected a fax machine. The digital video and data delivery system and method of the present invention operate to allow TPCC 100 to deliver to central office 400, and central office 400 to deliver to customer premises 1300 over a communication channel 16, compressed digital programming, bi-directional Internet data, and POTS.

Figure 1B:
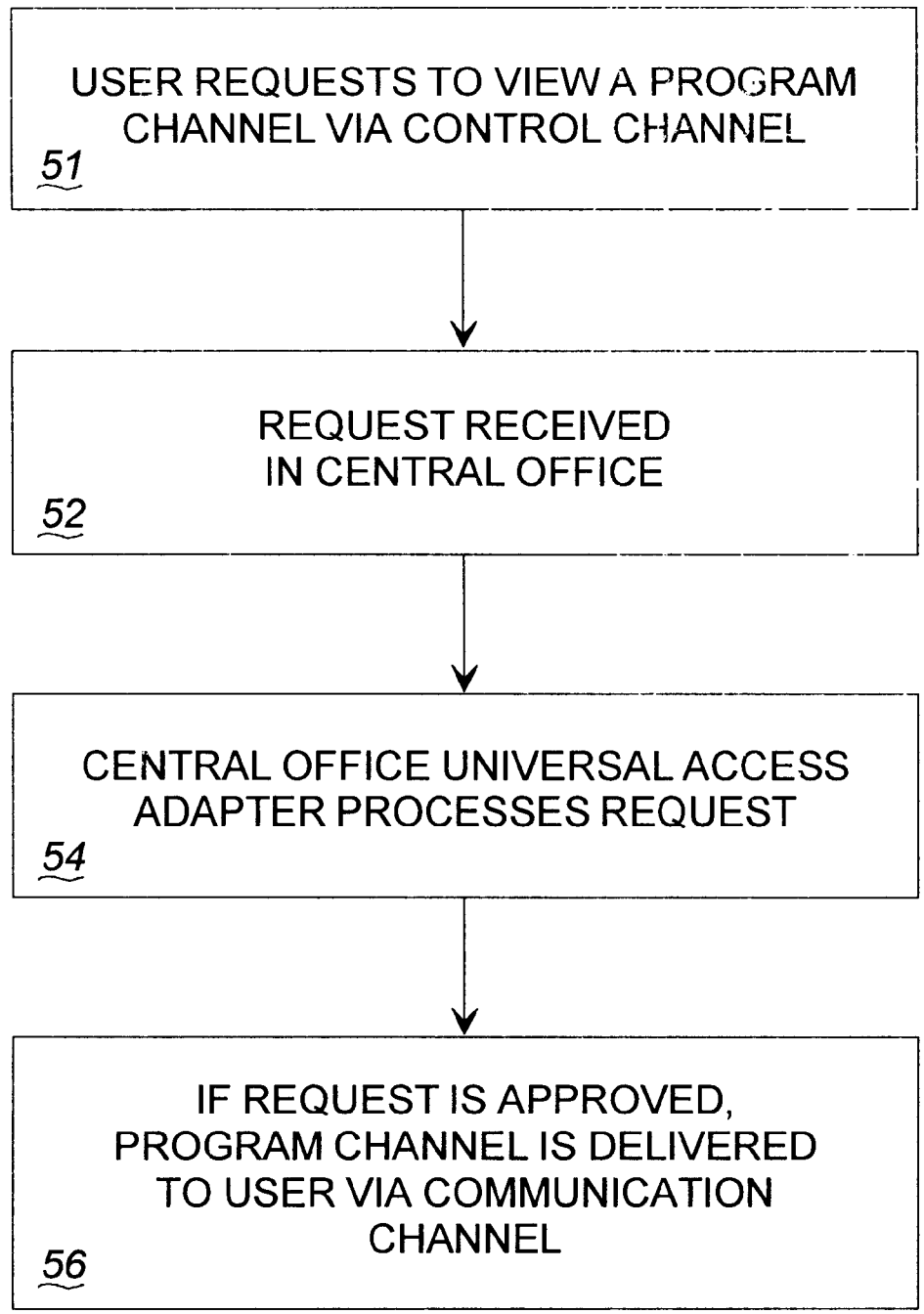
FIG. 1B is a flow chart illustrating the manner in which a user requests a program via the system topology of FIG. 1A.

FIG. 1B is a flow chart illustrating the manner in which a user requests a program via the system topology of FIG. 1A. In block 51 a user sends a request to central office 400 to view a particular program. The request is sent via a control channel (to be described in detail below) over communication channel 16. In block 52 the request is received in central office 400. In block 54 a central office universal access adapter (UAA), which handles the request using tables supplied to it by a central office master workstation that informs the UAA what is authorized, processes the request and in block 56, if the user is authorized to receive the requested program, the program is delivered to the user from central office 400 via communication channel 16.

Figure 2:
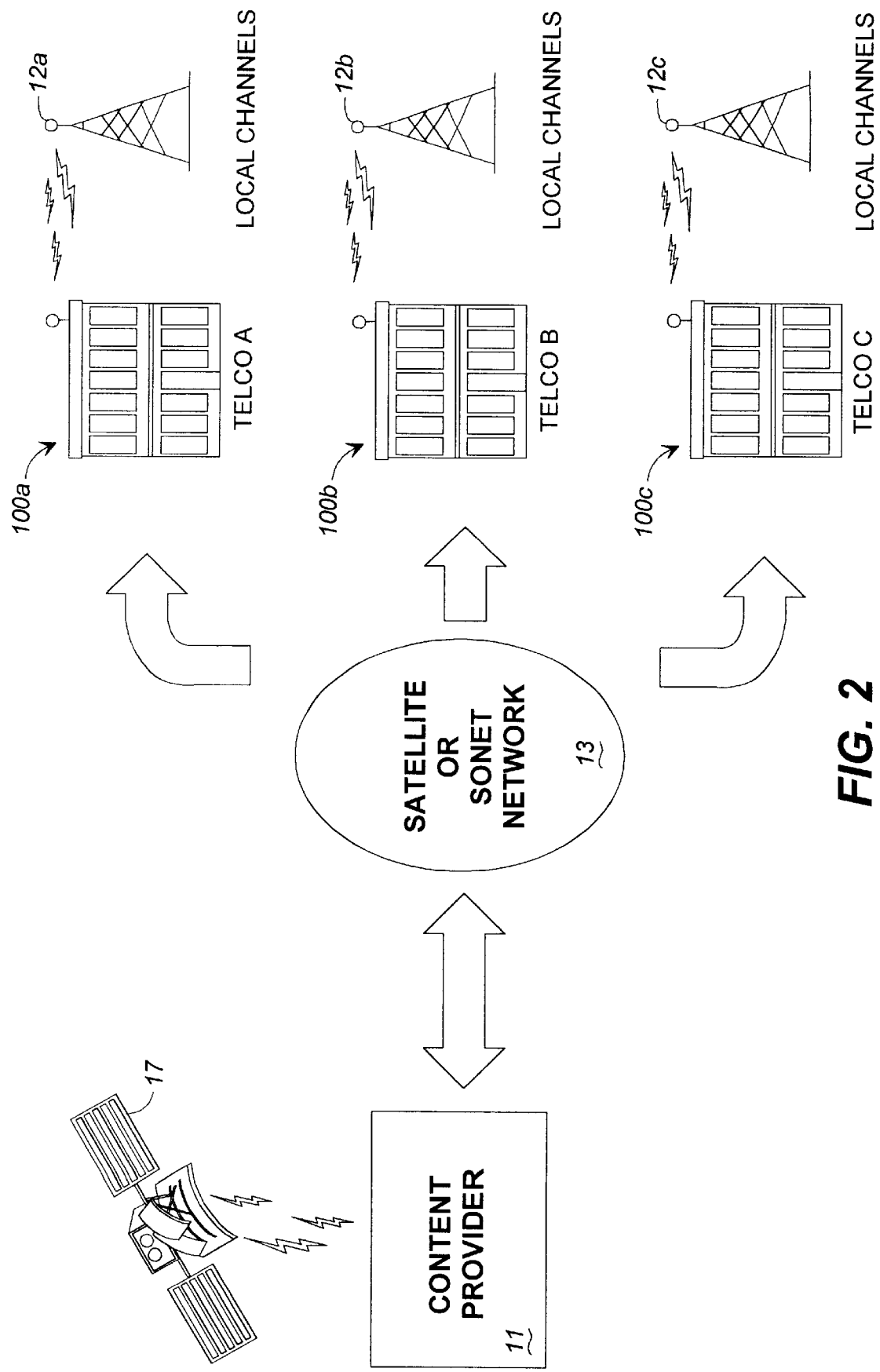
FIG. 2 is a schematic view illustrating the delivery of digital video from a content provider to a telco programming and control center.

FIG. 2 is a schematic view illustrating the delivery of video content from content provider 11 to TPCC 100. Content provider 11 receives an analog video signal illustratively via satellite 17. Alternatively, content provider 11 receives digitally encoded video signals illustratively via satellite 17. It should be understood that audio content accompanies the video signals referred to herein, and when referring to video, or compressed digital video, it is understood that the audio signal is included. Content provider 11 delivers the analog (or digital) video signals over network 13 to a plurality of TPCCs 100. Network 13 can be, for example but not limited to, a satellite delivery network or possibly a SONET network similar to SONET network 150 of FIG. 1. TPCCs 100 receive local broadcast video programming from local broadcasters 12.

Figure 3:
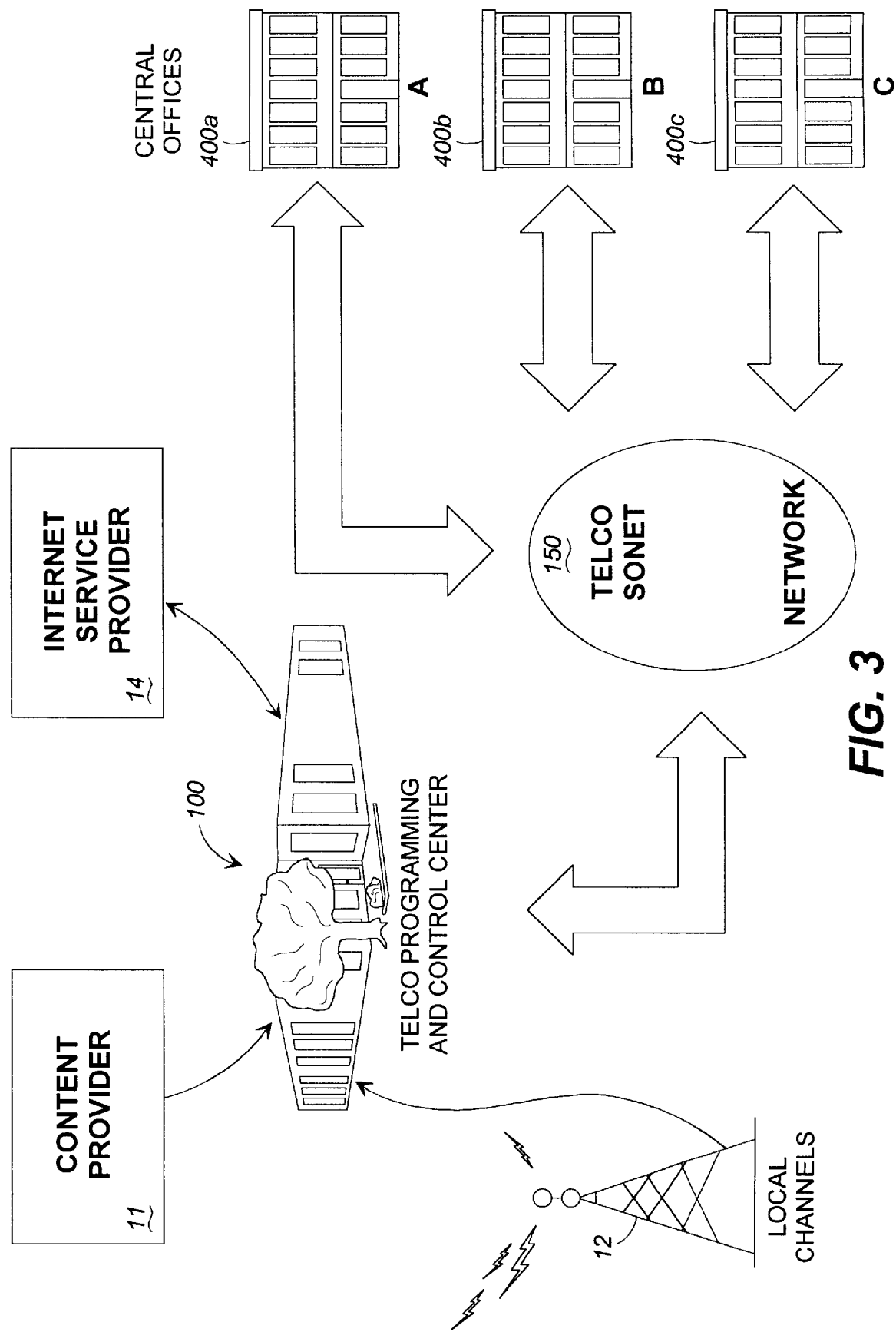
FIG. 3 is a schematic view illustrating the architecture that connects the telco programming and control center to a central office.

FIG. 3 is a schematic view illustrating the architecture that connects TPCC 100 to central offices 400. As discussed above, TPCC 100 receives video, in the form of an analog or a digital signal from content provider 11, local broadcast television from local broadcaster 12, and Internet data from ISP 14. TPCC 100 integrates the aforementioned content and provides it to central offices 400 over Telco SONET network 150, or via any network used to communicate between TPCC 100 and central office locations 400.

FIG. 4 is a block diagram illustrating the components of the present invention that reside within TPCC 100. Within TPCC 100 bi-directional data from ISP 14, video content from content provider 11 (of FIGS. 1 and 2) and local programming from local broadcaster 12 are combined. Bi-directional Internet data are supplied from ISP 14 over connection 128 to router 101. Router 101 communicates over connection 112 with ATM switch 102, which communicates with SONET add-drop multiplexer 106 over connection 114. SONET add-drop mux 106 is shown for illustrative purposes only, and would be an SHD multiplexer if an SDH network were implemented in place of SONET network 150. In this manner, Internet data are processed by TPC 100 and forwarded to central offices 400 over SONET network 150. Also communicated over connection 114 are management and control data from system management workstation 325, which will be described in detail below. Video content is supplied from content provider 11 over connection 126 to satellite receiver 104. If the video content supplied from content provider 11 is in the form of an analog signal, then it is supplied over connection 115 to MPEG-2 encoder 109 for conversion to MPEG-2 format. Although MPEG-2 is used in the preferred embodiment, any digital compression technique may be used to generate the compressed digital video signal. If the video content supplied by content provider 11 is in the form of a digital signal, then it is supplied directly to video control shelf 200 via connection 118. Connection 118 is illustratively a plurality of DS-3 connections and in the preferred embodiment is a total of seven (7) DS-3 connections. A DS-3 connection provides approximately 45 megabits/second (Mb/s) of data transfer, and is used herein illustratively.

Indeed, connection 118 can be made up of a plurality of any high capacity channel, for example but not limited to, an OC-3 connection, which provides approximately 155 megabits of capacity. Local programming from local broadcaster 12 is supplied over connection 124 to off-air demodulator 108, which communicates over connection 123 with MPEG-2 encoder 109. MPEG-2 encoder 109 receives the off-air broadcast signal and converts it into a digital video format in accordance with the MPEG-2 video standard for the preferred embodiment. Although illustrated as single items, in reality, a plurality of off-air demodulators and MPEG-2 encoder are employed. The MPEG-2 signal is supplied over connection 122 to MPEG-2 multiplexer 11. MPEG-2 multiplexer 111 supplies the now MPEG-2 encoded off-air video signal over connection 121 to video control shelf 200. Connection 121 is illustratively another connection capable of delivering an MPEG-2 digital video signal, and is illustratively a DS-3 connection.

Also connected to video control shelf 200 over connection 117 is system management workstation (SMW) 325. SMW 325 provides supervisory, management and control functions for TPCC 100 and will be discussed in detail with reference to FIG. 8. SMW 325 also connects to ATM switch 102 over connection 116, whereby management and control information is sent through ATM switch 102 and over connection 14 to SONET add/drop mux 106 for placement on SONET network 150. In this manner, management and control information is delivered to and received from central office 400.

Video control shelf 200 inserts local program guide and control information into the digital video program by replacing a null MPEG-2 packet that is not used to transport video data. This local program guide information comes from SMW 325, the workstation responsible for monitoring and controlling the digital video and data delivery system. The program guide database is received from a centralized provider or may be locally generated. Video control shelf 200 can also be used to insert software update data for customer premise information by replacing a null MPEG-2 packet that is not used to transport video data. The video programming with the newly inserted data then enters the telephone company (telco) private SONET network 150 via SONET add-drop mux 106. Router 101 isolates the internal telco data delivery network from the Internet, routing only the appropriate packets to ISP 14. ATM switch 102 provides a robust interconnection to the switches in the individual central offices 400 providing Internet data to the system. Furthermore, router 101 and ATM switch 102 exchange Internet data in both upstream (from customer premise toward central office to TPCC) and downstream (from TPCC to central office, to customer premise) directions.

Figure 5:
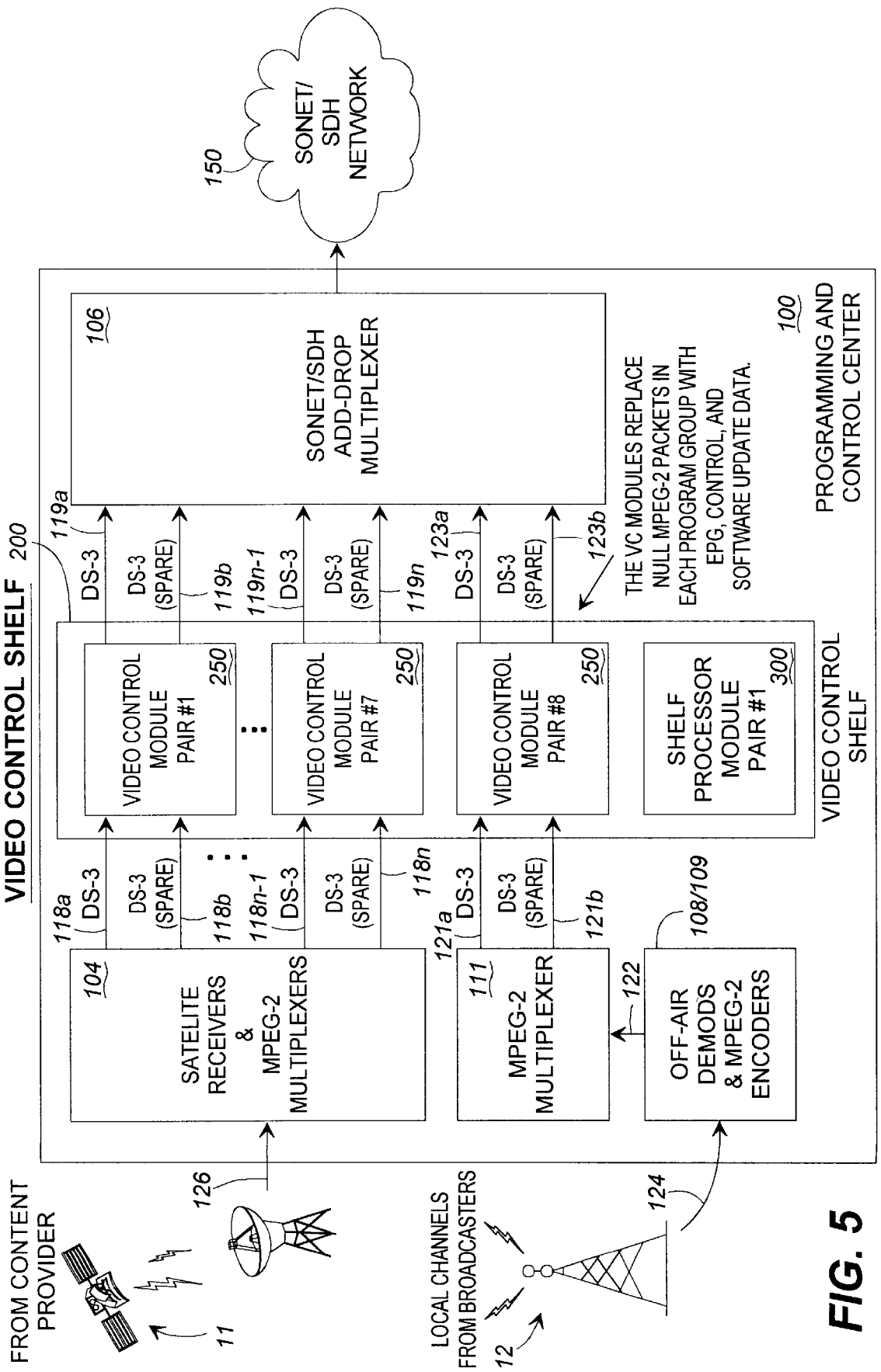
FIG. 5 is a block diagram illustrating the video control shelf of FIG. 4.

FIG. 5 is a block diagram illustrating the video control shelf 200 of FIG. 4. Video control shelf 200 includes a plurality of video control module pairs 250 and shelf processor module pair 300. In the discussion and figures to follow reference is made to module pairs. The term module pairs refers to an active and a standby module each configured to execute the functionality described. Each module of the pair is supplied with the input signal and each module is capable of supplying the output signal. The standby module will perform the functionality described if the active module experiences a failure. Furthermore, in the discussion to follow, the term "hotswap" refers to the ability to replace a module in a system without removing power to the system in which the module is installed. Satellite receiver 104, which includes a plurality of MPEG-2 multiplexers 111, receive network feeds from content provider 11 over connection 126. MPEG-2 multiplexers 111 interface a plurality of DS-3 connections 118a through 118n each DS-3 having a spare, with video control shelf 200. Each DS-3 connection 118 connects to a video control module 250, with each DS-3 spare connecting to a spare video control module 250. Video control module pair 250 includes an active video control module and a standby video control module, with a spare DS-3 connected to the standby video control module. MPEG-2 multiplexer 111 also connects via a DS-3 connection to a video control module pair 250.

The output of each video control module pair 250 is provided via DS-3 connection 119 to SONET add-drop multiplexer 106. Also included in video control shelf 200 is shelf processor module pair 300. The operation of video control module 250 will be discussed in detail with reference to FIG. 6 and the operation of shelf processor module 300 will be discussed in detail with reference to FIG. 7. The digital video and data delivery system of the present invention currently supports up to eight digital video program groups, however, it is foreseeable that in the future additional program groups may be supported. A program group is defined as a single MPEG-2 transport stream containing numerous channels carried over a single network connection, such as a DS-3 or OC-3 connection. Thus, up to eight program groups are supported by video control shelf 200. This means that each DS-3 connection, for example 118 and 119, carries one program group.

A program group transported via DS-3 can contain roughly ten channels, while a group transported via OC-3 can contain roughly 35 channels. This indicates a system channel capacity of 80 channels for implementations using DS-3, and a maximum channel capacity of approximately 280 channels for systems implemented using the OC-3 connection. At least one group (and possibly more) will contain local channels, as illustrated by DS-3 connection 121 and DS-3 connection 123 connecting video control module pair number 8 to SONET add/drop multiplexer 106. The remaining connections comprising, for this preferred embodiment, seven program groups will contain video programming from other sources as illustrated by DS-3 connections 118 and 119. Program groups can be multiplexed together to increase overall channel capacity. For example, two half-full DS-3 groups can be combined together, freeing an entire DS-3 for additional programming.

Figure 6:
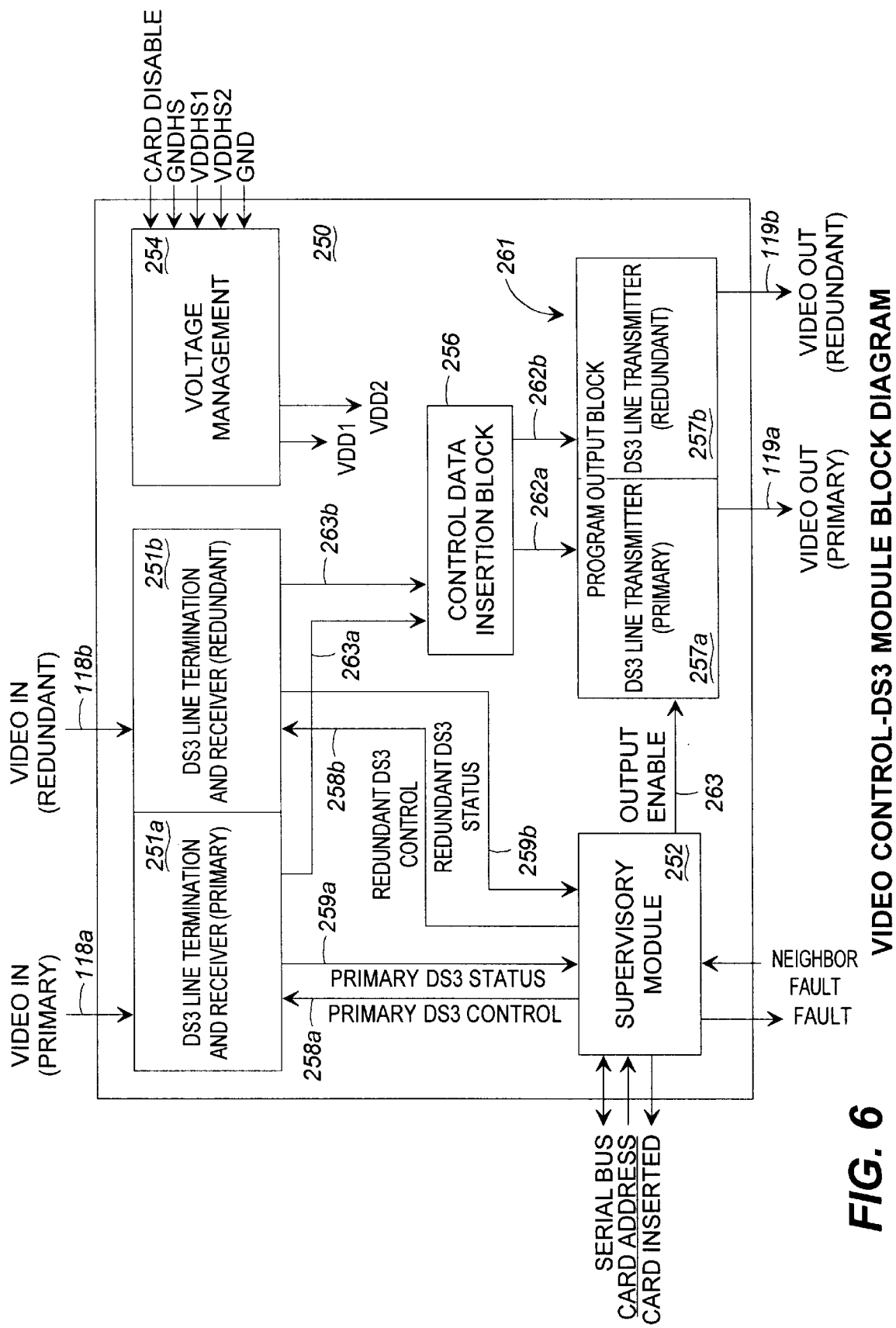
FIG. 6 is a block diagram illustrating the video control module of FIG. 5.

FIG. 6 is a block diagram illustrating the video control module 250 of FIG. 5. Video control module pair 250 receives the DS3 data streams on lines 118a and 118b, the input on line 118a being the primary and the input on line 118b being the secondary or redundant video supply corresponding to that illustrated in FIG. 5. These data streams contain the encoded MPEG-2 video streams. Video control module 250 replaces null MPEG-2 packets in each program group with control and software update data. The program group including additional data, such as the program guide and the software update data is then sent via both DS-3 links 119a and 119b to video network interface shelf 450. Each video control module 250 contains a primary DS3 line termination and receiver 251a and a redundant DS3 line termination and receiver device 251b. The DS3 line receivers extract the payload data from the incoming bit stream and prepare the information for delivery to the control data insertion block 256. Both receivers 251a and 251b are always active allowing redundancy at the input link. The onboard supervisory module 252 monitors the status of the receivers over connections 259a and 259b and determines which line receiver signal will be used to drive the serial feed to the control data insertion block 256. Supervisory module 252 sends control signals to primary DS3 line termination and receiver 251a and a redundant DS3 line termination and receiver device 251b over connections 259a and 259b, respectively. The control data insertion block 256 is responsible for inserting local control data into the incoming MPEG-2 stream arriving from the content provider. Program guide data and possibly software update data for the INI 1350 is inserted by replacing null packets with the necessary data. The serial data received from the control data insertion block 256 contains both the MPEG-2 video data and the additional control data. Control data, software update data and program guide data are all inserted into the program group in the same way. The new data stream is used as input over connections 262a and 262b to program output block 261, which contains primary DS3 line transmitter 257a and redundant DS3 line transmitter 257b, which form a redundant link to the video network interface shelf 450. If supervisory module 252 has asserted the output enable line 263, both primary DS3 line transmitter 257a and redundant DS3 line transmitter 257b are enabled. The primary video signal is output on line 119a and the redundant video signal is output on line 119b.

Supervisory module 252 is responsible for proper operation of video control module 250. Supervisory module 252 performs set up and initialization of all other functional blocks on video control module 250 and monitors the status of each function. Supervisory module 252 maintains communication with shelf processor module 300 and is responsible for active/stand-by redundancy control. If the video control module 250 experiences a catastrophic failure, supervisory module 252 changes the module to the inactive state and alerts the shelf processor 300 over connection 269 the next time it is polled for status information. Because the video control module 250 is designed for active/stand-by redundancy, they are expected to be installed in pairs. Each monitors the fault indicator of its redundant neighbor over connection 271 and will go active immediately upon failure of the active module. Voltage management module 254 is responsible for hotswap capabilities and power management. Hotswap capability refers to the ability to remove one of a pair of failed video control modules without powering down the video control shelf in which they reside.

Figure 7:
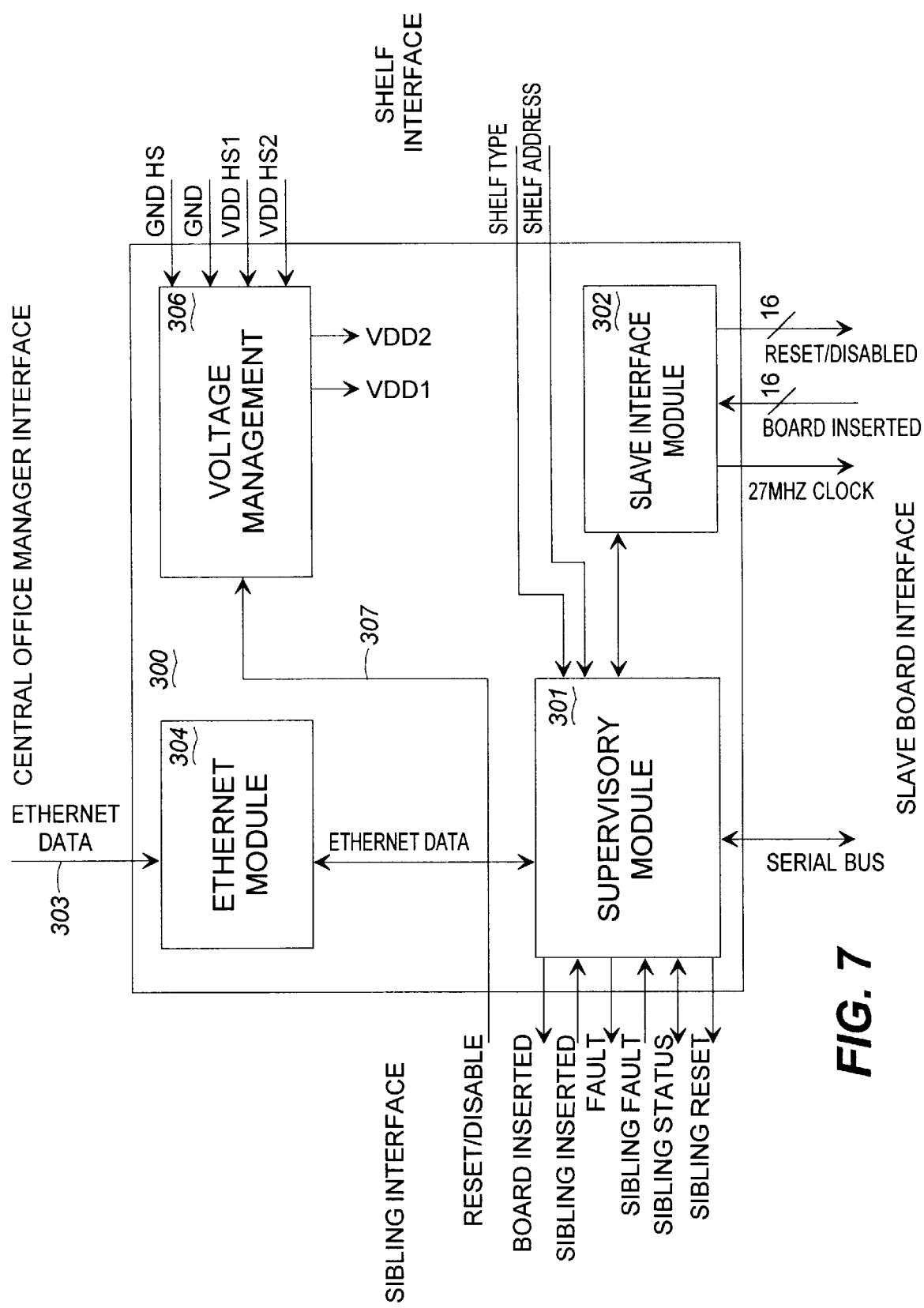
FIG. 7 is a schematic view illustrating the shelf processor module of FIG. 5.

FIG. 7 is a schematic view of the shelf processor module 300 of FIG. 5. Shelf processor module 300 provides redundant control and monitoring of the shelf in which it is installed. Shelf processor modules reside in multiple applications and include firmware which enables the operation of the shelf processor module for each particular application for which it is installed. For example, while the same shelf processor module resides in both the video control shelf 200 and in the video network interface shelf 450 (to be described with reference to FIG. 10), the shelf processor modules perform different functions depending on the shelf in which installed. These different operations are determined by the firmware installed in the shelf processor module and based upon in which application the module is installed. Each shelf processor module will include firmware for all possible applications. The firmware installed in each shelf processor module will determine the shelf in which the module is installed and will execute the appropriate segment of the firmware code. Shelf processor module 300 passes configuration information to and from the central office master (COM) workstation 650 over connection 303 to any circuit board installed in the same shelf and gathers status regarding all boards installed for transfer back to the COM 650. Shelf processor module 300 stores configuration data for each board, detects the installation and replacement of boards and configures new boards automatically without COM 650 involvement. Shelf processor module 300 is used in many applications and in all shelves of the digital video and data delivery system and contains appropriate software and firmware to execute different functionality depending upon where it is installed. Shelf processor module 300 configures itself appropriately during power up based on the shelf type and/or shelf address read from the system backplane. The shelf address may be a value assigned by the central office master workstation (to be described with reference to FIG. 9) or may be manually selected through the use of a switch. Two shelf processor modules will be installed in each shelf. Only one will be active at a time, the other remains in stand-by mode. The stand-by shelf processor will have access to all the status and configuration information for the shelf and will be prepared to automatically take over from the active shelf processor if the active shelf processor experiences a failure. The shelf processor consists of four main functional blocks, the supervisory module 301, the slave interface module 302, the Ethernet module 304, and the voltage management module 306. The supervisory module 301 is an embedded microprocessor with its associated memory and supporting logic. Supervisory module 301 supports redundancy by way of several links to its sibling shelf processor including hardware indicators for various faults and board presence. Also included in supervisory module 301 is a bank of dual ported registers for communicating state, self-test results, slave board reset status, and other status information. It is capable of resetting and being reset by its sibling shelf processor module 300. It uses a bi-directional serial bus to communicate command and status with the slave boards in the shelf.

The slave interface module 302 detects the presence of each of the slave boards in the shelf, and whether a board has been removed and reinstalled. A slave board is any board that is located within any of the shelves described herein. Slave interface module 302 has a reset line for each slave board which can be pulsed to reset the board or held to completely disable it. Ethernet module 304 provides the means by which shelf processor module 300 communicates with COM workstation 650 via a 10base T Ethernet port over connection 303. Voltage management module 306 allows live insertion and removal of shelf processor module 300. It provides controlled ramp up of +5 VDC and +3.3 VDC power. It also provides an output to disable backplane input/output until power has stabilized. It also automatically shuts off power to the board and indicates a fault when it detects an over current condition. Voltage management module 306 also interrupts board power when the reset line 307 is asserted.

FIG. 8 is a flow diagram illustrating the architecture, functionality and operation of a possible implementation of the system management work station (SMW 325) functions of FIG. 4. In this regard, each block represents a module, segment, or portion of code, which comprises one or more executable instructions for implementing the specified logical function(s). It should also be noted that in some alternative implementations, the functions noted in the blocks may occur out of the order noted in FIG. 8. For example, two blocks shown in succession in FIG. 8 may in fact be executed substantially concurrently or the blocks may sometimes be executed in the reverse order, depending upon the functionality involved, as will be further clarified below. In block 326 the user interface allows access to SMW subscriber database view 334, central office master (COM) status, or program guide utility. User interface provides the interface for adding and administering subscribers, providing the interface with which to view the distributed COMs and monitor central office equipment, provides interface for channel maps and program guides, and provides the graphical user interface via, for example, Java and hypertext mark-up language (HTML). Other programming standards may be used to implement the graphical user interface, Java and HTML chosen for the preferred embodiment due to the advantage of portability to many different hardware platforms which may be used to implement the system management workstation and the central office master workstation. The central office master, or COM workstation, is the computer system that resides within each telco central office 400, and will be described in detail below.

In block 327, the subscriber setup and control module maintains the master database of subscriber information including the following. Video channel access authorizations, Internet service authorization, account activity (pay per view (PPV) information) and service enabling and disabling. The subscriber setup and control block 327 also distributes and reconciles localized copies of the database to relevant COMs for universal access adapter (UAA) configuration and PPV information. Also interfacing with user interface 326 and subscriber setup and control module 327 is COM status display module 328. COM status display module 328 provides overall status of all COMs and allows individual detailed COM status views.

Module 329 includes channel mapping and program guide information which generates basic channel mapping information for distribution to each COM and generates program guide information for distribution to each COM. Subscriber setup and control module 327 also interfaces with SMW database view 334, which in turn interfaces with telco subscriber database 331 and SMW database 332. SMW database view 334 also interfaces to subscriber database interface module 337. Telco subscriber database 331 contains customer information including customer name and address and SMW database information contains customer identification information pertaining to customer services, pay per view information and channel viewing information. Subscriber database interface 337 converts a subscriber database and billing information into a format that is readable by the telco's local billing system. Hierarchical COM management module 333 communicates with subscriber set up and control module 327, COM status display module 328 and channel mapping and program guide information module 329. Hierarchical COM management module 333 manages the bi-directional transfer of information to distributed COMs and illustratively communicates with remote COMs 336, 338, and 339. SMW also collects statistics from the central office master workstations regarding users' channel viewing selections.

Turning now to FIG. 9, shown is a schematic view illustrating the architecture of central office 400. Central office 400 receives the combined digital video and data signal over SONET network 150 into SONET add-drop multiplexer 401. SONET add-drop multiplexer 401 exchanges plain old telephone service (POTS) information with PSTN (public switched telephone network) voice switch 409 over connection 408. SONET add-drop multiplexer 401 also exchanges data information over connection 407 with switch 406. SONET add-drop multiplexer 401 communicates video data over connection 402 to video network interface shelf (VNIS) 450. Illustratively, connection 402 is shown as a single connection, however, connection 402 is in reality a plurality of DS-3 communication channels each carrying one program group of the compressed digital video content as described above. VNIS 450 performs a protocol transformation in order to convert the received video data into a standard, compressed digital video transport format, for example but not limited to, digital video broadcast-asynchronous serial interface (DVB-ASI). VNIS 450 is comprised of a plurality of video network interface modules and will be described in detail with reference to FIGS. 10A and 10B.

The output of VNIS 450 is communicated on connection 404, which again represents a plurality of channels, each containing one of the video program groups, to video distribution shelf 500. Video distribution shelf 500 is responsible for distributing the digital video program groups with redundancy to all access shelves 550. Video distribution shelf 500 will be described in detail with reference to FIGS. 11A–11E and access shelf 550 will be described in greater detail with reference to FIG. 12. Video distribution shelf 500 supplies eight active program groups and eight spare connections over connection 417 to access shelf 550. Connection 417 can be any connection that provides the needed capacity to carry both the active and spare program groups.

Access shelf 550 communicates over connection 419 with low pass filter shelf 600, the operation of which will be described in detail with reference to FIG. 12. Low pass filter shelf 600 communicates over communication channel 16 to customer premises 1300. Illustratively, communication channel 16 may be a digital subscriber line (DSL) communication channel which, in addition to the digital video signal being delivered to customer premises 1300, includes bi-directional Internet data (or any data), and includes POTS service to support telephone communication between customer premises 1300 and central office 400. It is important to note that while described as using a DSL communication channel, channel 16 can be any communication channel that supports the communication of compressed digital video, bi-directional Internet data and POTS. Other communication channels, for example but not limited to a wireless communication channel such as an LMDS (local multipoint distribution system), may be used to communicate between central office 400 and customer premises 1300.

Low pass filter shelf 600 communicates POTS information over connection 420 to PSTN voice switch 409, which in turn communicates telephone service over connection 408 through add-drop multiplexer 401 to telco SONET Network 150.

Also included at central office 400 is central office master (COM) workstation 650. COM workstation 650 communicates control information over connection 411 to switch 406, and communicates over connection 414 to VNIS 450 in order to communicate control data information relative to the operation of the network. COM workstation 650 also communicates over connection 418 to video distribution shelf 500 and over connection 416 to access shelf 550. COM workstation 650 is illustratively the management workstation that runs the software that controls the operation of the devices located at central office 400, and that enables the present invention to operate. The operation of COM workstation 650 will be discussed in detail with reference to FIG. 15.

Figure 10A:
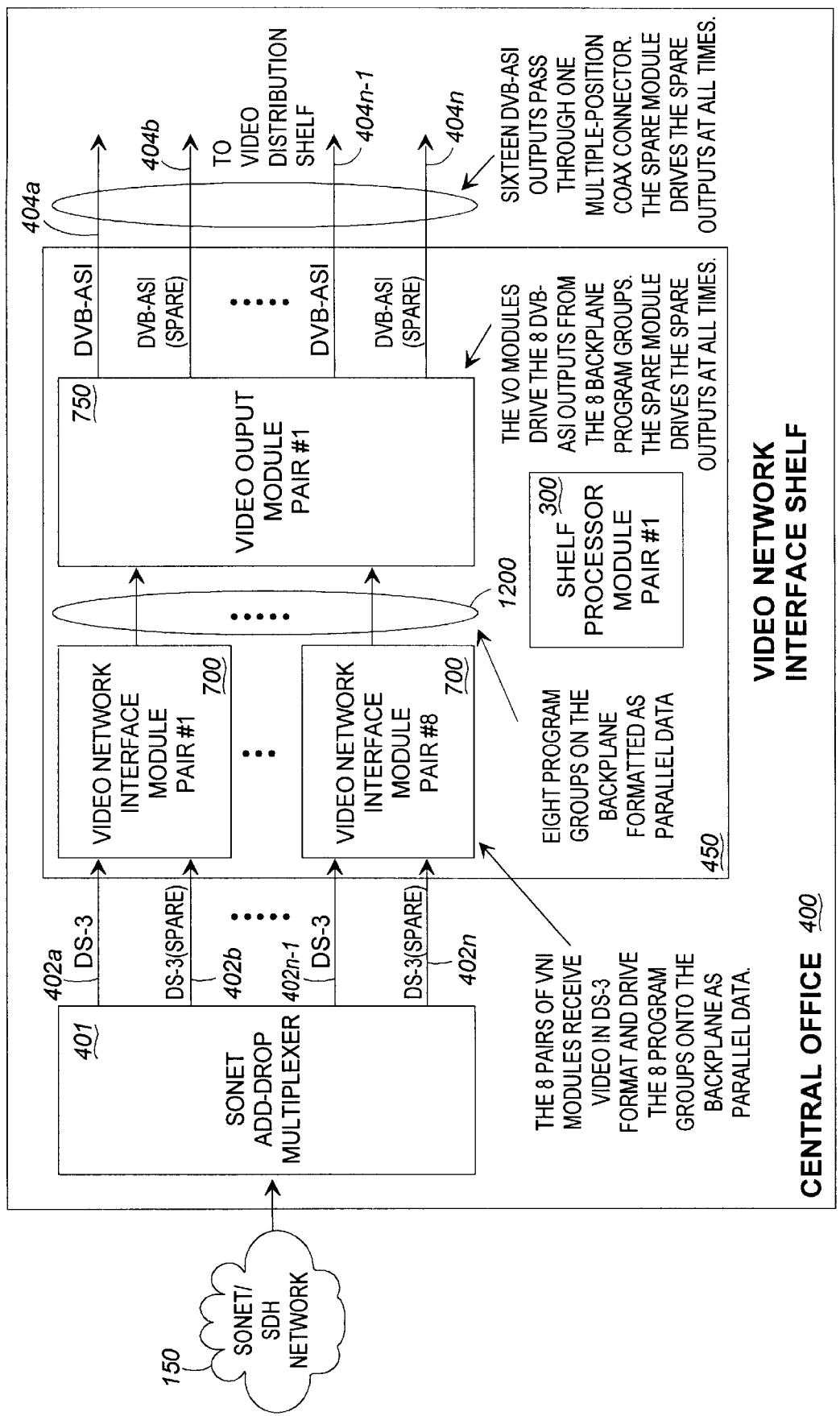
FIG. 10A is a schematic view illustrating the video network interface shelf of FIG. 9.
Figure 13:
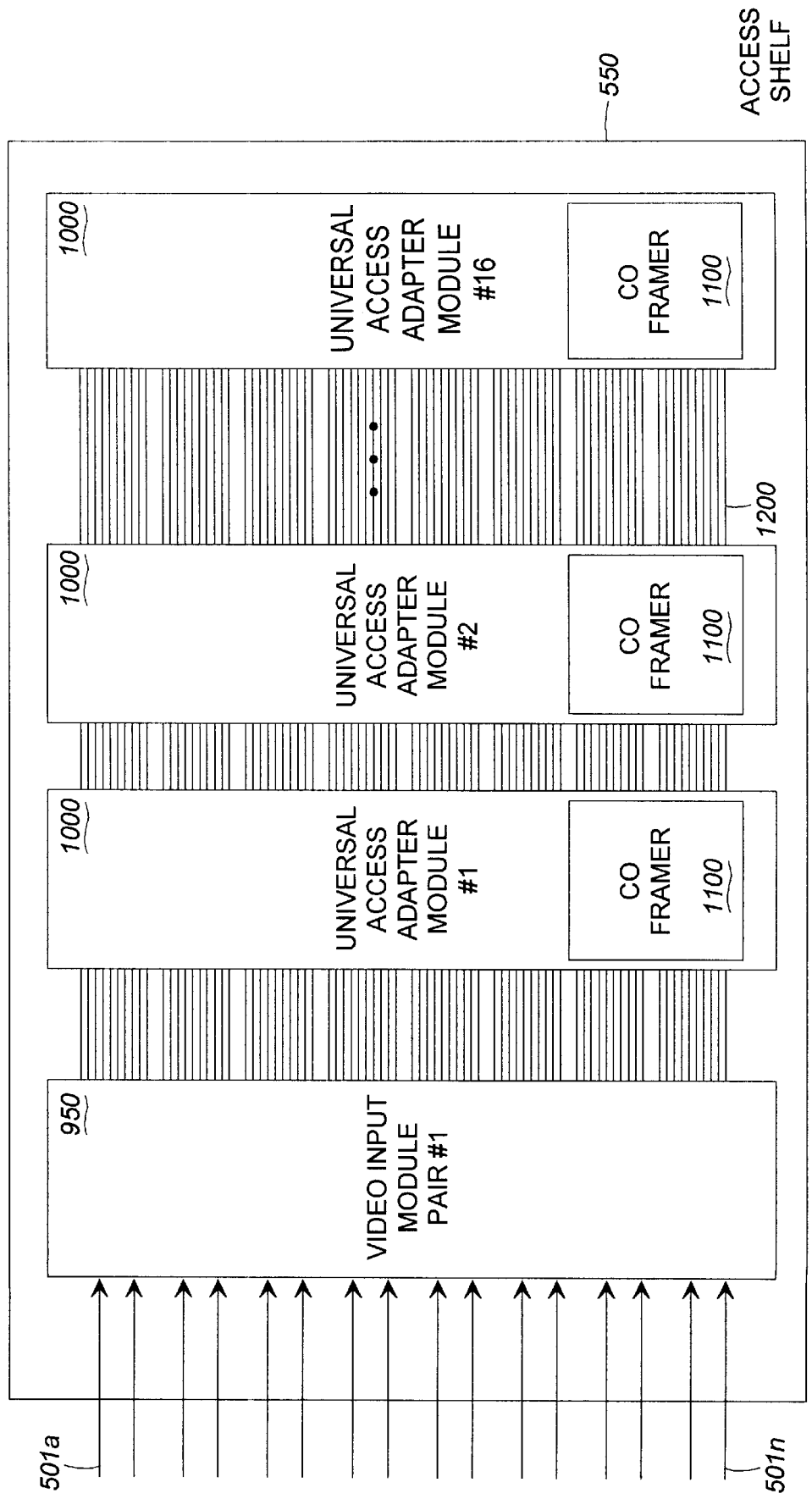
FIG. 13 is a schematic view illustrating additional detail of access shelf of FIG. 9.

FIG. 10A is a schematic view illustrating the video network interface shelf 450 of FIG. 9. Central office 400 includes SONET add-drop multiplexer 401 which receives the combined video and data signals from SONET network 150. Central office 400 includes video network interface shelf 450, which includes video network interface module 700 pairs, video output module 750 pair, and shelf processor module 300 pair. Each video network interface module pair includes an active video network interface module 700 and a spare, or stand-by, video network interface module 700. Each video network interface module (VNI) 700 receives a video program group on DS3 line 402. Each program group is supplied simultaneously to the active VNIM and the stand-by VNIN. Illustratively, each video network interface shelf 450 includes eight pairs of video network interface modules 700, each video network interface module pair receiving the complete program group via a DS3 connection. Each video network interface module pair 700 provides a complete program group to broadcast backplane 1200. Broadcast backplane 1200, the operation of which will be described in detail with reference to FIG. 13, is in communication with video output module pair 750. Video output module pair 750 supplies the program data on connection 404 to video distribution shelf 500 of FIG. 9. The content supplied on connection 404 can be in the form of DVB-ASI content.

Video network interface shelf 450 also includes shelf processor module pair 300, the operation of which is similar to that as described above. The eight pairs of video network interface modules 700 receive the video signal in DS3 format and drive the eight program groups onto broadcast backplane 1200 as parallel data.

FIG. 10B is a block diagram illustrating the video network interface module 700 of FIG. 10A. The video network interface module 700 receives one program group of digital video programming over redundant DS-3 links 402a and 402b. The DS-3 payload (MPEG-2) data is extracted from the incoming signal and inserted onto broadcast backplane 1200 for delivery to video output module 750. Video network interface module 700 is designed for active/standby redundancy, contains circuitry to allow hotswap, and communicates with the video network interface shelf processor module 300 for various control purposes. Dual DS-3 signals are presented to each module at the input for link redundancy. Video network interface module 700 includes primary DS-3 line termination and receiver 701a and redundant DS-3 line termination and receiver 701b. The DS-3 line receivers extract the payload data from the incoming bit stream and prepare the content for delivery to the parallel video bus driver 706. Both receivers 701a and 701b are always active, allowing redundancy at the input link. Supervisory module 704 monitors the status of the receivers 701a and 701b over connections 708a and 708b, respectively, and determines which line receiver signal will be used to drive the serial feed to the parallel video bus driver 706. Supervisory module 704 communicates control information to DS-3 line termination and receiver 701a over connection 714a and communicates control information to DS-3 line termination and receiver 701b over connection 714b. The parallel video bus driver 706 receives serial data from one of the DS3 line receivers 701a or 701b, over connection 709a or 709b, depending upon which DS-3 line termination and receiver device is active, as determined by the on board supervisory module 704. The serial data is reorganized into the original 8 bit byte format wherein two control data bits are concatenated with the original byte. Differential signaling, and in the preferred embodiment, low voltage differential signaling (LVDS) line drivers (not shown) within parallel video bus driver 706, send this 10-bit "word" to the 20 differential output lines on parallel video bus driver 706 if the supervisory module 704 allows the drivers to be activated.

Supervisory module 704 is responsible for proper operation of the video network interface module 700. It accomplishes set up and initialization of all functions on the module. Supervisory module 704 also monitors the status of each function. The supervisory module 704 maintains communication with shelf processor 300 and is responsible for active/stand-by redundancy control. Should the video network interface module 700 experience a failure, supervisory module 704 alerts shelf processor module 300 and causes video network interface module 700 to become inactive. Because the video network interface module is designed for active/stand-by redundancy, they are typically installed in pairs, each monitoring the fault indicator of its redundant neighbor over connection 711, which will cause it to go active immediately upon failure of the active module. Similarly, supervisory module 704 supplies its fault status over connection 712 to its counterpart supervisory module in its neighbor video network interface module. Voltage management module 702 is responsible for hotswap capability and power management in accordance with that described above.

Figure 11A:
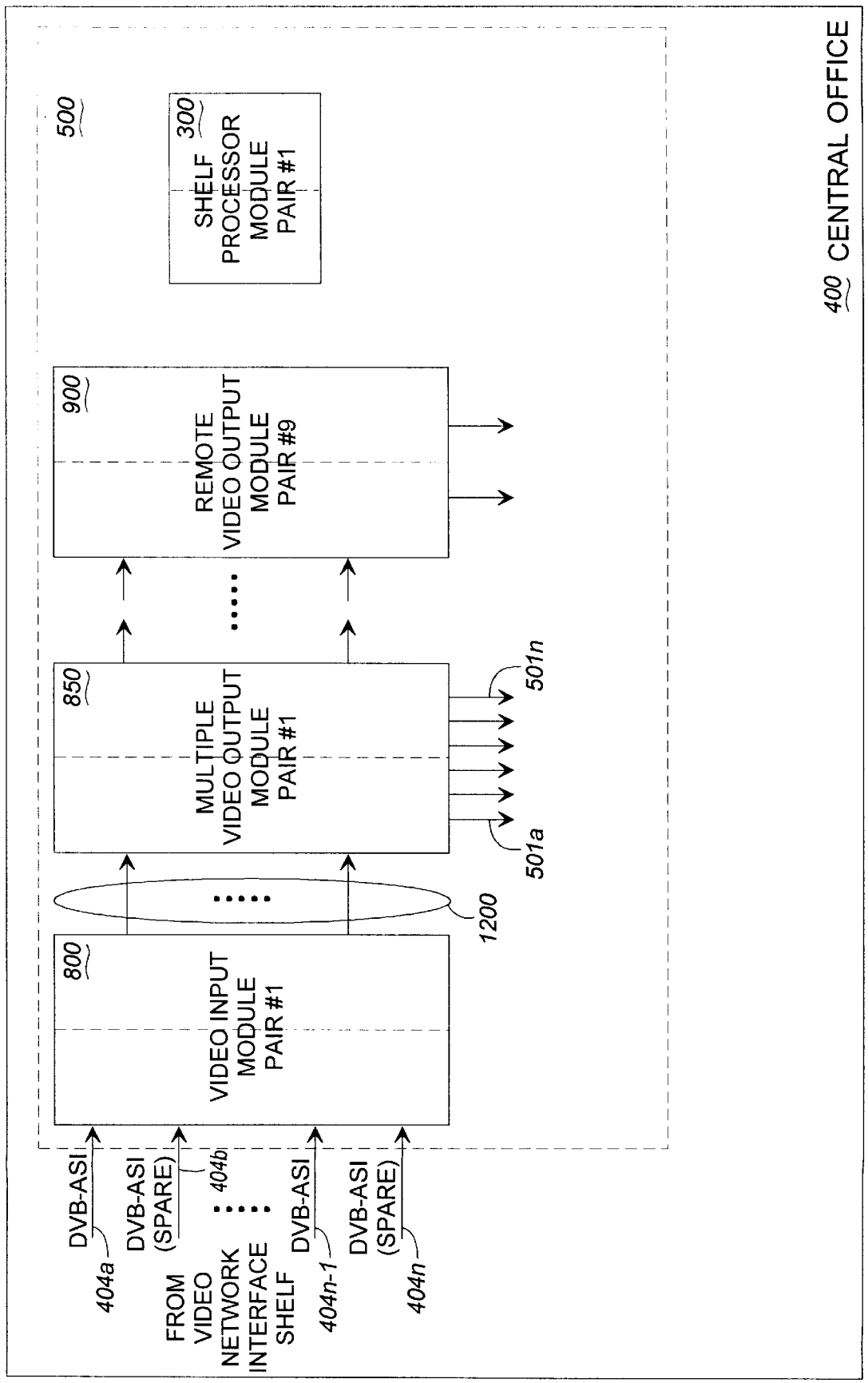
FIG. 11A is a schematic view illustrating the video distribution shelf of FIG. 9.

FIG. 11A is a schematic view illustrating the video distribution shelf 500 of FIG. 9. Central office 400 includes video distribution shelf 500, which includes video input module pair 800, multiple video output module pair 850, remote video output module pair 900, and shelf processor module pair 300. Video input module 800 pair receives the DVB-ASI format video signal as input over connection 404. While illustrated as a single pair, there are in fact eight video input module pairs in this preferred embodiment, corresponding to the eight DVB-ASI input signals 404, and the eight DVB-ASI spare input signals. Each active video input module 800 receives the active program group while the spare video input module receives the program group over DVB-ASI spare connection. Each video input module 800 supplies a program group onto broadcast backplane 1200. Multiple video output module 850 pair receives the program group content from broadcast backplane 1200 and provides as an output two copies of each program group. Thus, each multiple video output module 850 drives 16 discreet DVB-ASI outputs 501. The spare module drives the spare outputs at all times. Remote video output module 900 pair can be used in place of multiple video output module 850 to provide connectivity to digital loop carriers (DLCs). The remote video output module 900 outputs a single multiplexed copy of the program groups onto a single fiber optic cable by multiplexing the eight program groups into a serial bit stream at approximately 2.488 Gigahertz (GHz). The spare module drives the spare output onto a spare fiber optic cable at all times.

Shelf processor module 300 pair is also included in video distribution shelf 500, the operation of which was described above. Each video input module 800 pair receives up to eight video program groups in DVB-ASI format. The multiple video output modules 850 drive redundant video outputs that provide video data to multiple access shelves 550 (to be discussed with reference to FIG. 12). If employed, remote video output module pair 900 multiplexes and transmits all of the digital video program groups to an access shelf 550 via fiber optic link. Shelf processor module 300 provides redundant control and monitoring of the shelf.

Figure 11B:
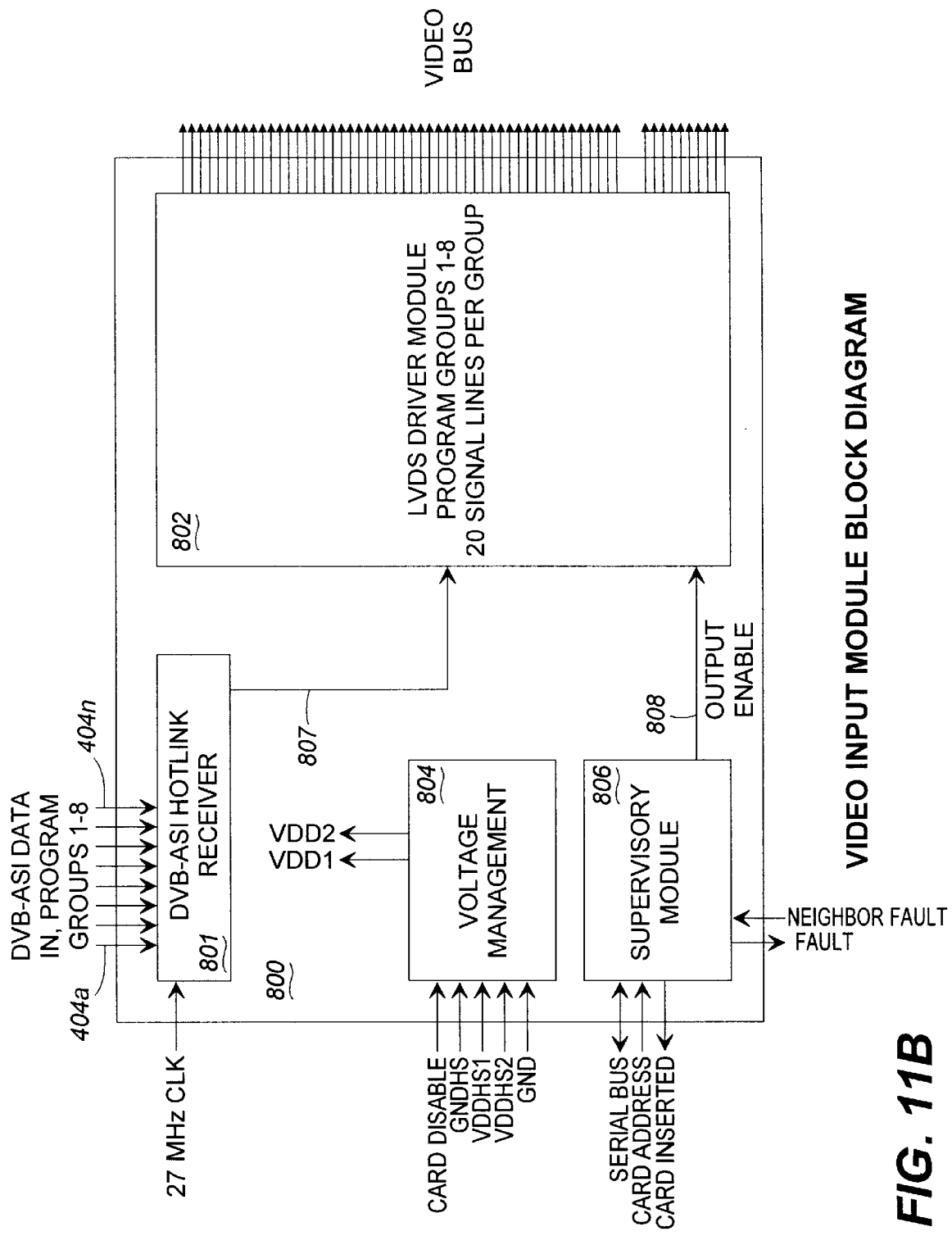
FIG. 11B is a block diagram illustrating the video input module of FIG. 11A.

FIG. 11B is a block diagram illustrating the video input module 800 of FIG. 11A. Video input module 800 receives all eight program groups in DVB-ASI format over connections 404. The data is converted into LVDS parallel form (with extra control bits added) and made available, via the particular shelf backplane, to all other modules connected to broadcast backplane 1200. Video input module 800 is designed for active/standby redundancy, contains special circuitry to allow hotswap, and communicates with shelf processor module 300 for control purposes. DVB-ASI receiver 801 receives input from eight individual channels 404. Each input line 404 is DVB-ASI compliant. The video data on lines 404 is forwarded from DVB-ASI receiver 801 to LVDS driver module 802 over connection 807. LVDS driver module 802 converts the serial data received from DVB-ASI receiver 801 to parallel form. Special control bits are added to each byte and the data is byte aligned (to be described with reference to FIG. 20A).

When supervisory module 806 asserts the output enable signal on line 808, LVDS drivers for all 160 lines are enabled and all eight program groups are driven onto broadcast backplane 1200 where they are simultaneously made available to all other modules on broadcast backplane 1200.

Supervisory module 806 is also responsible for proper operation of video input module 800. Supervisory module 806 oversees set up initialization of all functions performed on video input module 800 and monitors the status of each function. Supervisory module 806 maintains communication with shelf processor module 300 and is responsible for active standby redundancy control. Should video input module 800 experience a failure, supervisory module 806 alerts shelf processor module 300 and causes video input module 800 to immediately go inactive. Because video input module 800 is designed for active/standby redundancy, it is expected to be installed in pairs. Each monitors the fault indicator of its redundant neighbor over connection 809, and supplies its own fault information over connection 811, and will go active immediately upon failure of the active module. Voltage management module 804 is responsible for hotswap capability and power management in accordance with that described above.

Figure 11C:
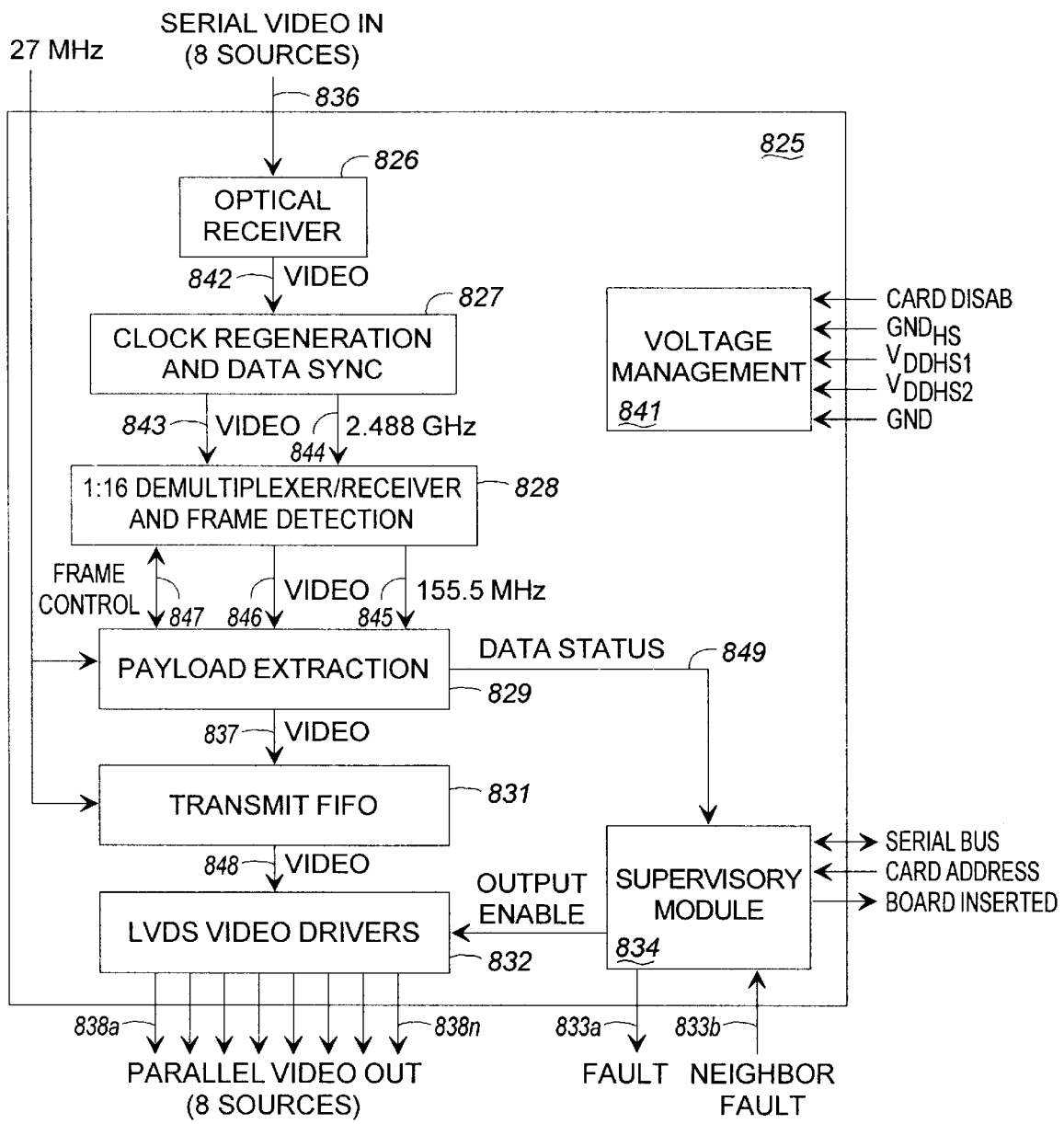
FIG. 11C is a schematic view illustrating an alternative distribution scheme to the video input module of FIG. 11B.

FIG. 11C is a schematic view illustrating an alternative distribution scheme to the video input module of FIG. 11B. Remote video input module 825 can be used as an alternative to video input module 800. Remote video input module 825 receives a single multiplexed copy of eight 10-bit parallel video program groups along with framing and overhead from a single optical fiber connection 836. The framing is detected and the data is demultiplexed into the eight 10-bit parallel video program groups. A spare module will demultiplex the spare fiber input at all times. One of the two modules will drive the program groups onto broadcast backplane 1200.

Optical receiver 826 converts the optical data stream on connection 836 into an electronic data stream containing the video programming on connection 842. Clock regeneration and data sync 827 regenerates the serial clock from the serial data stream and resynchronizes the data to this clock. A 2.488 GHz clock signal is supplied on connection, 844 and the video programming is supplied over connection 843. A 1:16 demultiplexer/receiver and frame detector 828 detects the start of frame bits and demultiplexes the data into 16-bit words. A 155.5 MHz clock signal is supplied over connection 845, the video programming is supplied over connection 846, and frame control information is exchanged with payload extraction device 829 over connection 847. Payload extraction device 829 strips off the framing and overhead bits leaving the video program groups on connection 837. Transmit first-in first-out (FIFO) buffer 831 buffers the eight program groups on connection 837 in a first-in first-out arrangement in order to resynchronize the parallel transmit data rate. LVDS video drivers 832 drive the eight program groups onto broadcast backplane 1200 over connections 838. Illustratively, the optical connection over which the multiplexed program groups are transported should have sufficient capacity to carry the data such that the program groups may be transported without loss of any information.

Supervisory module 834 communicates with shelf processor module 300 to set a fault bit over connection 833a, and reads a neighbor fault bit over connection 833b. Supervisory module 834 also enables the LVDS video drivers 832 over connection 839 when appropriate. Voltage management module 841 is responsible for hotswap capability and power management in accordance with that described above.

FIG. 11D is a block diagram illustrating the multiple video output module 850 of FIG. 11A. Multiple video output module 850 receives all eight program groups from video input module 800 over broadcast backplane 1200. The eight program groups are replicated n times and delivered out of the video distribution shelf 500 on lines 501 in DVB-ASI format. Multiple video output module 850 is designed for active/stand-by redundancy, contains special circuitry to allow hotswap, and communicates with the video distribution shelf processor module 300 for various control purposes.

Parallel video bus receiver 851 contains LVDS receivers for 160 signals, eight program groups consisting of 20 signals per program group. It receives the video data from the video input module 800 via broadcast backplane 1200. DVB-ASI drivers 856a–856n are responsible for creating a DVB-ASI compliant output on line 501 for each of the program groups. Each connection 857a through 857n includes a serial data stream containing a program group.

Each program group is carried on one output connection, therefore each output module contains eight outputs. Any number of DVB-ASI driver modules 856 may exist on a multiple video output module 850, allowing for scalability of the entire system.

Multiple video output module 850 is designed for active/stand-by redundancy. Supervisory module 854 is responsible for proper operation of the multiple video output module 850. Supervisory module 854 provides set up and initialization of all other functions on the module and monitors the status of each function. Supervisory module 854 maintains communication with shelf processor module 300 and is responsible for active/stand-by redundancy control. If multiple video output module 850 experiences a failure, supervisory module 854 alerts shelf processor module 300 over connection 858 and immediately goes inactive. Similarly, if supervisory module 854 detects a failure of its counterpart multiple video output module over connection 859, it will immediately become active. Because multiple video output module 850 is designed for active/stand-by redundancy, both cards of any pair will always be driving a set of redundant output signals. Voltage management module 852 is responsible for hotswap capability and power management in accordance with that described above.

Figure 11E:
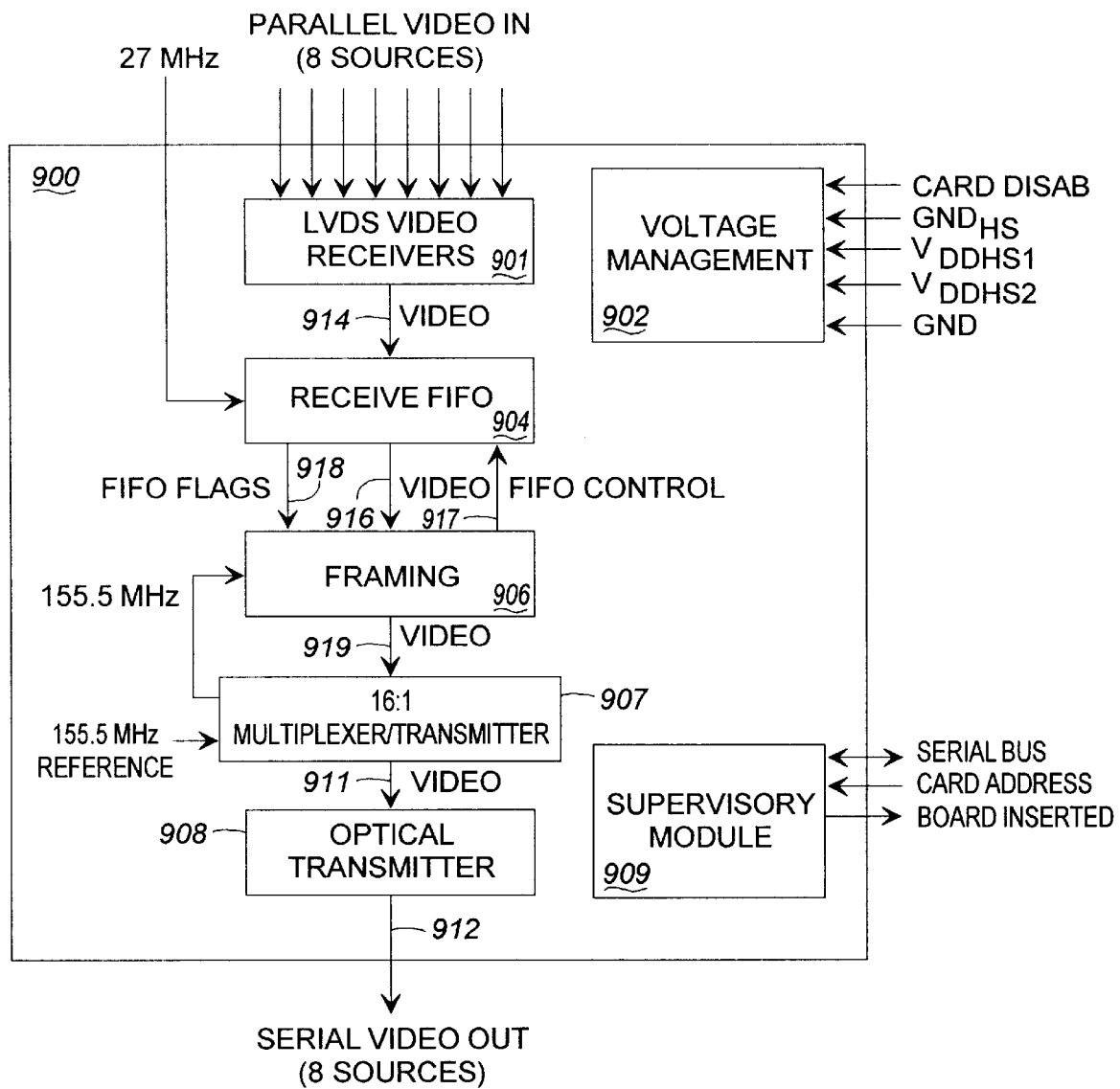
FIG. 11E is a schematic view illustrating a remote video output module of FIG. 11A.

FIG. 11E is a schematic view illustrating a remote video output module of FIG. 11A. Remote video output module 900 outputs a single multiplexed copy of eight 10-bit parallel video program groups along with framing and overhead onto a single fiber optic link for transmission to digital loop carriers (DLCs). A spare module will drive the spare output onto a spare fiber optic link at all times. LVDS video receiver 901 will receive the eight program groups and output a video signal over connection 914 to receive FIFO buffer 904. Since the serial transmit rate and the parallel receive data rate are not equivalent, the eight program groups parallel data is buffered in receive FIFO buffer 904 to resynchronize to the serial data rate. Receive FIFO buffer 904 supplies the video programming over connection 916, supplies FIFO flags over connection 918, and receives FIFO control signals from framer 906 over connection 917.

Framer 906 organizes the incoming data into frames and adds the framing bits to the start of the frame. Extra data bytes will be added to the frame if necessary to synchronize the data rates. The data is transferred out of framer 906 over connection 919 in 16-bit words. The 16-bit parallel data stream from framer 906 is multiplexed into a serial data stream for transmission by 16:1 multiplexer/transmitter 907 over connection 911 to optical transmitter 908. Optical transmitter 908 takes the serial data stream on connection 911 and converts it into an optical stream for transmission over connection 912 on an optical fiber. Supervisory module 909 and voltage management device 902 function as described above.

Figure 12:
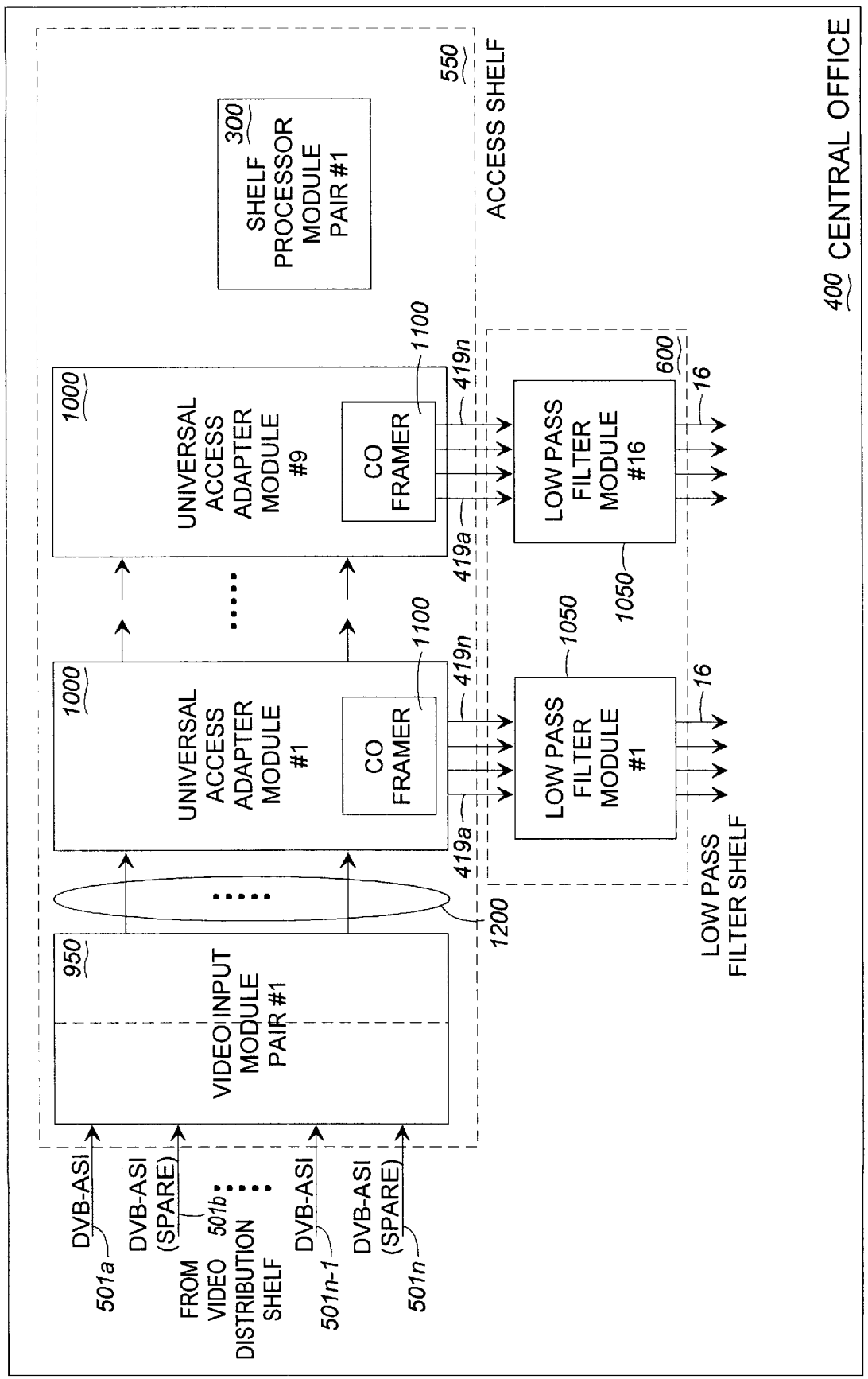
FIG. 12 is a schematic view illustrating the access shelf and the low pass filter module of FIG. 9.

FIG. 12 is a schematic view illustrating the access shelf 550 and the low pass filter module 600 of FIG. 9. Referring back to FIG. 11A, the output of each multiple video output module 850 on connection 501 is supplied to video input module 950, which is also implemented in this preferred embodiment in pairs, of FIG. 12 on connection 501. The content on connection 501 is in DVB-ASI video format. A total of 16 DVB-ASI video signals are supplied to eight video input module 950 pairs. The pair of video input modules 950 determines which input signals (main or spare) are valid and drives the program groups onto broadcast backplane 1200. Access shelf 550 further includes universal access adapter module (UAA) 1000. Each UAA module 1000 receives all of the available program content from broadcast backplane 1200. UAA module 1000 also includes central office (CO) framer 1100, the operation of which will be discussed in detail with respect to FIG. 19.

The broadcast backplane effectively extends the availability of digital video content right up to the communication channel that links central office 400 to customer premises 1300. All available program content is always available on broadcast backplane 1200. Broadcast backplane 1200 simultaneously makes available all of the digital video content to all users. In this manner, the present invention allows, for example, all users of the system to simultaneously receive the same programming content with virtually no impact to the quality of the signal, and without overloading the switching capability of the central office. In the same manner it allows all users to view different programming content without overloading the system. The broadcast backplane effectively extends the availability of digital video content right up to the communication channel that links central office 400 to customer premise 1300. It effectively broadcasts all channels to the physical point where the channel selection process is performed in the access shelf 550. Hence, there is no need to broadcast all channels to the customer premise.

UAA module 1000 provides video and data services to multiple customers. As the system is expanded, additional access shelves and UAAs are added to serve the new customers. In the access shelf 550, redundant video input modules are used to receive the eight video program groups in DVB-ASI format. The video programming is made available to each UAA module 1000 over broadcast backplane 1200. This is a unique feature in that hundreds of video programming channels are available on broadcast backplane 1200 to each universal access adapter module 1000. In this manner, an end user at a customer premises 1300 can have a choice of receiving any of the available programming content, so long as that customer is authorized for the requested channel. In this manner, an end user has access to all available programming content without the necessity of sending the entire programming data to each customer location. This unique feature of the present invention allows the use of a conventional copper wire pair, or any communication medium or methodology capable of supporting the transport of compressed digital video, bi-directional Internet data and POTS, between central office 400 and customer premises 1300 to provide digital video programming to each customer on demand. The digital video channels are effectively broadcast within the access shelf to all UAA modules 1000.

Furthermore, in conjunction with the delivery of digital video to each customer, bi-directional data exchange (i.e., an Internet connection) and POTS are simultaneously available on the same channel.

UAA module 1000 provides the video program content and the Internet data over connection 419 to low pass filter shelf 600. Low pass filter shelf 600 contains multiple low pass filter modules 1050, each configured to receive the output of a universal access adapter module. Each low pass filter module 1050 combines the video program content and the data with POTS information and directs it to a customer premises over communication channel 16. As presently configured, each UAA module 1000 can serve four customer interface lines, however, it is foreseeable that advances in technology will enable additional capacity, without departing from the scope of the invention.

The UAA module 1000 receives digital video content from the broadcast backplane 1200 and delivers the video programming to the customer as requested. Internet data for all four customers enters through 10Base T connector on access shelf 550 that houses UAA module 1000.

FIG. 13 is a schematic view illustrating additional detail of access shelf 550 of FIG. 9. FIG. 13 specifically illustrates broadcast backplane 1200 containing eight program groups of video content distributed from video input module 950 to each universal access adapter module 1000. Broadcast backplane 1200 is formed by the set of eight digital video program groups. In a preferred embodiment, each program group transports MPEG-2 digital video data in parallel format. Broadcast backplane 1200 connects to each universal access adapter module 1000 to allow all end users access to all available video programming. All available program content is always available on broadcast backplane 1200. Broadcast backplane 1200 simultaneously makes available all of the digital video content to all users. In this manner, the present invention allows, for example, all users of the system to simultaneously receive the same programming content and allows a large number of users to watch a variety of programs with virtually no impact to the quality of the signal, and without overloading the switching capability of the central office.

Figure 14:
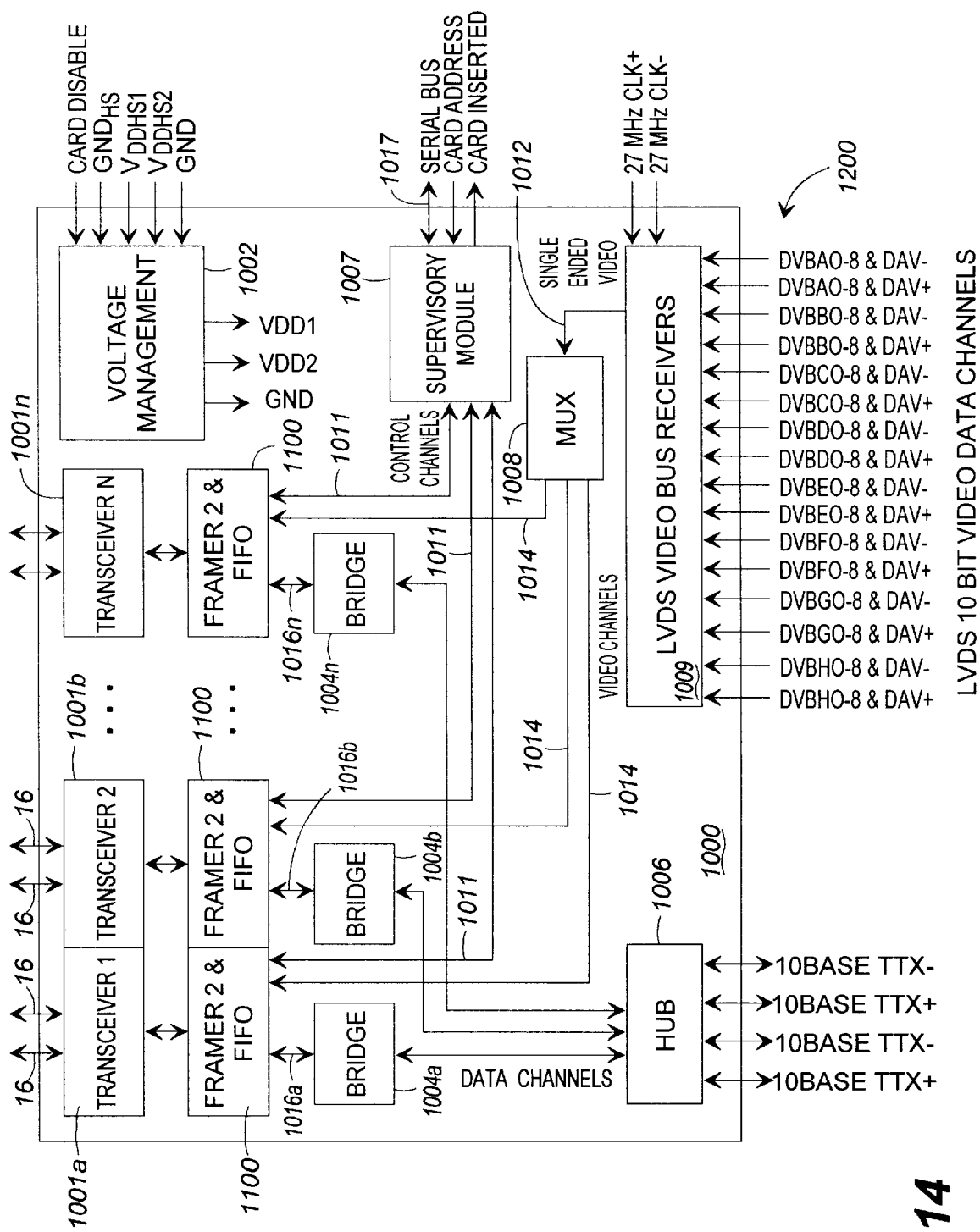
FIG. 14 is a schematic view illustrating universal access adapter module of FIGS. 12 and 13.

FIG. 14 is a schematic view illustrating universal access adapter module 1000 of FIGS. 12 and 13. Universal access adapter (UAA) module 1000 provides digital video content and Ethernet data services to n subscribers using, in this preferred embodiment, asymmetric digital subscriber line (ADSL) technology. This technology includes rate adaptive digital subscriber line (RADSL) technology and any and all variations of xDSL technology. Furthermore, it is to be understood that any digital data transfer technology that can be accomplished over, for example but not limited to, a copper wire pair, or any transmission medium that can support the transfer of digital video signals, bi-directional Internet data and POTS, can be used without departing from the scope of the present invention. xDSL technology is used herein for illustrative purposes only. Illustratively, this preferred embodiment assumes that four customer premises locations can be served by one UAA module 1000. It is to be understood that future implementations may increase or decrease the number of customer premises locations served by each UAA module 1000. In the preferred embodiment, the UAA module 1000 accepts eight digital video program groups, however, it is foreseeable that in the future additional program groups may be supported. UAA module 1000 allows each subscriber to select a particular program from these program groups for viewing. Selection of a program for viewing is accomplished using a control channel in the xDSL link, herein illustrated as control channel 1011. By use of this control channel a subscriber indicates to central office 400 via communication channel 16, a desire to receive a particular program. Note that the subscriber does not need to know which program group or program ID they are selecting. Program groups and program ID's are mapped to channel numbers by UAA 1000. In addition, control channel 1011 allows a subscriber to select the use of Ethernet data services. Ethernet data may be used in place of digital video programming, or in addition to digital video programming. The Ethernet data channel is designed to facilitate high bandwidth bi-directional access to the Internet through Internet service provider 14.

LVDS video bus receiver 1009 receives the digital video program groups from broadcast backplane 1200 and converts the differential signals into single-ended signals. The single-ended signals are then sent over connection 1012 to multiplexer 1008. Multiplexer 1008 accepts eight program groups and provides a single program group output on connection 1014 to each subscriber's CO framer 1100. Mux 1008 allows supervisory module 1007 to select the program group that contains the channel selected by a subscriber, and sends that program group to that subscriber's CO framer 1100. The operation of CO framer 1100 will be discussed in detail with reference to FIG. 19. Mux 1008 can simultaneously serve up to n CO framers independently. Supervisory module 1007 writes the desired program group to be selected to a register in CO framer 1100. CO framer 1100 then instructs mux 1008 to select the appropriate program group from the input on connection 1012. CO framer 1100 then selects a single program from the program group and forwards it to DSL transceiver 1001 for transmission to customer premises 1300 over communication channel 16. CO framer 1100 provides the interface to mux 1008. Alternatively, mux 1008 could provide an interface to supervisory module 1007, however, for the preferred embodiment, CO framer 1100 can more conveniently provide the interface to supervisory module 1007. Mux 1008 selects one program group from the eight program groups on connection 1012 and routes the selected program group to the appropriate CO framer 1100. CO framer 1100 then filters the desired program from the program group, combines it with Internet data from bridge 1004 and delivers the combined signal to a customer over communication channel 16. Essentially, when a user selects a particular channel to view, supervisory module 1007 determines the program group and the packet identifiers (PIDs) within the program group that will extract the chosen channel. Supervisory module 1007 commands mux 1008, via CO framer 1100, to select the appropriate program group, and commands CO framer 1100 to filter certain PIDs. In this manner the chosen program is delivered to the user.

In order to gain access to Internet data, in this preferred embodiment, hub module 1006 accepts 10base T Ethernet data at 10 Mb/s on one port, and repeats the data to each of the other end ports. Bridge 1004 provides an interface between 10base T (LAN) connection at hub module 1006 and TTL level (WAN) data. Bridge 1004 learns the addresses (i.e., the Ethernet, or medium access control (MAC) address) of equipment connected to the customer premises side of bridge 1004 and filters out data that does not correspond to those addresses. On the WAN side, it interfaces to CO framer 1100 over connection 1016. There are one bridge and one CO framer per subscriber. CO framer 1100 sends and receives Ethernet data to and from bridge 1004 over connection 1016, and control channel data to and from supervisory module 1007 over connection 1011. It should be noted that Ethernet and the 10base T connection are merely possible implementations to achieve the transport of bidirectional Internet data between the central office and the customer premises. Any data can be transported using the concepts of the present invention. CO framer 1100 also accepts a digital video program group from mux 1008 over connection 1014. CO framer 1100 outputs data to the xDSL transceiver 1001 and receives data from DSL transceiver 1001 at a rate which corresponds to the xDSL operating mode, which has been selected (by supervisory module 1007). As mentioned above, a detailed description of the operation of CO framer 1100 will be provided with reference to FIG. 19. xDSL transceiver 1001 sends and receives TTL data to and from framer 1100. xDSL transceiver 1001 also sends and receives xDSL data to and from each subscriber over connection 16.

Supervisory module 1007 contains a microprocessor that is used to implement a control channel to and from the subscriber in order to communicate with shelf processor module 300 via a local bus 1017, and to provide control and read status on UAA module 1000. Typical functions of supervisory module 1007 include, but are not limited to, implementing a control channel (serial data port) to and from each subscriber via CO framer 1100, determining the program identification and program group which correspond to the channel selected by the subscriber, and sending the selected program group and program ID to the CO framer 1 100. Other functions include configuring the xDSL transceivers 1001, implementing a test port to test the xDSL transceivers, reading the card addresses, implementing a serial data port to communicate with shelf processor 300, monitoring the status of the xDSL transceiver 1001 and bridges 1004, and resetting modules on UAA 1000.

Voltage management module 1002 allows live insertion of UAA module 1000 into a backplane without causing any errors on the backplane bus and without damaging any of the devices on UAA module 1000 or without damaging any devices on other parts plugged into the same backplane. A hotswap controller integrated circuit is used to perform this function and the integrated circuit provides a power on reset to the microprocessor system.

FIG. 15 is a flow diagram of central office master workstation 650. Central office master work station 650 functions as follows. Block 651 provides the user interface, which provides interface to subscriber database for UAA 1000 assignments. User interface 651 also provides the interface with which to configure and monitor central office 400 equipment and provides a graphical user interface via, for example, Java and HTML. Subscriber database and control block 652 maintains a localized mirror image of the contents of the system management work station 325 database for subscriber information including the following: video channel authorizations, Internet service authorization, account activity (pay per view (PPV) info), service enabling and disabling, and channel viewing statistics. Subscriber database and control block 652 also allows the uploading of billing information and downloading of subscriber information. Subscriber database and control block 652 also configures the UAA 1000 for service including initial set up and any change in service. Hardware set up and status display block 654 provides the following functions: initializing of central office 400 equipment, monitoring status of central office 400 equipment, including managing polling of shelf processor modules 300 for status information and managing polling of UAAs for pay per view buys. Hardware setup and status display block 654 also provides access to a database of card configurations for rapid reconfiguration in case a large number of modules are simultaneously replaced.

Embedded control network block 656 performs the function of communicating information between COM 650 and the central office 400 equipment. Embedded control network 656 also allows the application programmer interface (API) to define types of messages/commands that the system supports. System management workstation interface block 657 provides bidirectional communication between central office master work station 650 and the system management work station 325 located in TPCC 100. COM 650 also provides the logic necessary for processing requests from users pertaining to desired program viewing, collecting statistics on users' channel viewing habits (ie., which channels were viewed over a particular time period), and assigning communications ports on UAA modules 1000 over which digital video content, bi-directional Internet data and POTS is provided.

Figure 16:
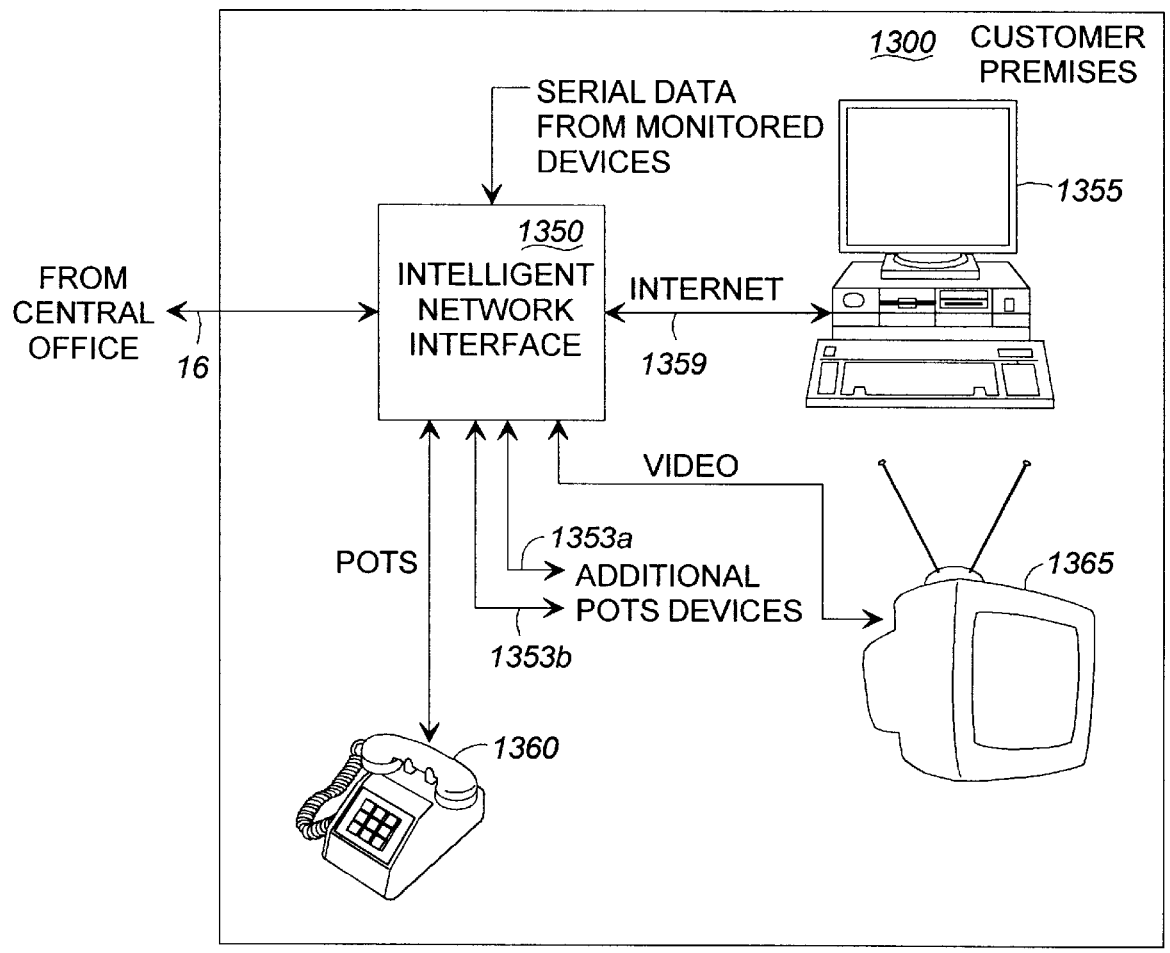
FIG. 16 is a block diagram illustrating customer premise.

FIG. 16 is a block diagram illustrating customer premises 1300. Digital video and data enters customer premises 1300 from central office 400 via communication channel 16. In the preferred embodiment, communication channel 16 is illustratively a digital subscriber line communication channel which also supports POTS communication. Alternatively, communication channel 16 can be any communication channel capable of supporting the communication of compressed digital video, bi-directional Internet data and POTS, including but not limited to a wireless communication channel. Furthermore, the connections between N 1350 and computer 1355, television 1365, and telephone 1360 may also be accomplished using various connection methodologies including, for example but not limited to, wireless technology.

Communication channel 16 connects to intelligent network interface (INI) 1350. Computer 1355, television 1365, and telephone 1360 are illustratively connected to WI 1350. INI 1350 may also support additional POTS communication lines 1353a and 1353b, which may also be in the form of a digital signal. The architecture and operation of INI 1350 will be discussed below.

Figure 17A:
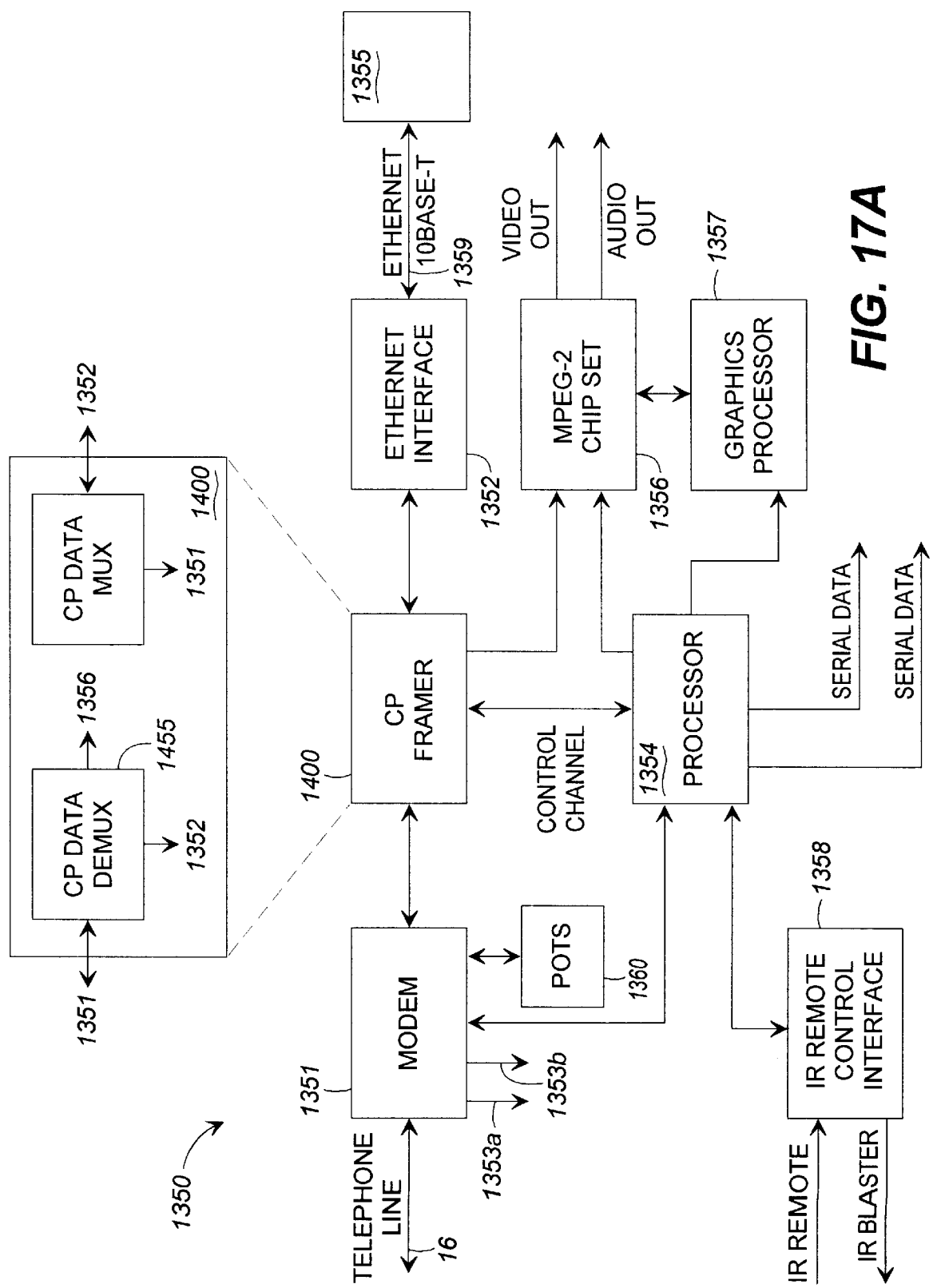
FIG. 17A is a schematic view illustrating the intelligent network interface (INI) of FIG. 16.

FIG. 17A is a schematic view illustrating the intelligent network interface (INI) 1350 of FIG. 16. INI 1350 includes RADSL (rate adaptive digital subscriber line) modem 1351 connected to communication channel 16. While illustrated using RADSL modem 1351, the digital video and data delivery system of the present invention can employ any communication technology for communicating between customer premises 1300 and central office 400. Also connected to RADSL modem 1351 is telephone 1360. RADSL modem 1351 also supports additional POTS devices over connections 1353a and 1353b, which may be in the form of digital service.

Processor 1354 connects to IR remote control interface 1358, RADSL modem 1351, CP framer 1400, MPEG-2 chip set 1356, and graphics processor 1357. Processor 1354 controls the operation of INI 1350 in order to provide a video and audio television signal from MPEG-2 chip set 1356 to television 1365, and data from Ethernet interface 1352 to computer 1355 over 10base-T Ethernet connection 1359. Processor 1354 also provides a serial data connection for debugging and maintenance, and may also provide a connection for low data rate devices, for example but not limited to utility or alarm monitoring. Processor 1354 also connects to IR remote control interface 1358.

Figure 17B:
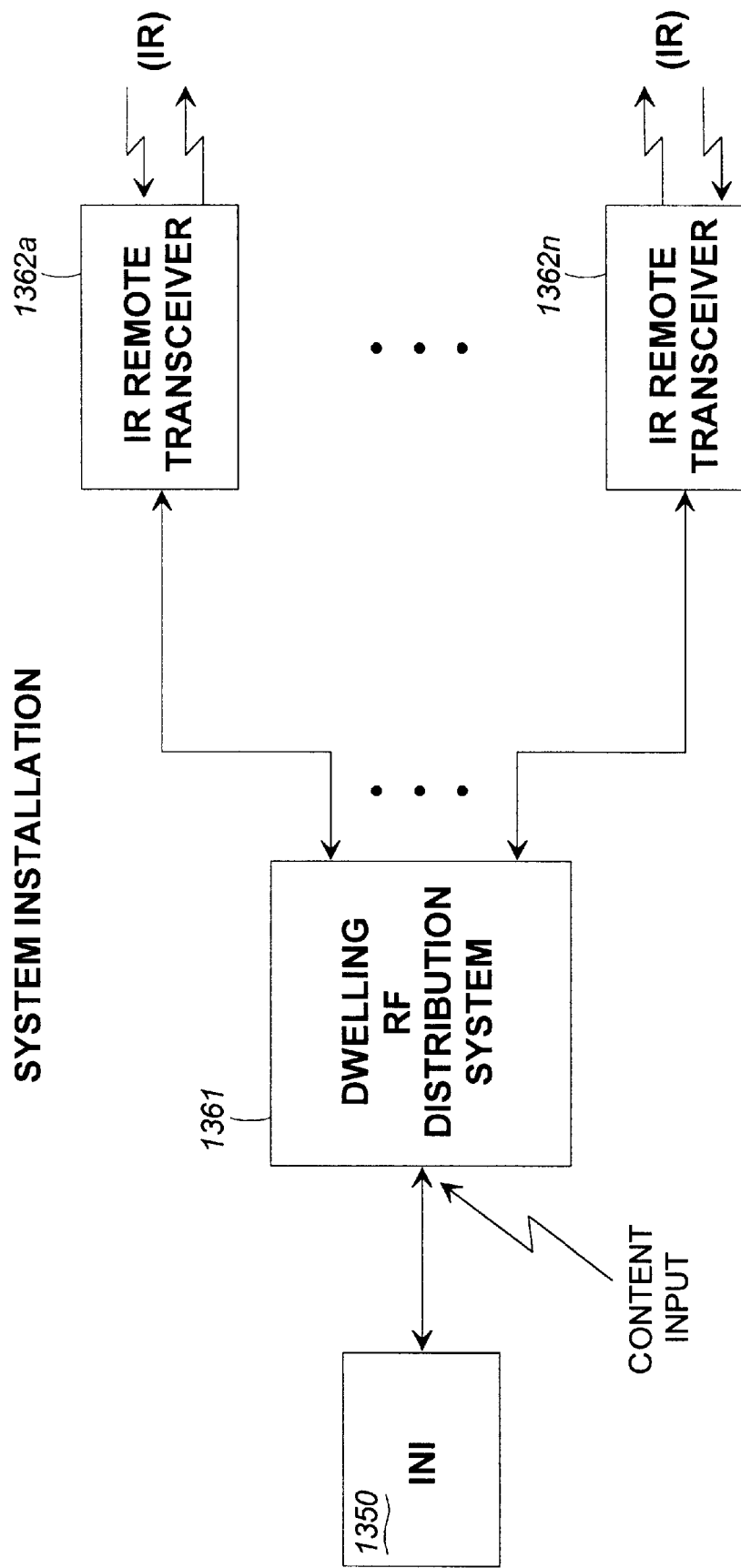
FIG. 17B is a schematic view illustrating the system in which the IR remote control interface of FIG. 17A is installed.

Referring now to FIG. 17B, IR remote control interface 1358 (contained within INI 1350) allows bidirectional communication of RF information via the dwelling RF distribution system 1361 with one or more IR remote transceivers 1362. An IR remote transceiver 1362 can be located at each viewing/controlling location.

Figure 17C:
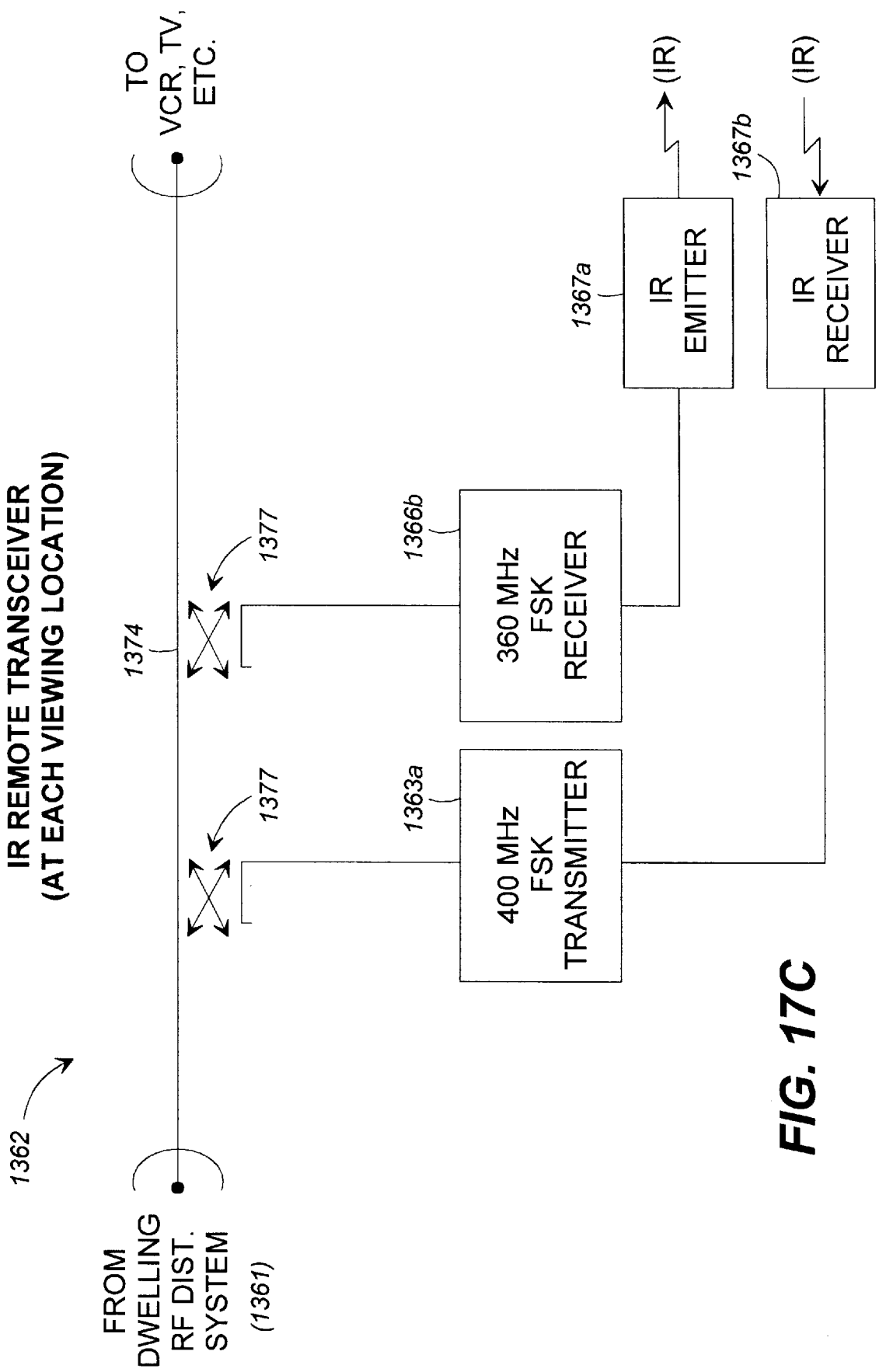
FIG. 17C is a schematic view illustrating an IR remote transceiver of FIG. 17B.

FIG. 17C is a schematic view illustrating an IR remote transceiver 1362 of FIG. 17B. The communication of RF information is accomplished by converting the received IR communications from a handheld remote control (not shown), received by IR receiver 1367b. The IR receiver 1367b should be constructed so as to accept all known carrier frequencies, for example, in the range of 32 to 40 KHz, and all codes. The envelope of the received signal is used to control, in the preferred embodiment, a 400 MHz frequency shift keying (FSK) transmitter 1363a, which transmits the signal over the dwelling RF distribution system 1361 to the INI 1350 via main RF signal path 1374. FSK transmitter 1363a and FSK receiver 1366b (and FSK receiver 1363b and FSK transmitter 1366a of FIG. 17D) connect to main RF signal path 1374 through connection 1377, which is illustratively any connection that can successfully couple the respective transmitters and receivers to main RF signal path 1374. This link may be achieved via a 75 ohm coaxial cable, or via other ways, for example but not limited to a wireless connection. Also included is 360 MHz FSK receiver 1366b and IR emitter 1367a, which should be of sufficient power to control devices via an IR signal.

Figure 17D:
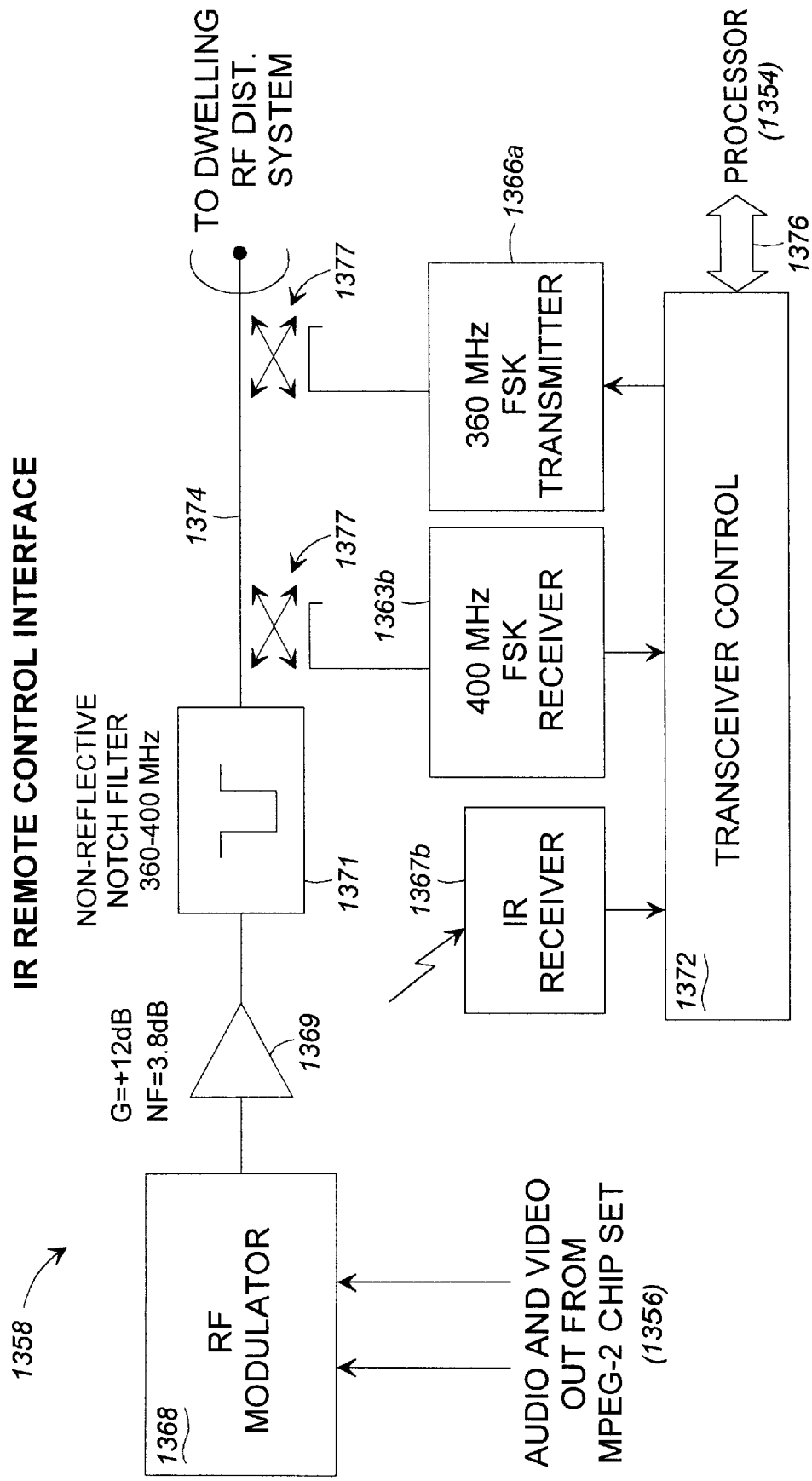
FIG. 17D is a schematic view illustrating the IR remote control interface of FIG. 17A.

FIG. 17D is a schematic view illustrating the IR remote control interface 1358 of FIG. 17A. IR remote control interface 1358 decodes the information received over main RF signal path 1374 in transceiver controller 1372 and passes a digital word to processor 1354 (FIG. 17A) via connection 1376. Transceiver controller 1372 also transfers information between IR receiver 1367b and processor 1354 (FIG. 17A). The processor may also control devices that are connected to the main RF signal path 1374 and RF distribution system 1361 through a 360 MHz FSK transmitter 1366a, in similar fashion to that described above, but at a frequency of 360 MHz.

RF modulator 1368 receives audio and video input from MPEG-2 chipset 1356 (FIG. 17A). RF amplifier 1369 and non-reflective notch filter 1371 assure that only the desired signals are passed between RF modulator 1368 and main RF signal path 1374.

This system allows simultaneous transmission of RF television signals and bi-directional control signals. Multiple IR remote transceivers 1362 can be installed in a single system. This system does not rely on the carrier frequency of the remote control, nor on a specific code implementation. The decoding of the codes and control of the IR emitters are under software control in the processor 1354.

Figure 18:
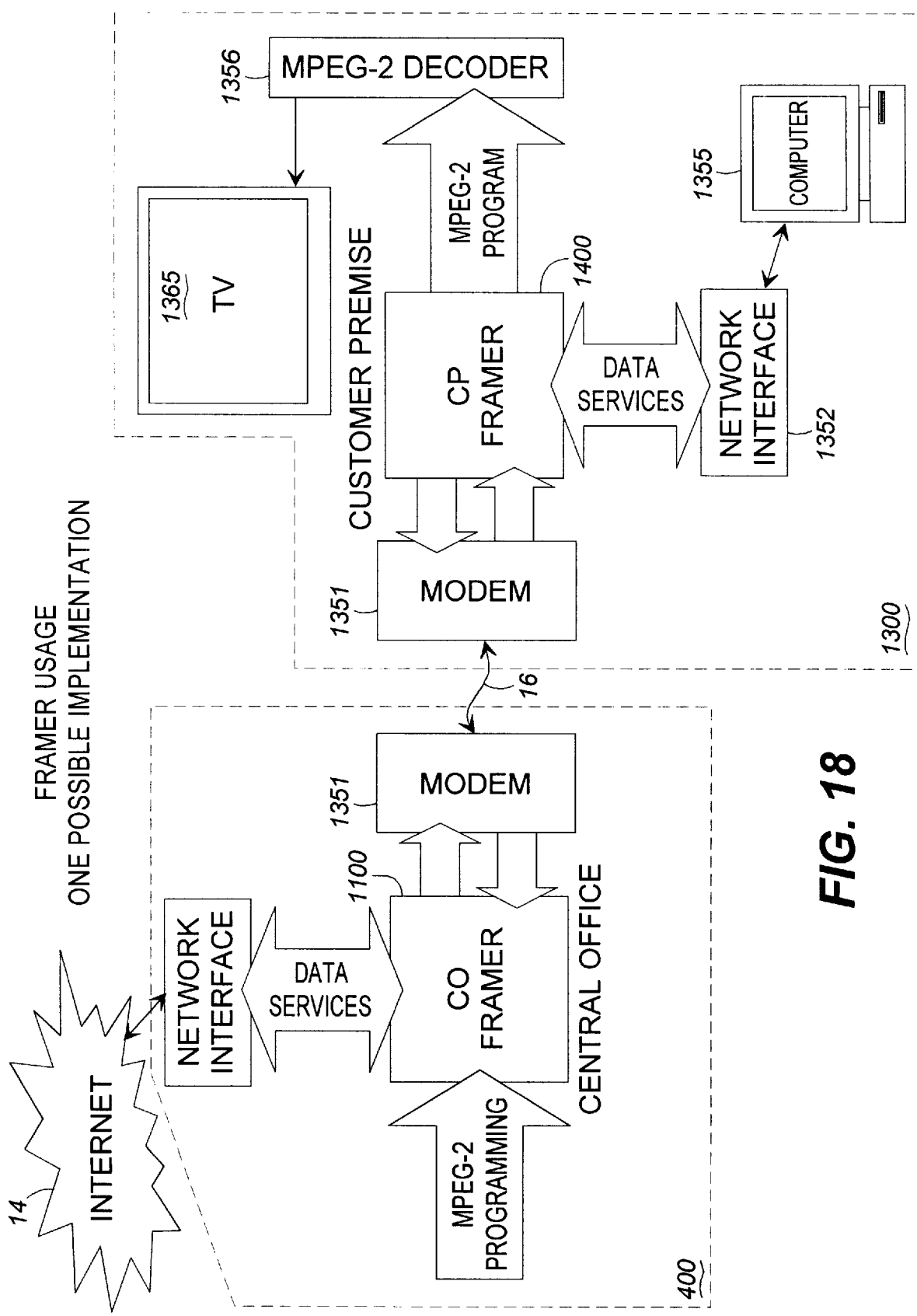
FIG. 18 is a schematic view illustrating the location, and a possible implementation, of CO framer and CP framer within the digital video and data delivery system of the present invention.

FIG. 18 is a schematic view illustrating the location, and a possible implementation, of CO framer 1100 and CP framer 1400 within the digital video and data delivery system of the present invention. CO framer 1100 is located at central office 400 and resides on UAA module 1000 (not shown) and receives video programming content. CO framer 1100 also receives and sends data services via the Internet 14. CO framer 1 100 communicates with modem 1351 in order to communicate with corresponding modem 1351 located at customer premises 1300 via communication channel 16. CP framer 1400 is located within INI 1350 and outputs both a digital video program in MPEG-2 format to MPEG-2 decoder 1356 and communicates data services with computer 1355 through network interface 1352.

Figure 19:
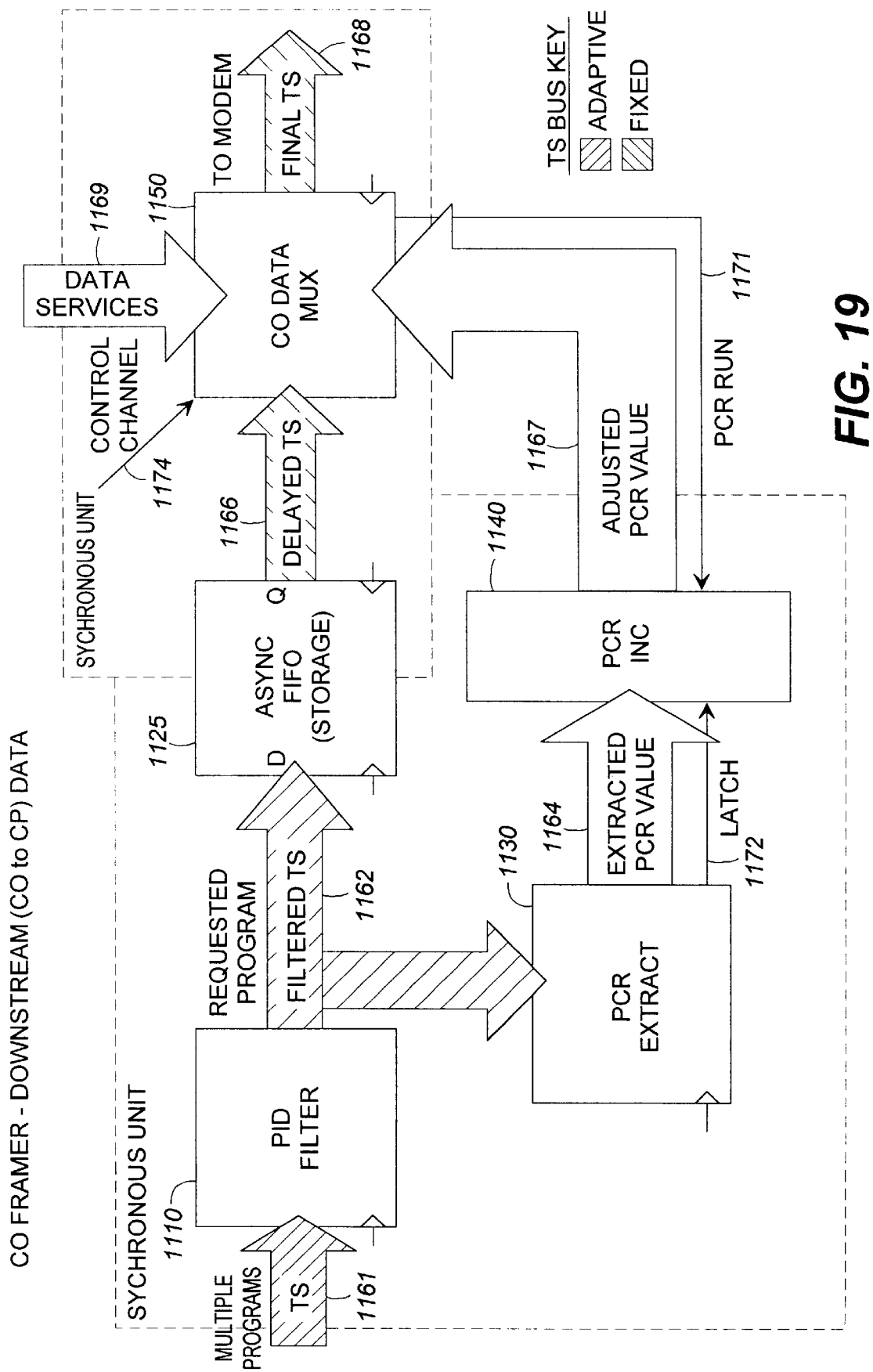
FIG. 19 is a schematic view illustrating CO framer of FIG. 18.

FIG. 19 is a schematic view illustrating CO framer 1100 of FIG. 18. CO framer 1100 receives into packet identification (PID) filter 1110 a program group, in the form of an adaptive style MPEG-2 transport stream, containing multiple programs over connection 1161. An MPEG-2 transport stream consists of a continuous stream of transport packets. All transport packets are 188 bytes in length. The first byte is set to the value 0×47 to aid in synchronization; this bit pattern is not unique and can occur elsewhere in the packet. Also included in the transport packet header is a packet identification (PID) field, this identifier distinguishes the payload of the transport packet from the payloads of transport packets with other PID values. In accordance with the MPEG-2 protocol, a transport packet may contain a payload, an adaptation field, or an adaptation field followed by a payload. The adaptation field, when present, provides additional information about the data stream.

One of these extra pieces of information is a program clock reference (PCR) value. Both the encoder and decoder of an MPEG-2 transport stream use 27 MHz clocks for their transactions. These clocks drive a system time counter (STC), which provides a constantly incrementing time stamp value. The encoder uses its own STC to time stamp the data being sent to the decoder. The decoder receives the data stream from the encoder, and uses its own STC to determine when to dispatch the time stamped data to its internal units. For simplicity, the encoder and decoder are not shown. However, since two completely different clocks are driving the STC counters, there will inevitably be subtle variations between the two due to process variations, environmental conditions, etc. These variations could cause decoding errors when the data is received. As a result, a way of synchronizing the decoder's clock to the encoder's clock is desired, despite the fact that the two might be on opposite sides of the world. The solution described herein is to use the PCR value contained within the adaptation field.

The PCR value is a copy of the STC in the encoder exactly at the point in time when the PCR value is inserted into the transport stream as it leaves the encoder. ISO/IEC IS 13818-1, international standard (1994), MPEG-2 systems mandates that the transmission delay from the encoder to the decoder be a constant quantity. By requiring this, the transport packets arriving at the decoder will be at the exact same cadence and relative positioning in time as when they left the encoder. As a result, the decoder can compare the PCR value as it is received with the decoder's own local STC. If the received PCR (STC) is ahead of the local STC, then the decoder can infer that the local 27 MHz clock is slightly slower than the remote one. If the received PCR (STC) is behind the local STC, then the decoder can infer that the local 27 MHz clock is slightly faster than the remote one. The decoder's clock is designed to allow its rate to be subtly varied, and thus, it can utilize the information provided by the PCR value to align its STC to the STC at the remote encoder.

Referring back to FIG. 19, packet identification (PID) filter 1110 (to be described in detail with reference to FIGS. 24A and 24B) receives the multiple program transport stream on connection 1161 and distills the multiple program transport stream into a single program transport stream for output on connection 1162. The resulting transport stream is sent to asynchronous first-in first-out storage device (async FIFO) 1125 for temporary storage.

Figure 20A:
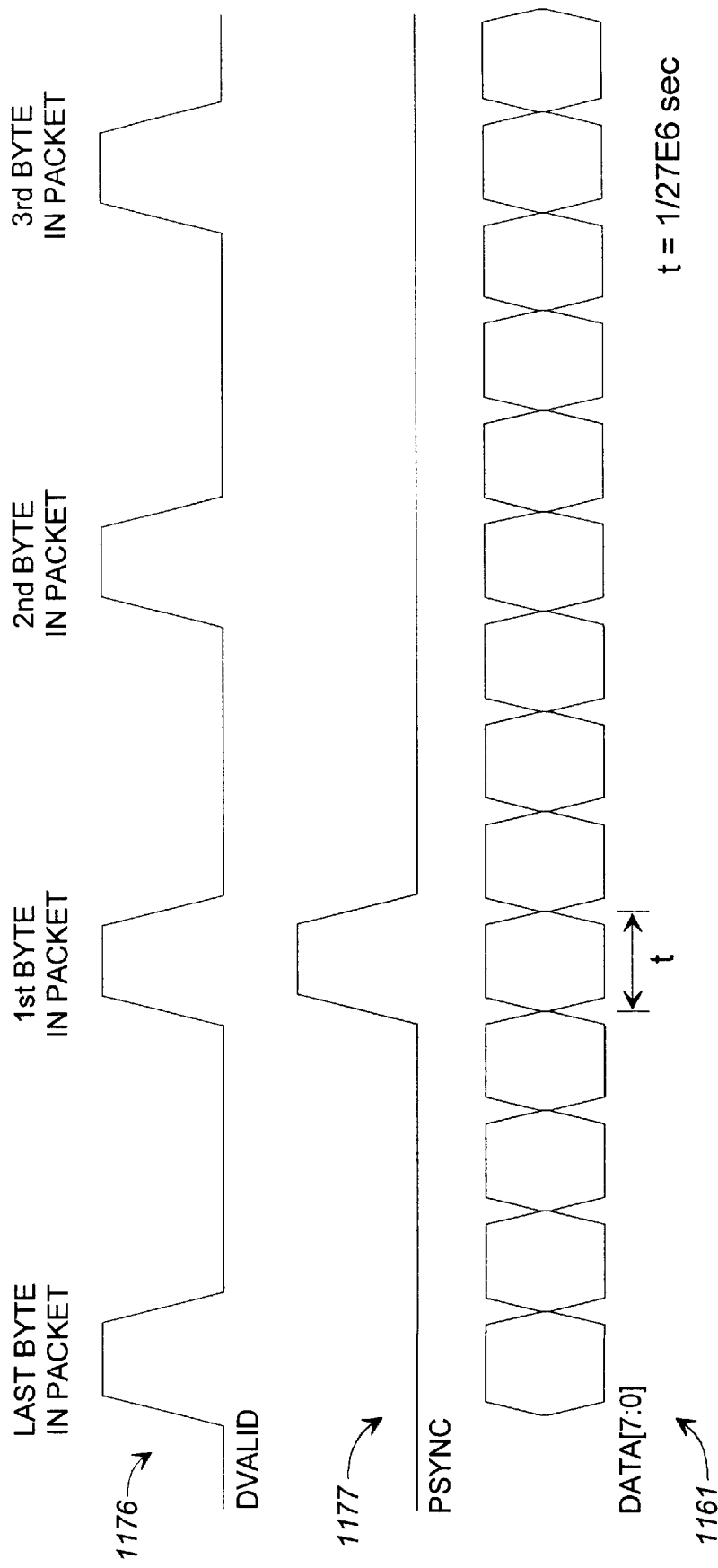
FIG. 20A is a schematic view illustrating the adaptive rate transport stream bus specification of the transport stream of FIG. 19.

PCR extract device 1130 (to be described in detail with reference to FIG. 25) monitors the content of the single program group on connection 1162 and searches for the presence of a PCR field. When PCR extract device 1130 detects a PCR field, it extracts, or more accurately copies, the PCR field from the stream and latches the PCR value into PCR incrementor 1140 over connection 1164. PCR incrementor 1140 (to be described in detail with reference to FIG. 26) accepts the PCR field over connection 1164 and increments its value by one on each 27 MHz cycle. PID filter 1110, async FIFO buffer 1125, PCR extract device 1130 and PCR incrementor 1140 all operate from the common 27 Mz clock provided by the backplane design, which delivers an adaptive style transport stream (FIG. 20A). Importantly, the aforementioned components within CO framer 1100 are clocked by the same clock that is used for the adaptive style transport stream (1161 of FIG. 20A) that is input to CO framer 1100, thus allowing the CO framer to be economically implemented as a synchronous unit.

When CO data mux 1150 (the operation of which will be described in detail with reference to FIGS. 27A, 27B, 27C and 27D) is ready to send an MPEG-2 packet, it examines the contents of async FIFO device 1125 over connection 1166. If there is a packet to be sent CO data mux sends the packet. If this packet contains a PCR field, CO data mux 1150 knows that an adjusted version of the PCR field is available from PCR incrementor 1140. In such a case, CO data mux 1150 causes the PCR incrementor 1140 to stop running by deasserting the PCR run signal on connection 1171, so that the output of PCR incrementor 1140 stabilizes. CO data mux 1150 overwrites, or restamps, the adjusted PCR value for the original as the packet is being sent to modem 1351 (FIG. 183). If there is no MPEG-2 packet to be sent, CO data mux 1150 instead sends a packet containing data services from connection 1169. As the video clock reference for MPEG-2 is encoded using a 27 MHz clock, it should be noted that the preferred embodiment has utility when the data being clocked into the CO framer is clocked at that same rate, i.e., 27 MHz. However, the PCR restamping feature of the CO framer of the present invention can successfully operate whenever the CO framer is clocking in data at the same rate as the encoded video clock reference. Specifically, the CO framer of the present invention simply adjusts the PCR field by one unit on each 27 Mz clock cycle of the adaptive style bus (FIG. 20A) until the packet is ready to be sent to the modem.

CO data mux 1 150 also adds control channel 1174 to the digital video content and the Internet data. Control channel 1174 is established by capitalizing on the unused transport_priority flag bit present in each packet (whether digital video content, Internet data, or null) transported between central office 400 and customer premises 1300. Control information is transmitted over control channel 1174, which is a low speed control data channel in both upstream and downstream directions, by using (or more accurately, overloading) the transport_priority flag bit present in every transport packet that is communicated between central office 400 and customer premises 1300. CO framer 1100 and CP framer 1400 use this extra bit to form a serial stream in both the upstream and downstream directions, over which is communicated control information such as programming requests from a user located at customer premises 1300. In this manner, it is possible to transmit low speed serial messages without interfering with the MPEG-2 program or regular data services. A universal asynchronous receiver transmitter (UART) unit within CO framer 1100 and CP framer 1400 generates and receives serial messages utilizing these bits, thus providing a communication link between the host processors on either side of communication channel 16.

FIG. 20A is a schematic view illustrating the adaptive rate transport stream bus specification of the transport stream of FIG. 19. The adaptive style transport stream bus is clocked at a constant 27 MHz data rate, indicated by $t=1/(27\times10^6)$ sec, no matter the rate of the incoming signal. Through the use of an extra DVALID bit, illustrated by signal 1176 and also clocked at 27 MHz, and which signifies whether its respective byte contains valid data, the bus allows a transport stream of an arbitrary data rate (up to $8\times(27\times10^6)$ b/s) to be transmitted. An extra packet sync bit (PSYNC), represented by signal 1177 is added to mark the first byte in every MPEG-2 transport stream packet. This design allows the present invention to be very versatile in accepting input transport streams of many different telephony rates. Useful data is extracted from transport stream 1161 by storing only those bytes whose associated DVALID signal on line 1176 are asserted active. Of this useful data being extracted, the receiving device knows that the PSYNC signal on line 1177 is asserted on the first byte of every transport packet.

Figure 20B:
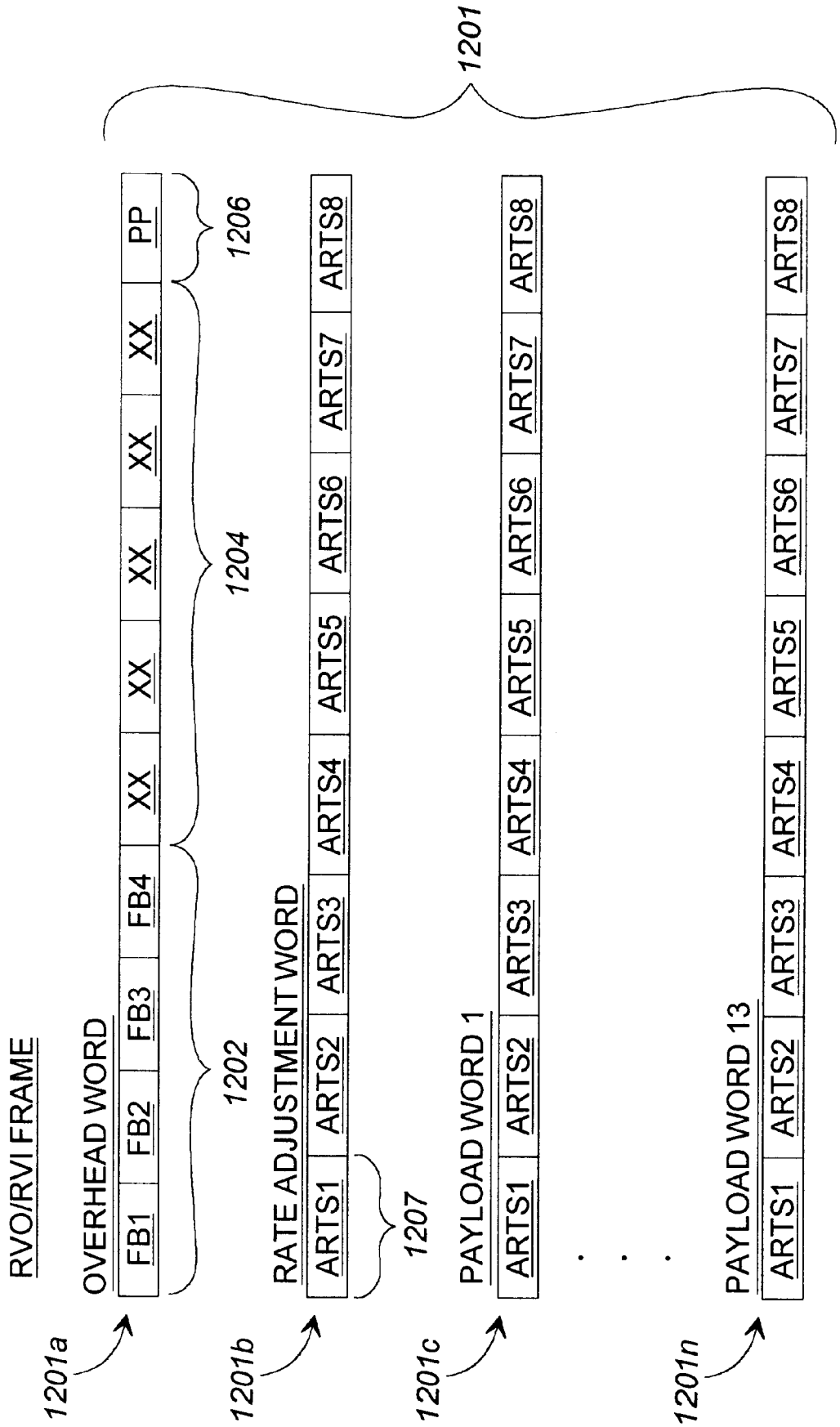
FIG. 20B is a schematic view illustrating the formatting used to transport eight sets of the adaptive rate transport stream of FIG. 20A over an optical link.

FIG. 20B is a schematic view illustrating the formatting used to transport eight sets of the adaptive rate transport stream of FIG. 20A over an optical link. The adaptive rate transport stream of FIG. 20A is comprised of eight 10-bit parallel data streams. The eight streams are combined to form a basic 80-bit word. The serial stream is organized into frames, an exemplary one of which is illustrated as frame 1201. Each frame includes an 80-bit overhead word 1201a, an 80-bit rate-adjustment word 1201b and thirteen 80-bit payload words 1201c through 1201n, resulting in a frame of 1200 bits in length.

Overhead word 1201a includes 32 framing bits 1202 and a four bit payload pointer 1206 with forty-four 1204 unused bits in between. The framing bits indicate the start of a frame and are used to synchronize the serial data to the output parallel data in remote video input module 825 (discussed with respect to FIG. 11C). The payload pointer 1206 indicates whether the payload data begins in the rate adjustment word 1201b, first payload word 1201c, or second payload word 1201d (not shown). In this manner, the serial data stream adjusts the data rate to match the input data rate. Note that the 80-bit overhead word 1201a is divided into ten 8-bit bytes, but the rate adjustment word 1201b and the payload words 1201c–1201n are divided into eight 10-bit parallel adaptive rate transport streams, each including eight data bits, DVALID bit 1176 (FIG. 20A), and PSYNC bit 1177 (FIGS. 20A and 21).

Figure 21:
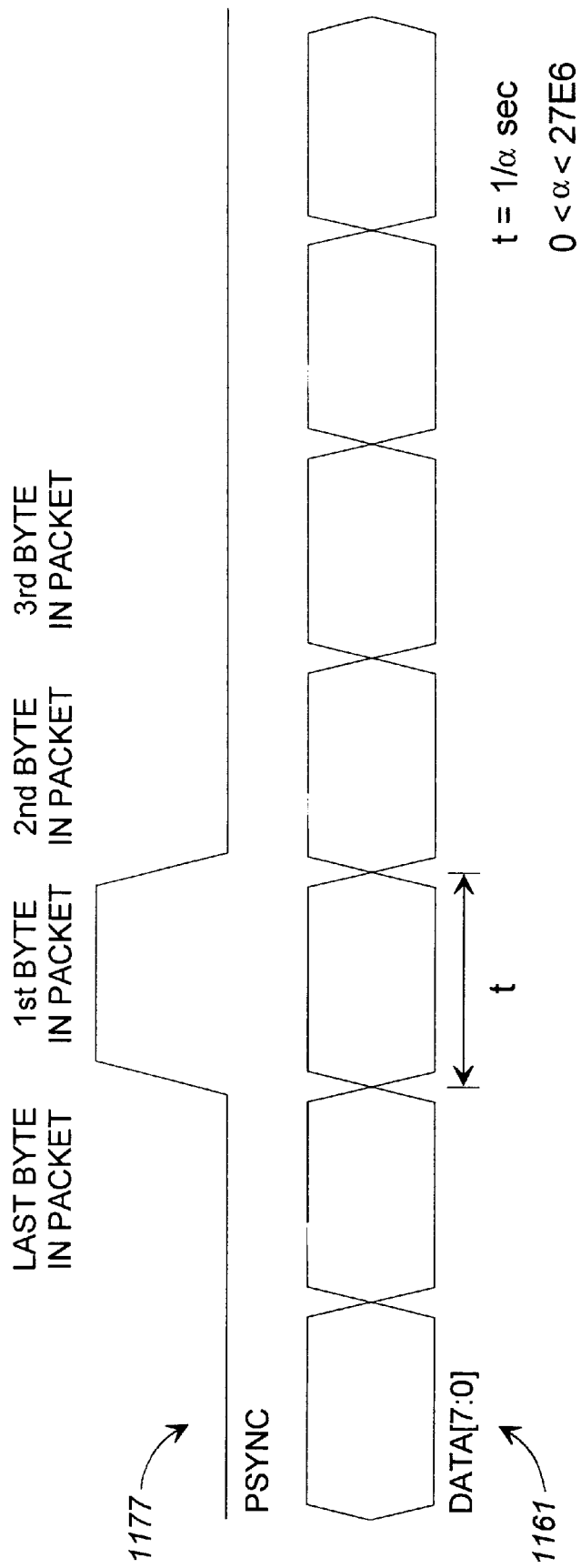
FIG. 21 is a schematic view illustrating that upon the removal of data content from the adaptive style transport stream of FIG. 20A, remaining is a fixed rate transport stream bus.

FIG. 21 is a schematic view illustrating an arbitrary rate program stream from which the adaptive style transport stream at the rate of 27 MHz (FIG. 20A) is created. The arbitrary rate transport stream illustrated by signal 1161 is converted through the use of the selective clocking enabled by the DVALID and PSYNC bits of FIG. 20A. As can be seen interval $t=1/\alpha$ sec, where $0<\alpha<27\times10^6$. In this manner, any arbitrary transport stream may be adaptively converted to the 27 MHz transport stream illustrated in FIG. 20A.

FIG. 22 is a transport stream definition table taken from ISO/IEC 113818-1-Table 2–3, which defines a transport packet per ITU-T Rec. H.222.0, which defines the first three bytes of the transport stream packet of FIGS. 20A, 20B and 21. Illustratively, the first three bytes of each packet are sufficient to determine the PID field of each packet. Note that byte two contains bits 4-0 PID [12:8] packet I) high (PIDH), while byte three contains bits 7-0, PID [7:0] identifying, packet ID low (PIDL). The use of the PIDH and PIDL bits will be discussed in detail with reference to FIGS. 24A–B.

Figure 23:
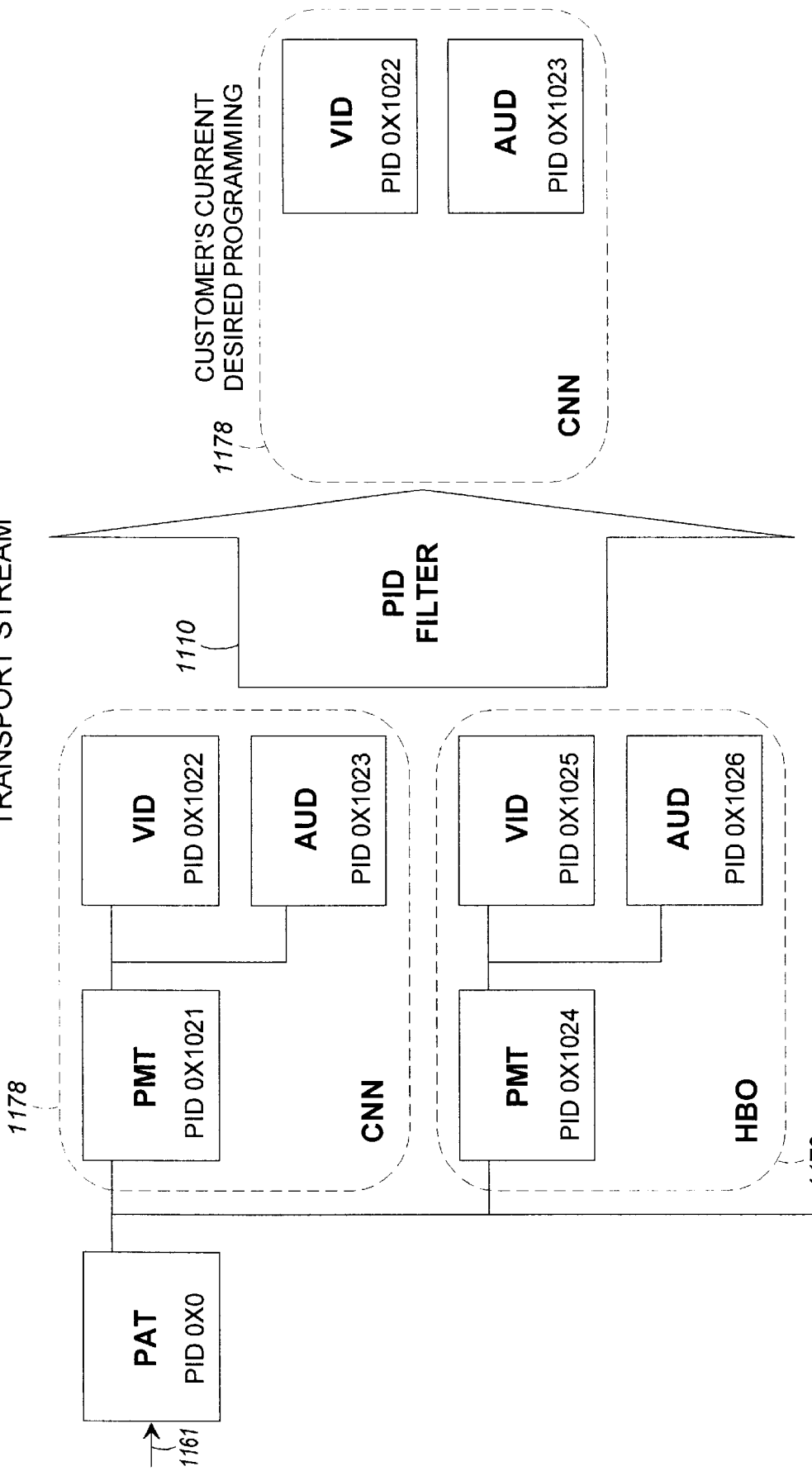
FIG. 23 is a schematic view illustrating the transport stream contained on connection of FIG. 19.

FIG. 23 is a schematic view illustrating the digital video program group contained on connection 1161 of FIG. 19. A program group consists of one or more programs, illustrated by channels 1178 containing, for example, cable news network (CNN) and channel 1179 containing, for example, home box office (HBO). While two channels are shown for simplicity, many channels can simultaneously be carried in each program group. These programs are distinguished through the use of the packet ID (PID) field. Shown is a sample program group in which the several programs contained in the program group are filtered down to a single program, illustratively ordered by an end user, illustrated as CNN program 1178 emanating from packet ID filter operation 1110.

Figure 24A:
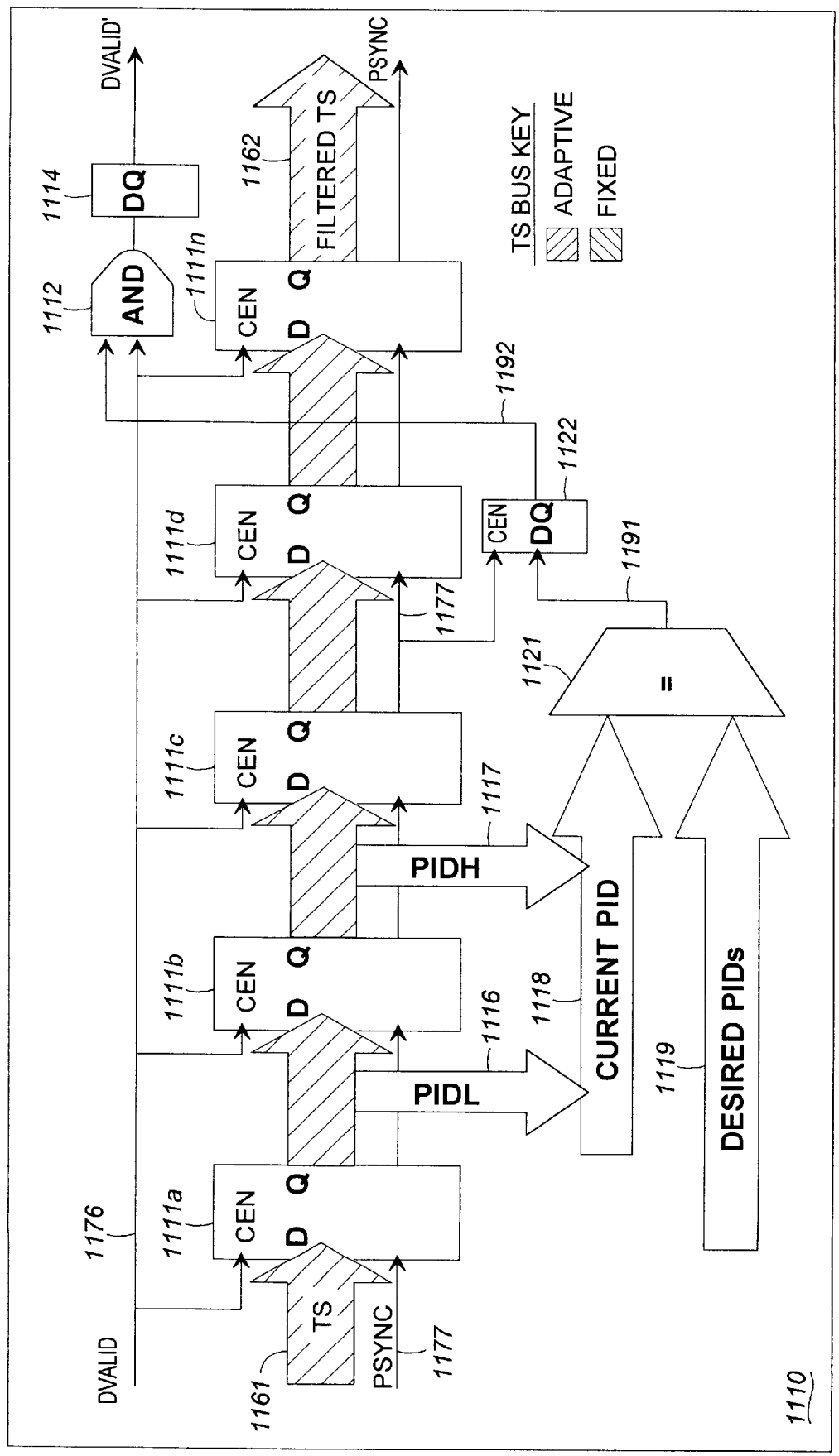
FIG. 24A is a schematic view illustrating PID filter of FIG. 19.

FIG. 24A is a schematic view illustrating PID filter 1110 of FIG. 19. PID filter 1110 is comprised of a plurality of 8-bit latches 1111a–1111n, each configured to receive the 8-bit transport stream on connection 1161. Latches 1111 also include two additional bits, the PSYNC bit which is received on connection 1177 and the DVALID bit which is received over connection 1176. The DVALID bit on connection 1176 supplies the clock enable signal to 8-bit latches 1111. In conjunction with that described in FIGS. 20A, 20B and 22, PID filter 1110 sets the DVALID flag low for all packets that contain undesired PID values. In this manner, only the desired program is extracted from transport stream 1161, containing the program group, through analysis of the PIDL bits on connection 1116 and the PIDH bits on connection 1117. The PIDL bits on connection 1116 and the PIDH bits on connection 1117 form the current packet identification byte on connection 1118.

Comparator 1121 analyzes the current PID value on connection 1118 and the desired PID value on connection 1119 and if they match, i.e., the current PID 111 8 is the desired PID 1119, then comparator 1121 supplies an input to latch 1122. If the PSYNC signal is asserted on connection 1177 and the comparator asserts a signal on connection 1191 then latch 1122 asserts a signal on connection 1192 for input to AND gate 1112. If AND gate 1112 receives input from latch 1122 and the DVALID signal asserted on 1176, then AND gate causes the DVALID signal to be deasserted through latch 1114, while the filtered program group containing the desired packet ID is supplied on connection 1162 to async FIFO buffer 1125 (FIG. 19) and PCR extract device 1130 (FIG. 19).

Figure 24B:
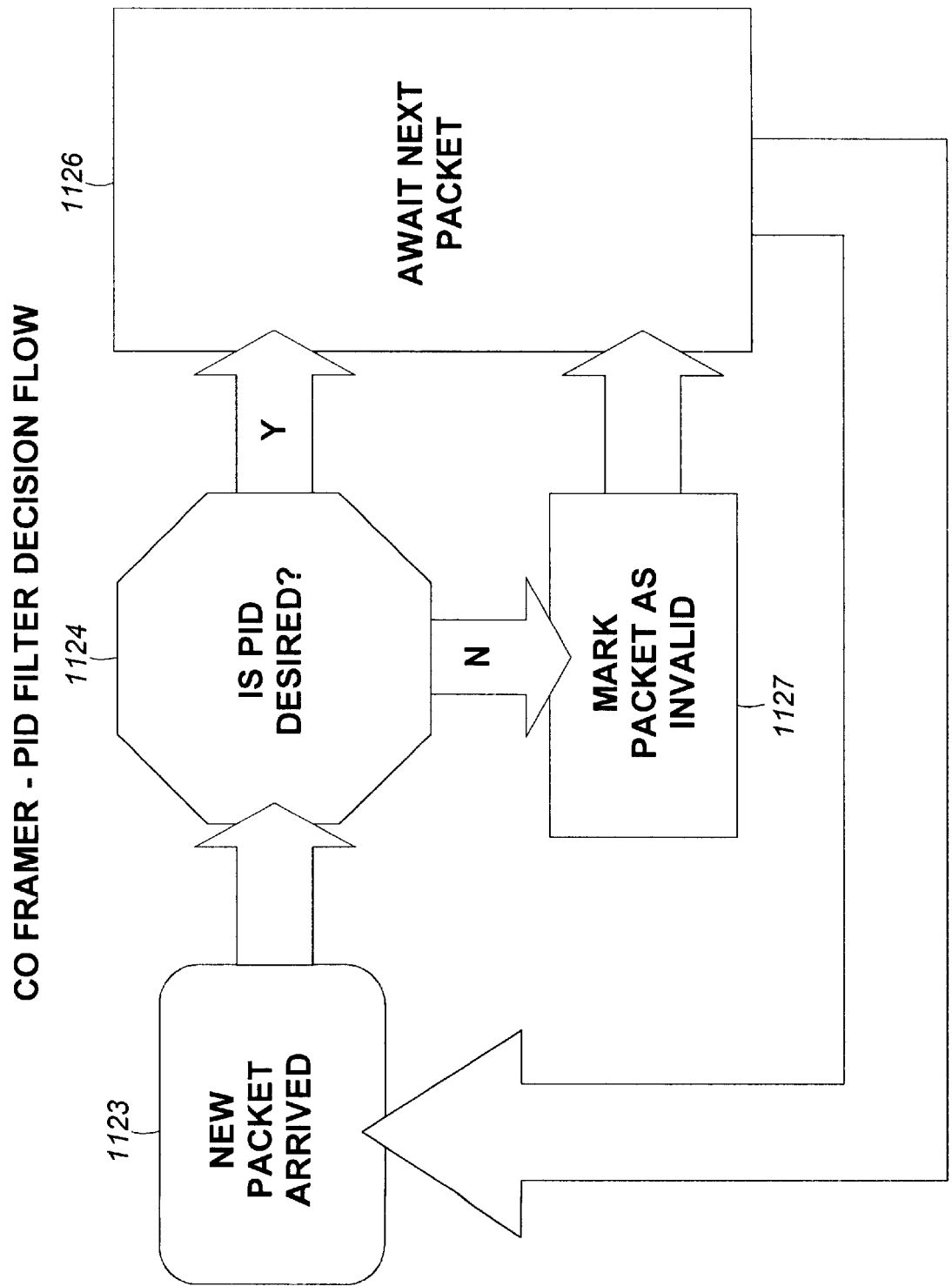
FIG. 24B is a decision flow diagram illustrating the operation of the PID filter of FIG. 24A.

FIG. 24B is a decision flow diagram illustrating the operation of the PID filter 1110 of FIG. 24A. In block 1123 the PID filter receives a new packet. In block 1124 it is determined whether this packet contains the desired PID value. If the PID value is as desired, then in block 1126 packet ID filter will await the next packet. If the PID value is not as desired, then in block 1127 PID filter 1110 will mark the packet as invalid and then await the next packet in block 1126.

Figure 25:
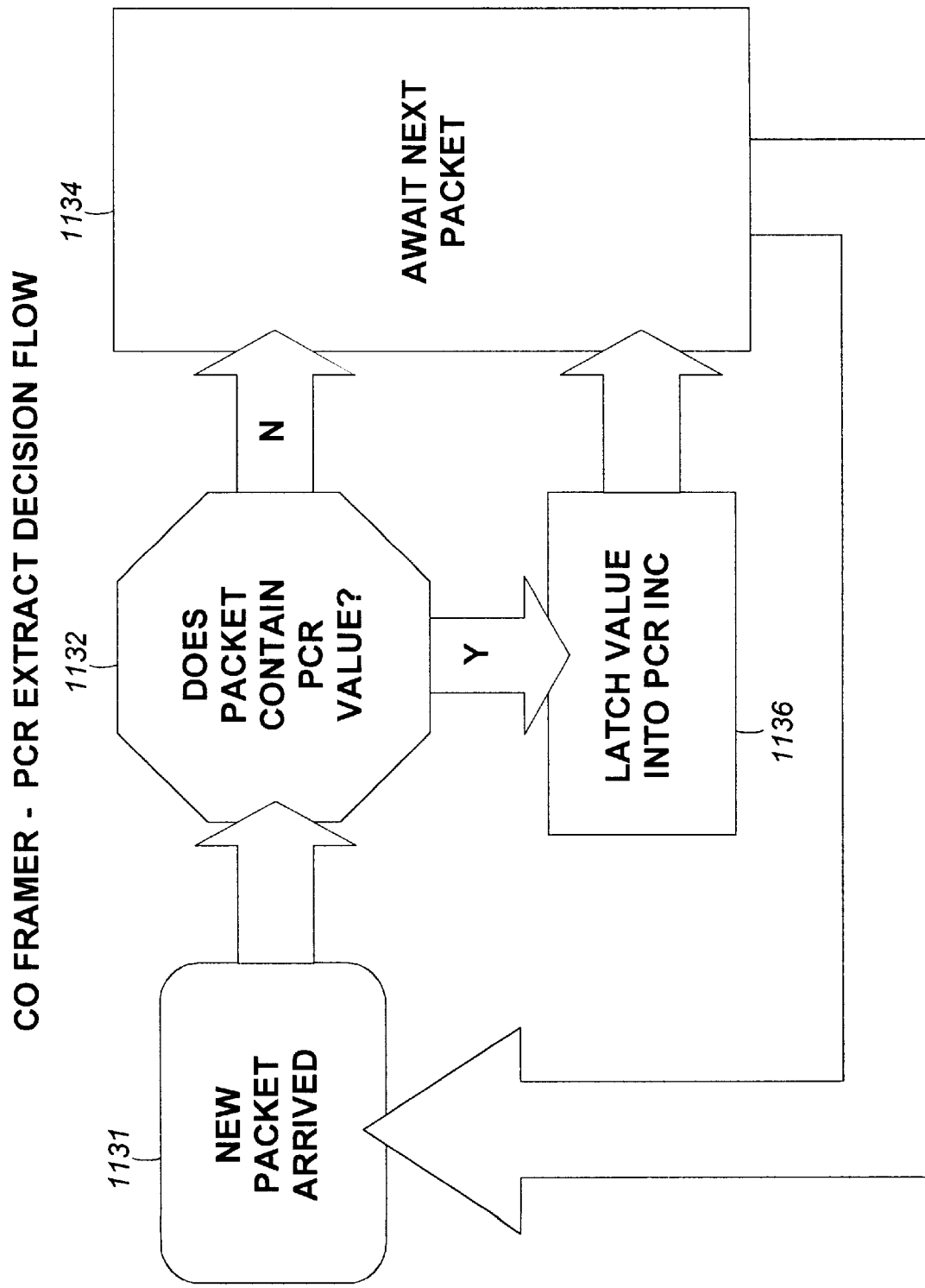
FIG. 25 is a decision flow diagram illustrating the operation of the PCR extract device of FIG. 19.

FIG. 25 is a decision flow diagram illustrating the operation of the PCR extract device 1130 of FIG. 19. In block 1131, PCR extract device receives a new packet. In block 1132, PCR extract device 1130 determines whether the packet contains a PCR value. If no PCR value is contained in the new packet, then PCR extract device 1130 will await the next packet in block 1134. Should the packet contain a PCR value, then PCR extract device 1130 will latch that value into the PCR incrementor 1140 in block 1136. PCR extract device 1130 then awaits the next packet in block 1134.

Figure 26:
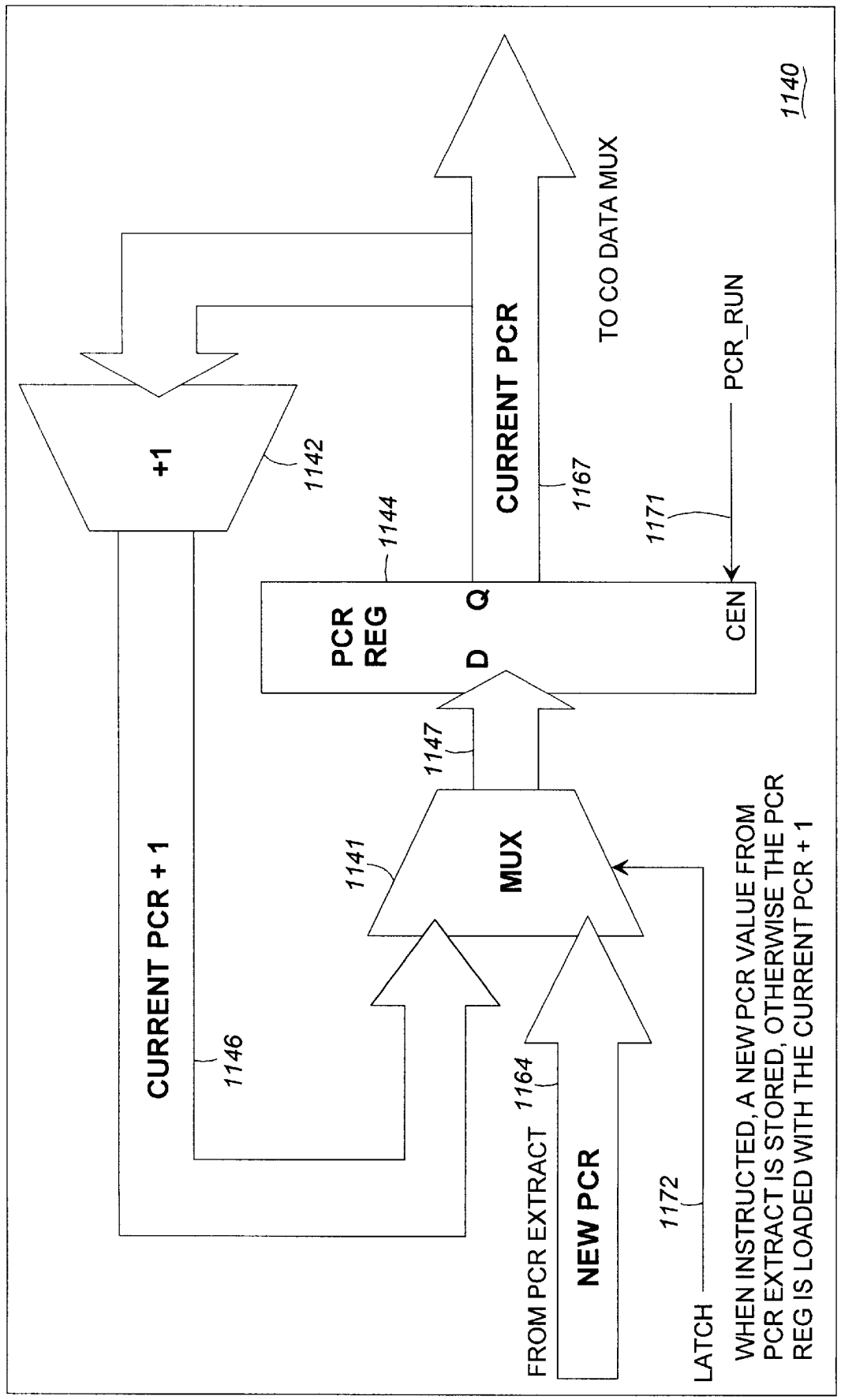
FIG. 26 is a detailed view of the PCR incrementor of FIG. 19.

FIG. 26 is a detailed view of the PCR incrementor 1140 of FIG. 19. On line 1164, mux 1141 receives a new PCR value from PCR extract device 1130. When instructed by the assertion of PCR run signal on connection 1171, PCR register 1144 will store the new PCR value received through mux 1141 on connection 1147. PCR register 1144 is typically a 43-bit register. Either the new PCR value supplied on connection 1164 or the current PCR value plus one supplied on connection 1146 is latched into PCR register 1144 on every 27 MHz clock cycle so long as the PCR run signal is asserted on connection 1171. The current value of the register is provided to CO data mux 1150 over connection 1167 so that CO data mux 1150 can reinsert this field back into the MPEG-2 stream as it is being sent over connection 1168 to customer premises 1300 (see FIG. 19). This technique allows the PCR field to be adjusted by the correct amount in order to maintain its accuracy. For every 27 MHz clock cycle, the PCR laden transport packet is delayed, the PCR field is incremented one unit to compensate. When CO data mux 1150 is ready to send the PCR laden transport packet to customer premise 1300, it stops the PCR incrementor from running by deasserting the PCR run signal on connection 1171, and loads the updated PCR field back into its original transport packet (this will be illustrated in detail with reference to FIG. 28).

Referring back to FIG. 19, by using a transport stream interface that clocks data along at 27 MHz, this same clock source can be used for the PID filter 1110, PCR extract device 1130, async FIFO buffer 1125, and PCR incrementor 1140, whose PCR value is expressed in units of 27 MHz clock cycles. This allows all these units to be implemented as a simple synchronous hardware design. It should be noted that the 27 MHz data clock associated with the incoming transport stream may well vary from the 27 MHz clock used at the encoder. It is therefore likely that the amount added to the PCR field may vary very slightly with a value generated had the encoder clock been regenerated locally. However, the variation between the two clocks over the short time that the PCR incrementor 1140 runs is extremely small. By using the data clock in lieu of attempting to regenerate the encoder clock, CO framer 1100 significantly reduces the cost of implementation. Async FIFO buffer 1125 and PCR run signal 1171 provides a buffer between all other units and CO data mux 1150, which is another purely synchronous design, thus regulated by the data clock provided by modem 1351.

Figure 27A:
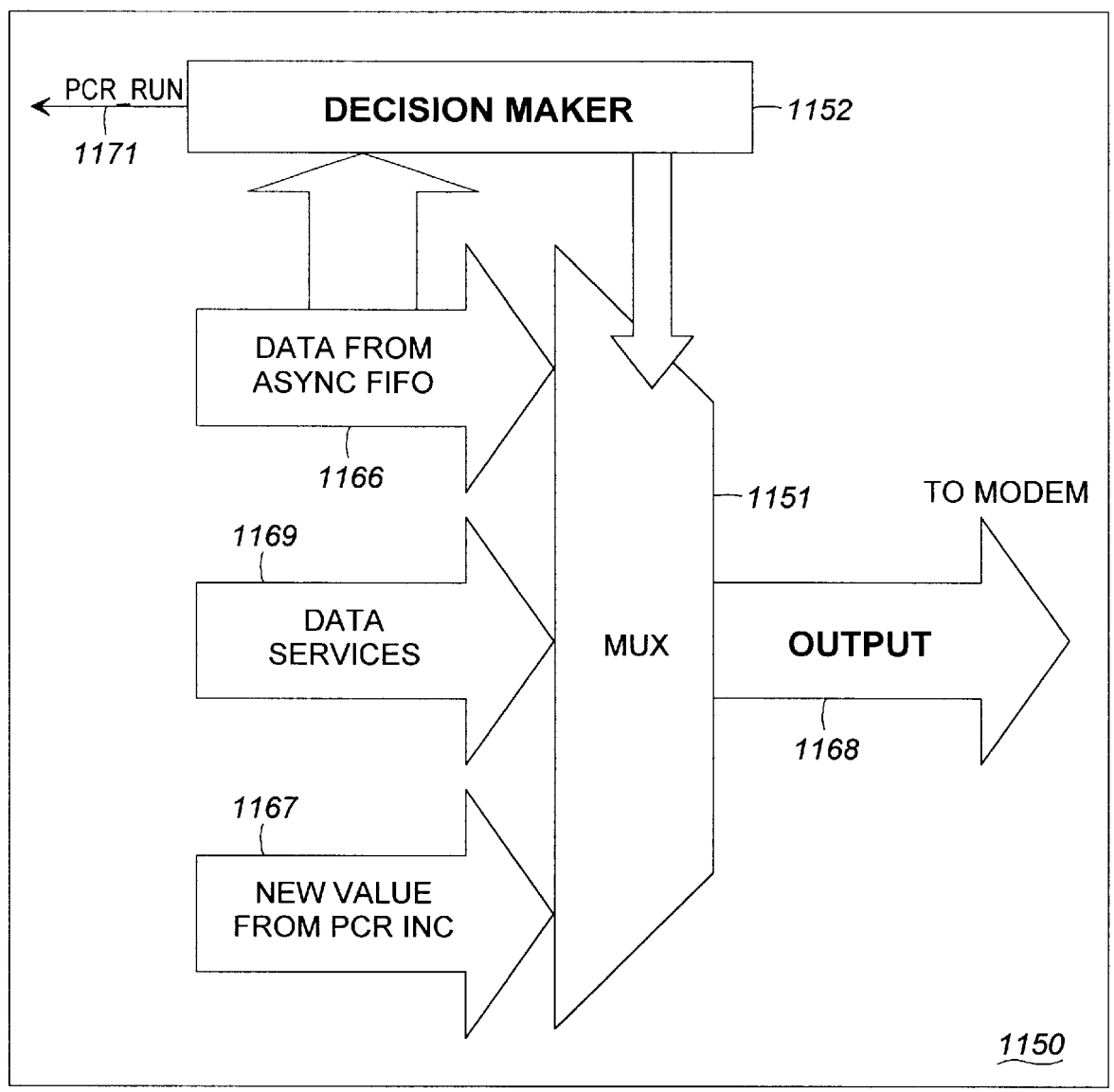
FIG. 27A is a block diagram illustrating CO data mux of FIG. 19.

FIG. 27A is a block diagram illustrating CO data mux 1150 of FIG. 19. Mux 1151 receives a new value from PCR incrementor 1140 over connection 1167, receives data services input over connection 1169, receives data from async FIFO buffer 1125 in the form of a delayed program over connection 1166 and receives input from decision maker 1152. Decision maker 1152 asserts or deasserts the PCR run signal on connection 1171 in order to stop or continue operation of PCR incrementor 1140. Mux 1151 chooses to send data from async FIFO buffer 1125, data services 1169, or replace a packet's PCR field with a new value over connection 1167 based upon current requirements. Mux 1151 provides the final transport stream over connection 1168 to modem 1351 for transport over low bandwidth communication channel 16.

Figure 27B:
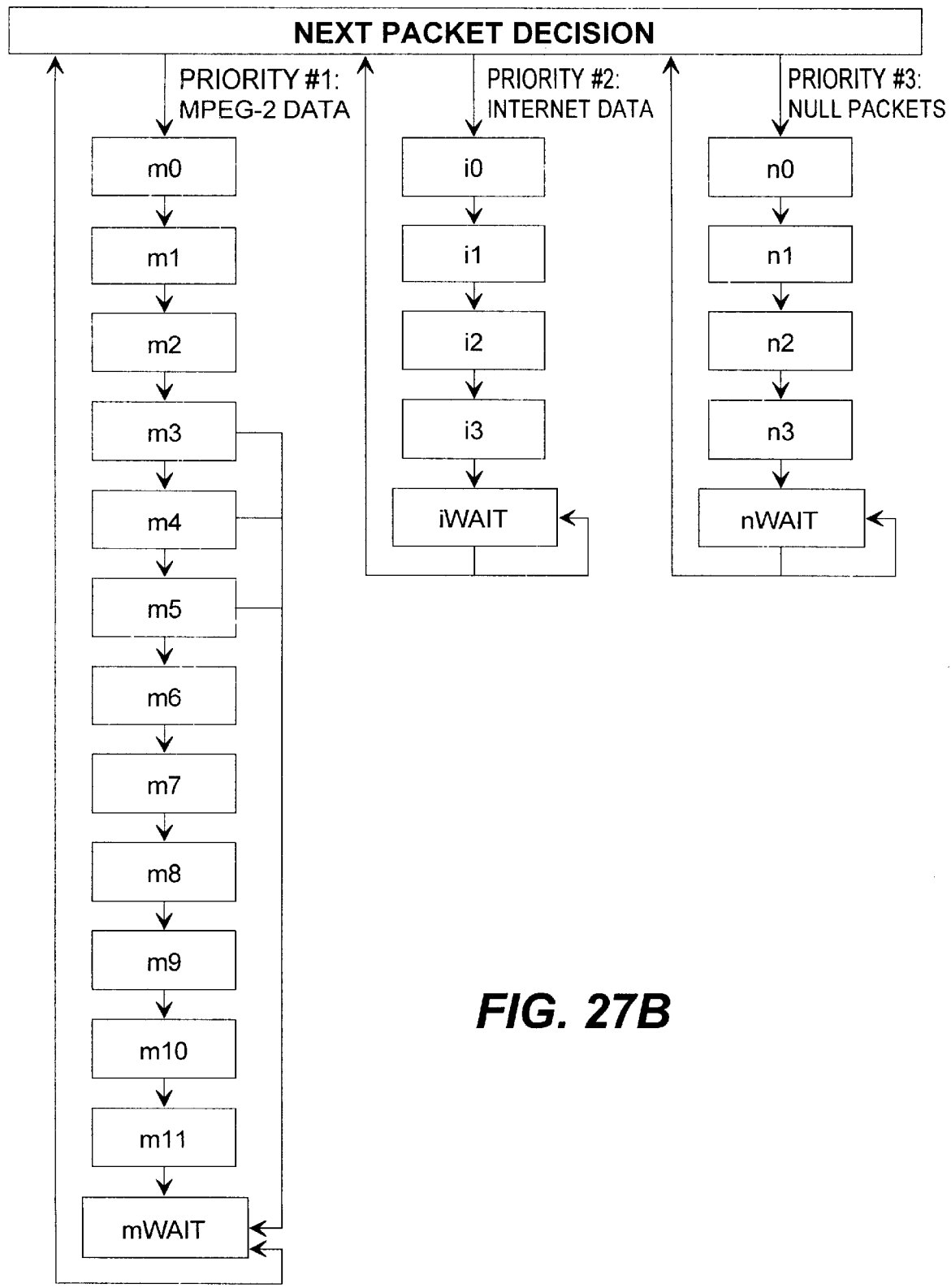
FIG. 27B is a state diagram illustrating the operation of CO data mux of FIG. 19.

FIG. 27B is a state diagram illustrating the operation of the decision maker 1152 of FIG. 27A. In states m0, m1 and m2, a byte containing video programming content is read from async FIFO buffer 1125 and sent over connection 1168 to modem 1351. In state m3, a byte is again read from async FIFO buffer 1125 and sent to modem 1351. If bit 5 is set, go to state m4, else go to state mwait. In state m4, a byte is again read from async FIFO buffer 1125 and sent to modem 1351. If zero, go to state mwait, else go to state m5. In state m5, a byte is again read from async FIFO buffer 1125 and sent to modem 1351. If bit 4 is set, go to state m6, else go to state mwait If the state machine reaches the m6 state, then a PCR value is present in the packet, and therefore the old value is substituted with a new value as follows.

In states m6, m7, m8, m9, m10 and m11, a byte is read from async FIFO buffer 1125 and discarded. The PCR run signal on line 1171 is deasserted. During each of the next six clock cycles, the six bytes associated with the new PCR field (connection 1167) are transmitted in lieu of the six bytes associated with the old PCR field.

In the mwait state, a byte is read from async FIFO buffer 1125 and sent to modem 1351 and the next packet decision (1152) is awaited.

In state i0 a standard MPEG-2 synch byte (0×47) is sent to modem 1351. In state i1, the byte 0×1F is sent to modem 1351. In state i2, the byte 0×FE is sent to modem 1351. In state i3, the byte 0×1α is sent to modem 1351, where α is the appropriate continuity_counter value. States i1 and i2 transmit the PID value to be used for the Internet data; in this preferred embodiment the PID value of 0×1FFE is used. It should be noted that any arbitrary value may be used provided it is consistent across the design and does not conflict with any other PID's being used. The continuity counter is a standard 4-bit field that is incremented once for every transport packet of the same PIED as is known in the art. In the iwait state, a byte of Internet data is sent to modem 1351 and the next packet decision (1152) is awaited.

In state n0, a standard MPEG-2 synch byte (0×47) is sent to modem 1351. In state n1, the byte 0×1F is sent to modem 1351. In state n2, the byte 0×FF is sent to modem 1351. In state n3, the byte 0×1β is sent to modem 1351, where β is the appropriate continuity_counter value. In state nwait, the byte 0×FF is sent to modem 1351 and the next packet decision (1152) is awaited.

Figure 27C:
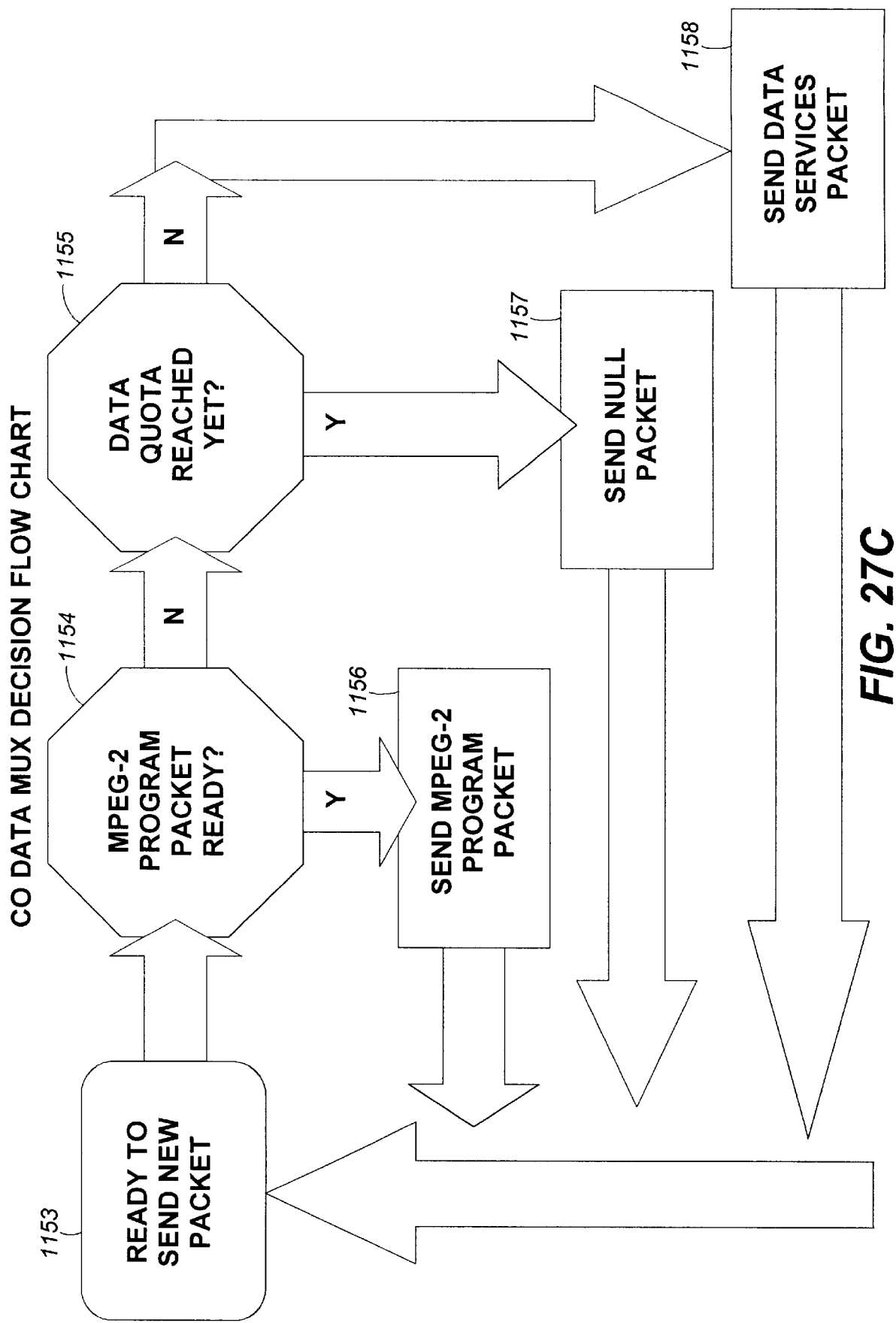
FIG. 27C is a flow chart illustrating the operation of CO data mux of FIG. 27A.

FIG. 27C is a flow chart illustrating the operation of CO data mux 1150 of FIG. 27A. In block 1153, CO data mux 1150 is ready to send a new packet. In block 1154, it is determined whether there is an MPEG-2 program packet ready to be sent from connection 1166 (FIG. 19). If an MPEG-2 program packet is available, then it is sent over connection 1168 to modem 1351 in block 1156. If there is not an MPEG-2 program packet ready, then in block 1155 CO data mux 1150 will determine whether the data quota has been reached. If the data quota has been reached, then in block 1157, CO data mux 1150 will send a null packet. If it is determined in block 1155 that the data quota has not been reached, then CO data mux 1150 will send a data services packet in block 1158.

Figure 27D:
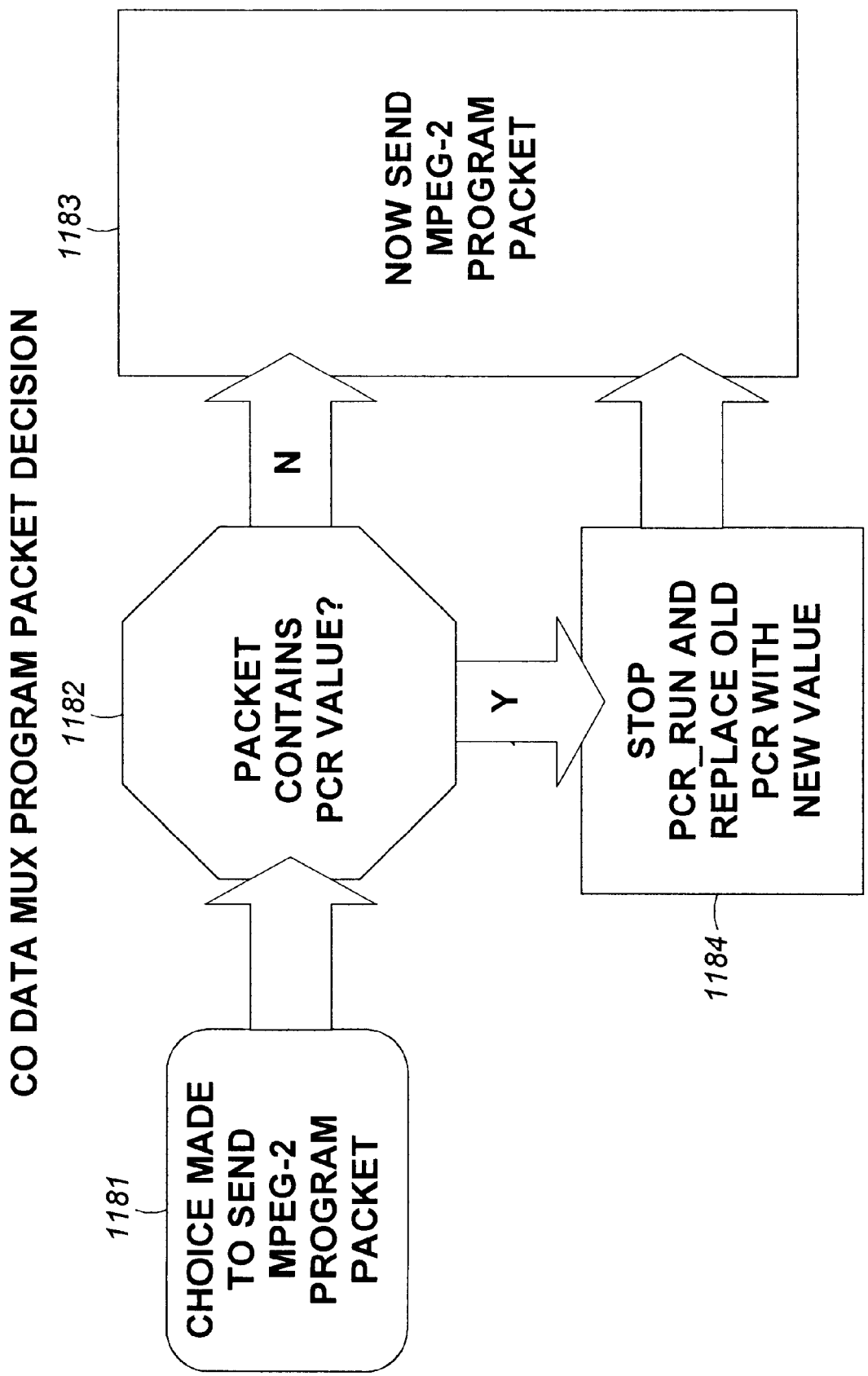
FIG. 27D is a flow chart illustrating the CO data mux program packet decision making function of FIG. 27A.

FIG. 27D is a flow chart illustrating the CO data mux program packet decision making function 1152 of FIG. 27A. In block 1181, the choice has been made to send an MPEG-2 program packet, block 1181 corresponding with block 1156 of FIG. 27B. In block 1182, it is determined whether the packet to be sent contains a PCR value. If the packet does not contain a PCR value, then in block 1183, the MPEG-2 program packet is sent. If in block 1182 it is determined that the packet does contain a PCR value, then in block 1184, the PCR run signal on connection 1171 (FIG. 19) is deasserted and the old PCR value is replaced with the new PCR value available on connection 1167.

Figure 28:
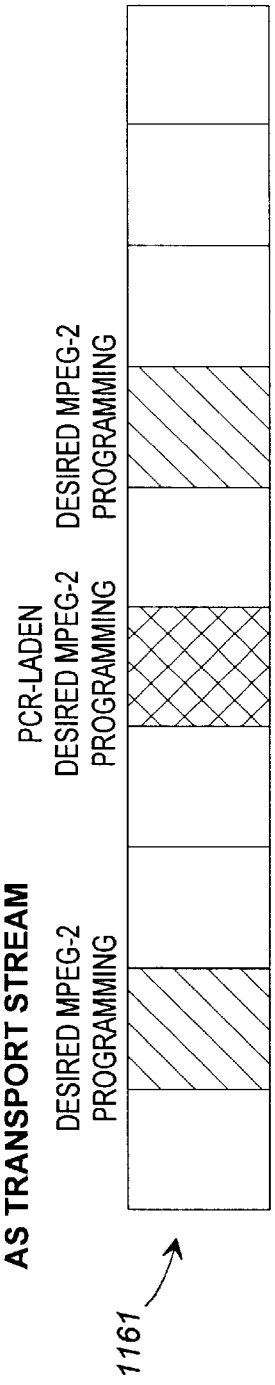
FIG. 28 is a schematic view illustrating the downstream (from central office to customer premise) operation of CO framer of FIG. 19.
Figure 28:
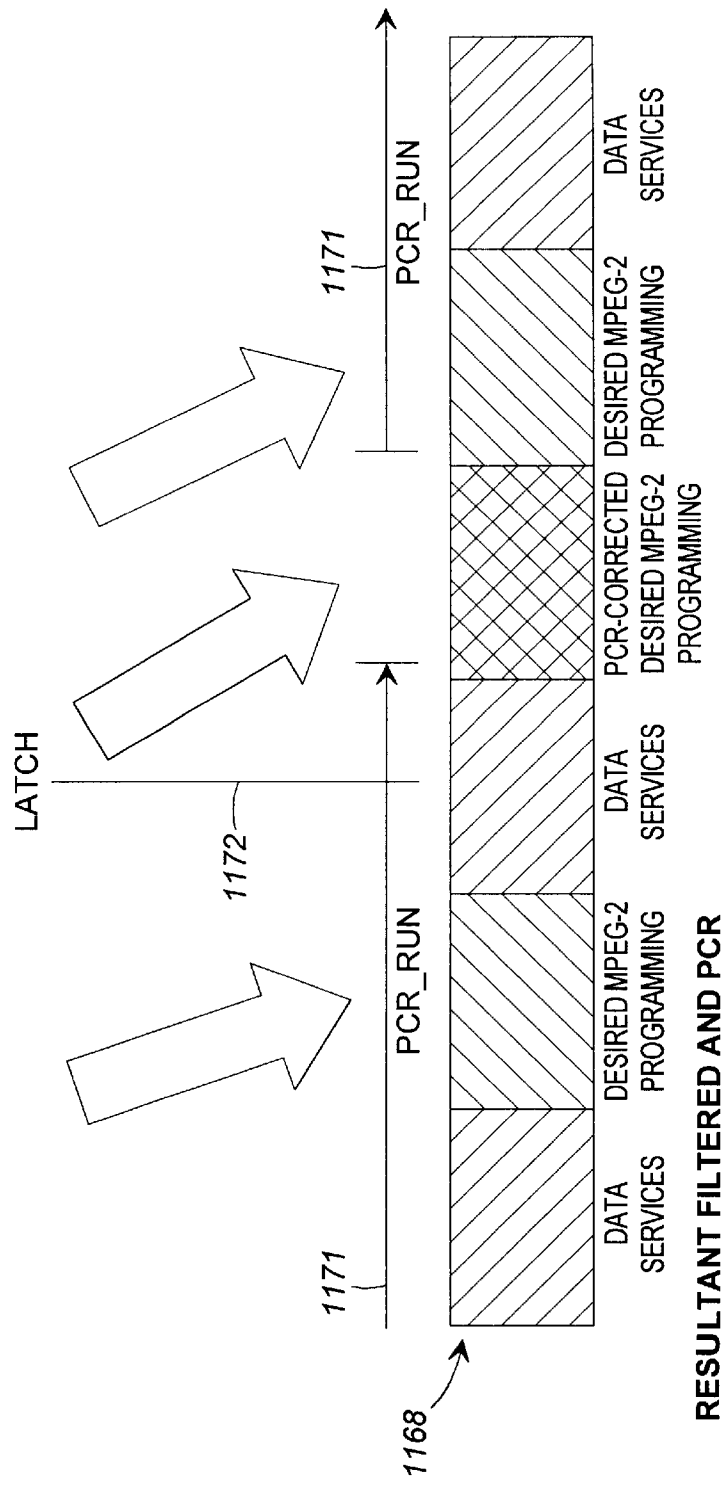

FIG. 28 is a schematic view illustrating the downstream (from central office 400 to customer premises 1300) operation of CO framer 1100 of FIG. 19. Individual packets from multiple program source transport stream 1161 are selectively forwarded to the slower transport stream 1168 destined for modem 1351 by latching the extracted PCR value on connection 1164 (FIG. 19) into PCR incrementor 1140 over connection 1172 and deasserting the PCR run signal 1171 to PCR incrementor 1140 (FIG. 19). PCR field adjustment is performed on packets that contain the PCR field in accordance with the description of FIG. 26.

Figure 29:
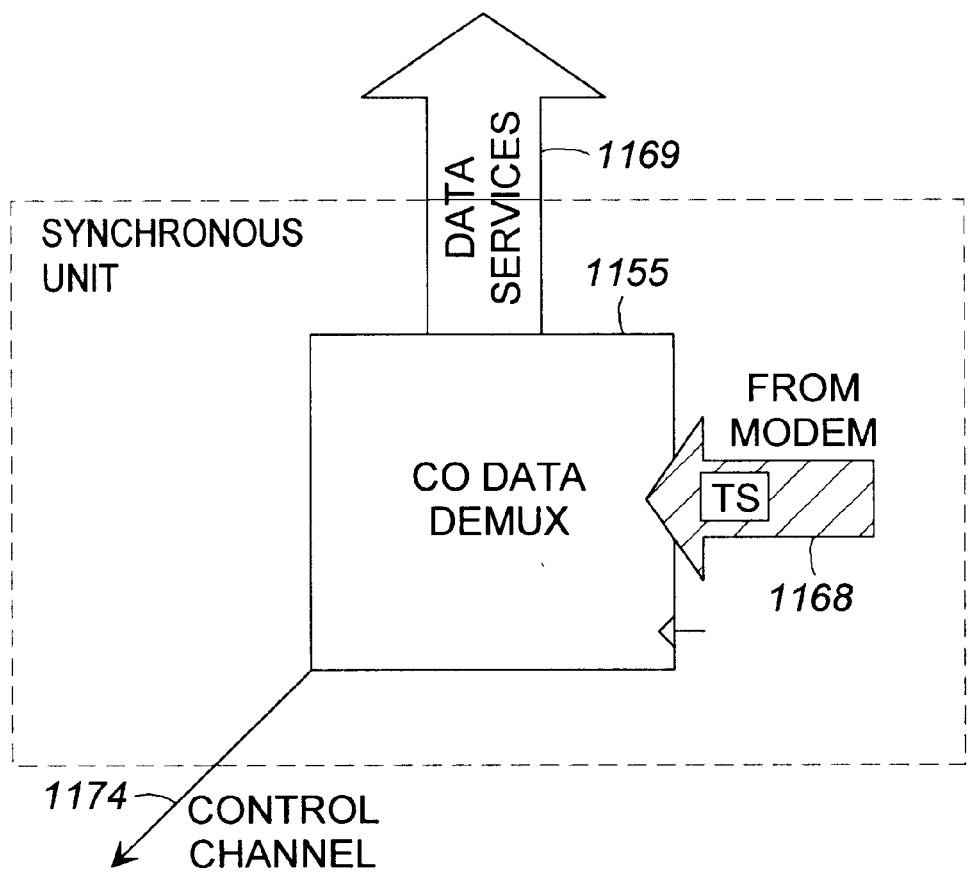
FIG. 29 is a schematic view illustrating the CO data mux of CO framer of FIG. 19 in an upstream (customer premises to central office) direction.
Figure 29:
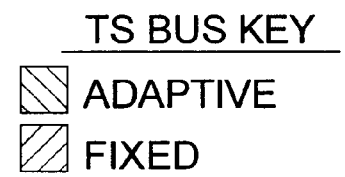

FIG. 29 is a schematic view illustrating the CO data mux of CO framer 1100 of FIG. 19 in an upstream (customer premises 1300 to central office 400) direction. Although omitted for simplicity from FIG. 19, CO framer 1100 includes, in addition to CO data mux 1150, CO data demux 1155. CO data demux 1155 receives bi-directional Internet data from customer premises 1300 over connection 1168 and control information over control channel 1174. CO data demux routes the Internet data to, for example, computer 1355 (not shown) over connection 1169. The operation of control channel 1174 is as discussed above.

Figure 30:
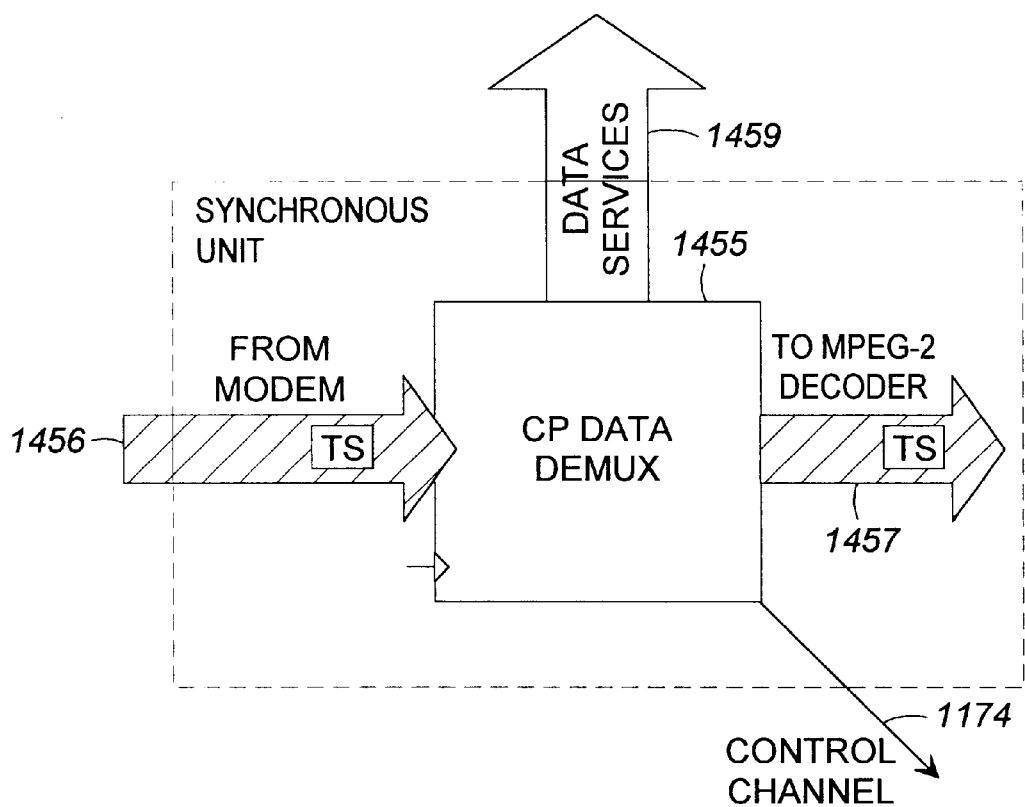
FIG. 30 is a schematic view illustrating the CP data demux of FIG. 17A in a downstream direction.

FIG. 30 is a schematic view illustrating the CP data demux 1455 in a downstream direction. The video programming content and data is received on connection 1456 from DSL modem 1351. CP data demux 1455 separates the video programming content for input to MPEG-2 decoder 1356 (FIG. 18) over connection 1457 and the bi-directional Internet data for input to computer 1355 (FIG. 18) over connection 1459. Also providing input to CP data demux 1455 is control channel 1174 the operation of which was discussed with respect to FIG. 19.

Figure 31:
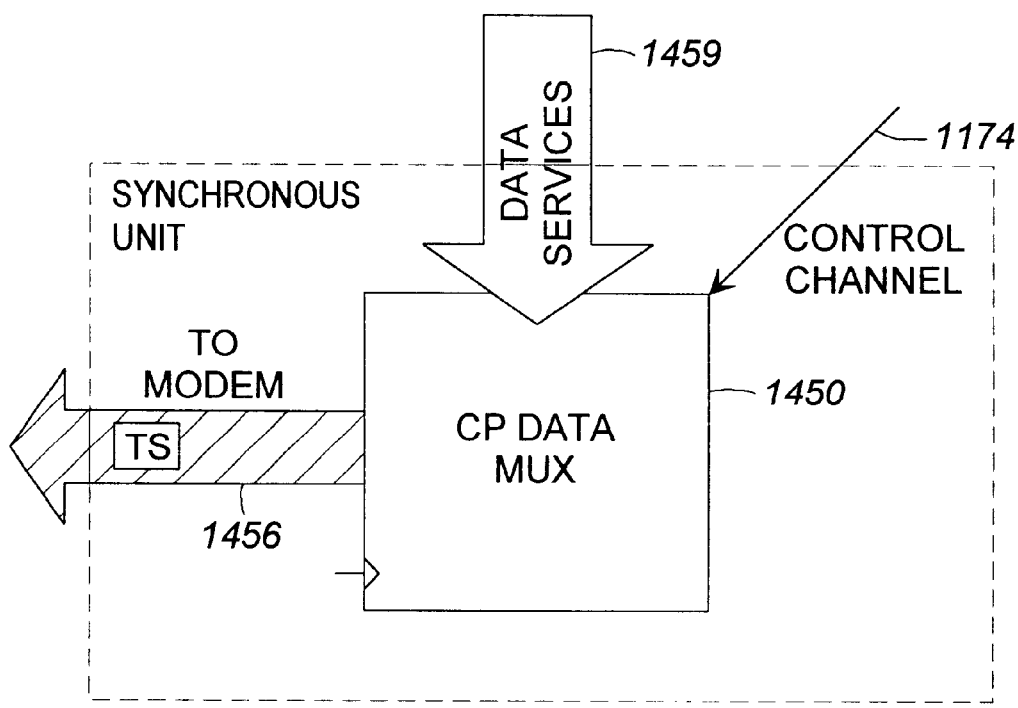
FIG. 31 is a schematic view illustrating CP data mux of the CP framer of FIG. 17A in an upstream direction.

FIG. 31 is a schematic view illustrating CP data mux 1450 of the CP framer 1400 of FIG. 17A in an upstream direction. Bi-directional Internet data is received in CP data mux 1450 over connection 1459 and transported to DSL modem 1351 for communication over communication channel 16. Note that CP data mux 1450 sends only bi-directional Internet data and control information over control channel 1174 in the upstream direction.

Figure 32:
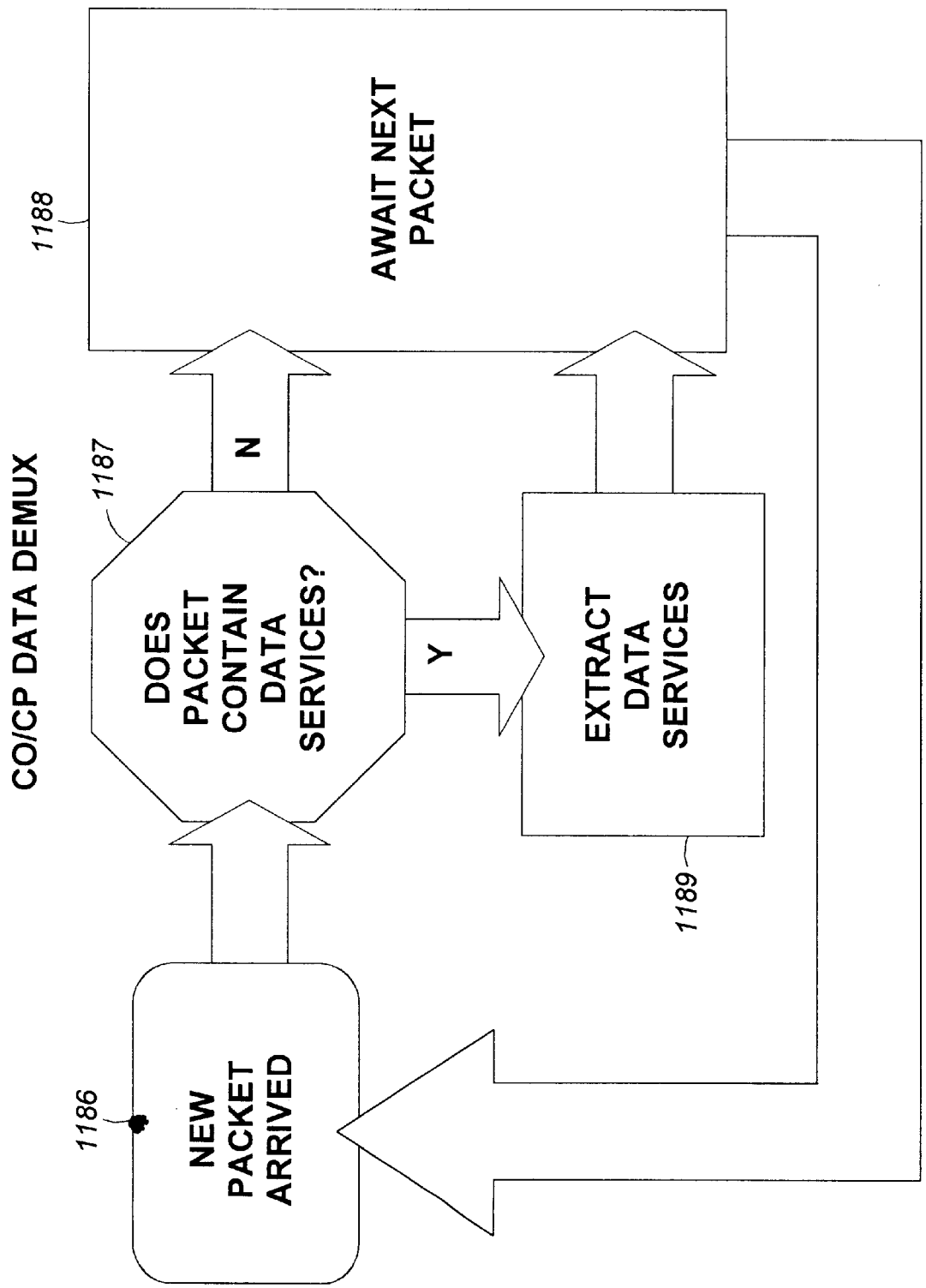
FIG. 32 is a decision flow diagram illustrating the operation of both CO data demux and CP data demux.

FIG. 32 is a decision flow diagram illustrating the operation of both CO data demux 1155 and CP data demux 1455. Block 1186, signifies the arrival of a new packet. In block 1187 it is determined whether the packet contains data services. If the packet does not contain data services, then in block 1188, the data demux awaits the next packet. If it is determined in block 1187 that the packet does contain data services, then in block 1189, the data services are extracted and the data demux awaits the next packet in block 1188.

Figure 33:
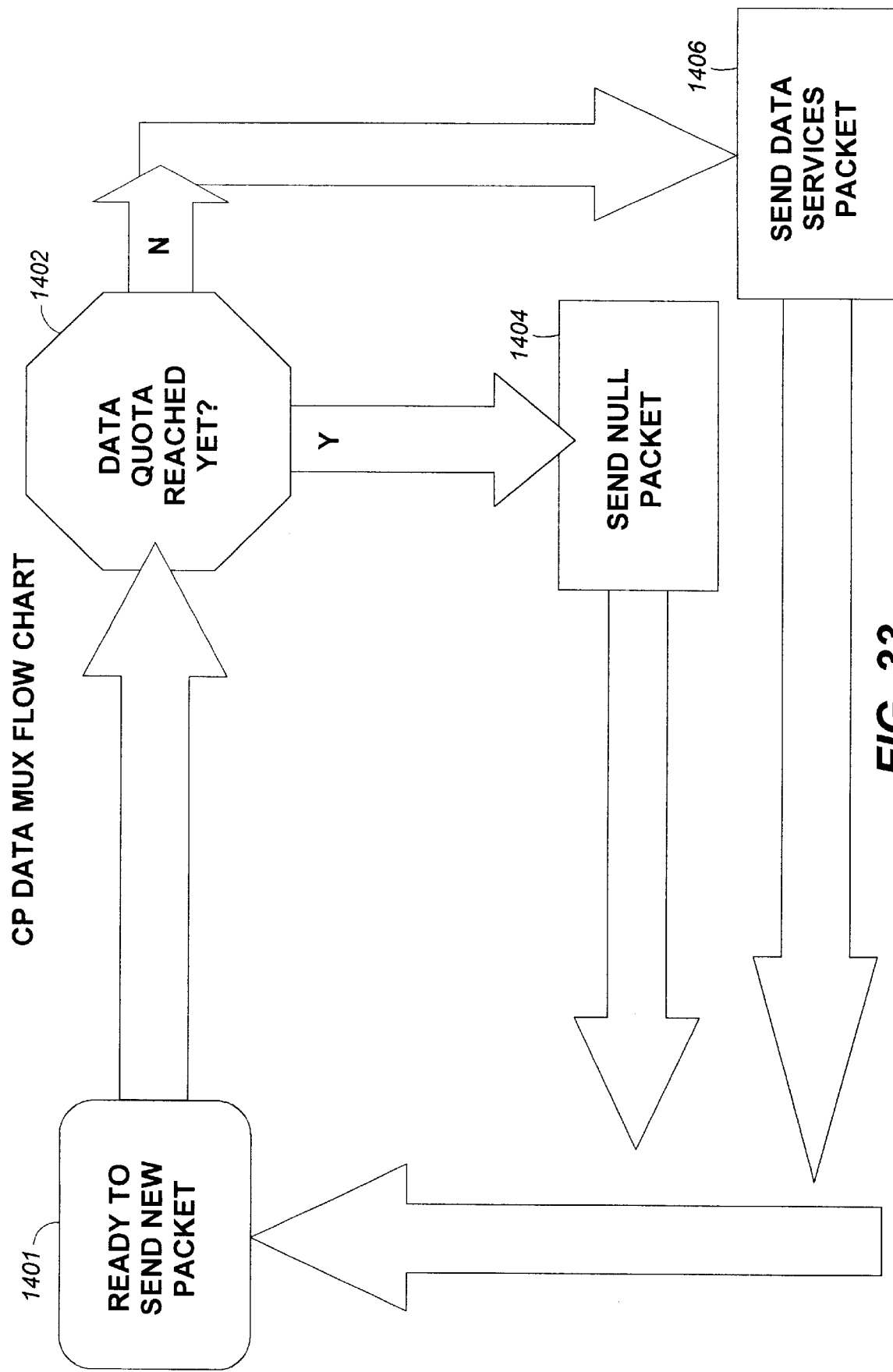
FIG. 33 is a flow chart illustrating the operation of CP data mux of FIG. 17A.

FIG. 33 is a flow chart illustrating the operation of CP data mux 1450 of FIG. 17A. In block 1401, CP data mux 1450 is ready to send a new packet. In block 1402, it is determined whether the data quota has been reached. If the data quota has been reached, then in block 1404 CP data mux 1450 will send a null packet. If in block 1402, it is determined that the data quota has not been reached, then in block 1406, CP data mux 1450 will send a data services packet through modem 1351 over communication channel 16 to central office 400. This illustrates that upstream data is formatted in transport packets as well. Although not necessary for the design of the present invention to function, it promotes standardization. CP data mux 1450 generates only data service and null packets.

Figure 34:
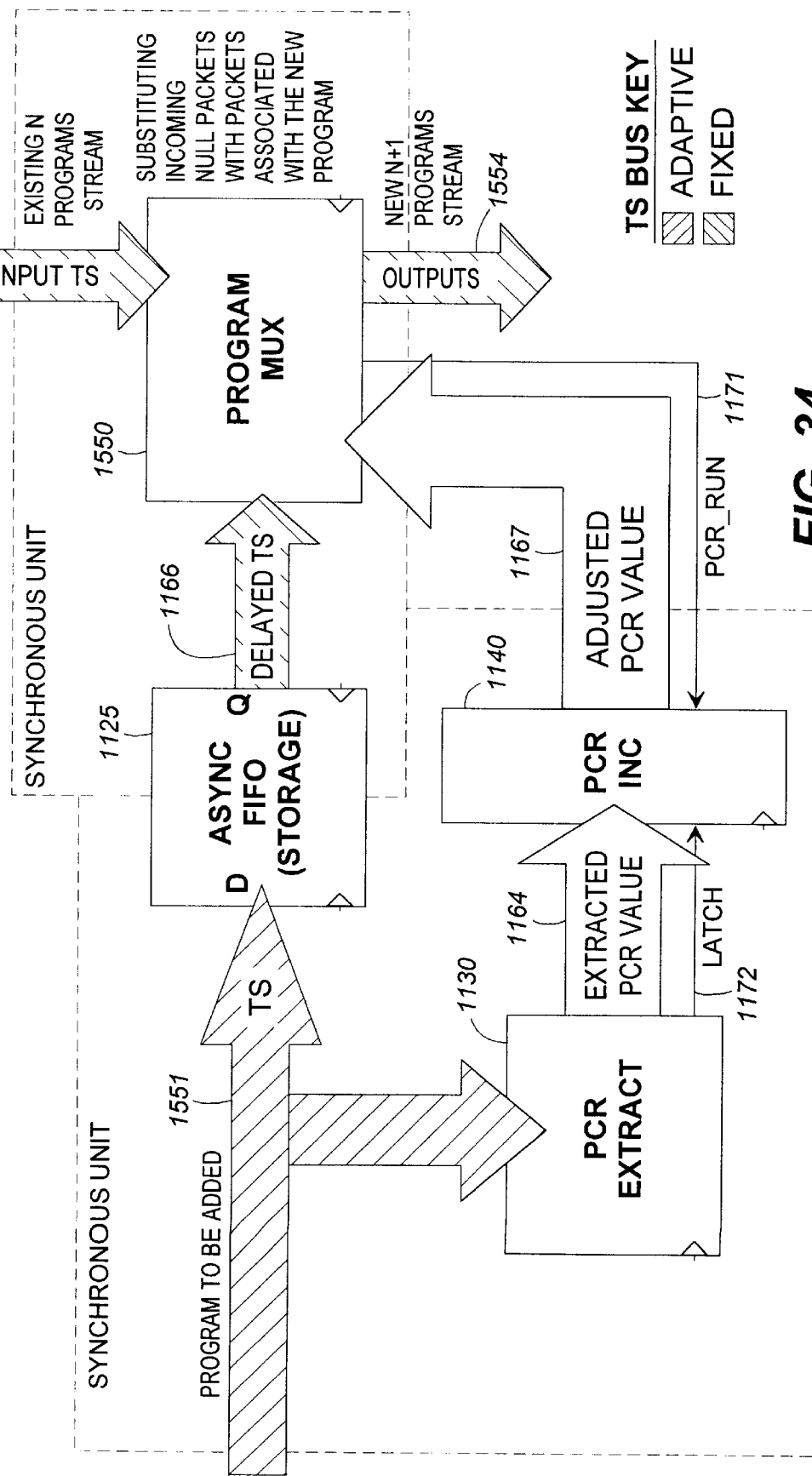
FIG. 34 is a schematic view illustrating an alternative embodiment of CO framer of FIG. 19.

FIG. 34 is a schematic view illustrating an alternative embodiment of CO framer 1100 of FIG. 19. In this embodiment, CO framer 1100 adds a new program to an existing transport stream. Items performing like functions to those described with reference to FIG. 19 are given the same reference numerals and will not be described in detail again. As can be seen, a program to be added is supplied on connection 1551 to async FIFO buffer 1125. PCR extractor 1130 also monitors the transport stream on connection 1551 in similar fashion to monitoring the output of PID filter 1110 of FIG. 19. PCR extractor 1130, PCR incrementor 1140 and async FIFO buffer 1125 all perform the same function as described above. Program mux 1550 replaces CO data mux 1150, and receives existing program streams over connection 1552. Program mux 1550 will substitute incoming null packets with packets associated with the new program and supply an output on connection 1554 comprising the new n+1 program stream.

Many variations and modifications may be made to the above-described embodiment(s) of the invention without departing substantially from the scope and principles of the invention. All such modifications and variations are intended to be included herein within the scope of the present invention.

What is claimed is:

1. A system for delivering digital video and data over a single communication channel, comprising:
    a programming center configured to receive a plurality of video signals representing a plurality of video programs, said programming center also configured to process at least one bi-directional data signal;
    a central office in communication with said programming center, said central office configured to receive said plurality of video signals representing said plurality of video programs and place said plurality of video signals simultaneously on a bus, said central office also configured to process said at least one bi-directional data signal, said at least one bidirectional data signal including a telephone channel; and means located in said central office for simultaneously delivering and terminating any of said plurality of video signals representing said plurality of video programs to any of a plurality of end user locations and supporting communication of said at least one bidirectional data signal to said any of said plurality of end user locations over a single communications channel.

2. The system as defined in claim 1, further comprising means for precisely controlling said plurality of video signals representing said plurality of video programs for delivery to said any of a plurality of end user locations.

3. The system as defined in claim 1, wherein the placement of said bus in said central office allows a plurality of end user locations simultaneous access to any number of said plurality of video signals representing said plurality of video programs.

4. The system as defined in claim 1, wherein said bus allows any end user location connected to said central office to select from any of said plurality of video signals representing said plurality of video programs.

5. The system as defined in claim 1, further comprising means for communicating from said end user location to said central office in order to request one of said plurality of video signals representing said plurality of video programs.

6. The system as defined in claim 1, further comprising a video network interface shelf contained within said central office.

7. The system as defined in claim 1, further comprising a video distribution shelf contained within said central office.

8. The system as defined in claim 1, further comprising an access shelf contained within said central office.

9. The system as defined in claim 8, wherein said bus resides within said access shelf.

10. The system as defined in claim 1, further comprising means for providing simultaneously with said at least one of said plurality of video signals representing at least one of said plurality of video programs and said at least one bidirectional data signal, at least one telephone channel.

11. A method for providing a plurality of video channels and bi-directional data over a single communication channel, comprising the steps of:

a) simultaneously placing a plurality of video channels each representing a video program on a bus;

b) receiving a request from at least one of a plurality of user locations for at least one of said plurality of video channels;

c) processing said request in order to determine whether said at least one user location is authorized to receive said at least one of said plurality of video channels; and d) simultaneously delivering said at least one of said plurality of video channels representing said at least one video program over a single communications channel to any of said plurality of user locations if said at least one user location is authorized to receive said at least one of said plurality of video channels, said at least one of said plurality of video channels representing said at least one video program and said bi-directional data terminating at said at least one user location.

12. The method as defined in claim 11, further comprising the step of providing simultaneously with said at least one of said plurality of video channels a bidirectional data channel.

13. The method as defined in claim 11, further comprising the step of providing simultaneously with said at least one of said plurality of video channels at least one telephone channel.

14. The method as defined in claim 11, further comprising the step of providing simultaneously with said at least one of said plurality of video channels a bidirectional data channel and at least one telephone channel.

15. The method as defined in claim 11, further comprising the steps of:

monitoring each of said plurality of video channels requested by each said user location in order to collect a history of all video channels requested by each said user location; and maintaining said history in a database.

* * * * *

UNITED STATES PATENT AND TRADEMARK OFFICE
CERTIFICATE OF CORRECTION

PATENT NO. : 6,154,772
DATED : November 28, 2000
INVENTOR(S) : Dunn, et al.

It is certified that error appears in the above-identified patent and that said Letters Patent is hereby corrected as shown below:

<u>Title page,</u>
Item [56], in the "References Cited" section, please add:
  5,784,683          7/1998        Sistanizadeh, et al. ................. 455/5.1

<u>Column 7,</u>
Line 64, delete "14", and insert -- 114 --.

<u>Column 8,</u>
Line 27, after "follow", insert -- , --.

<u>Column 11,</u>
Line 44, delete "," and insert -- . --.
Line 45, after "HTML", insert -- are --.

<u>Column 13,</u>
Line 44, delete "VNIN" and insert -- VNIM --.

<u>Column 23,</u>
Line 39, delete "1 100", and insert -- 1100 --.

<u>Column 25,</u>
Line 7, delete "183", and insert -- 18 --.
Line 21, delete "1 150", and insert -- 1150 --.

<u>Column 32,</u>
Line 21, after "program", insert -- , --.

Signed and Sealed this

Second Day of October, 2001

*Attest:*

*Attesting Officer*

NICHOLAS P. GODICI
*Acting Director of the United States Patent and Trademark Office*